United States Patent
Tamura et al.

(10) Patent No.: US 11,155,753 B2
(45) Date of Patent: Oct. 26, 2021

(54) LIQUID CRYSTAL COMPOSITION USED FOR PHASE CONTROL OF ELECTROMAGNETIC WAVE SIGNAL

(71) Applicants: JNC CORPORATION, Tokyo (JP); JNC PETROCHEMICAL CORPORATION, Tokyo (JP)

(72) Inventors: Norio Tamura, Chiba (JP); Yoichi Uriu, Chiba (JP); Eiji Okabe, Chiba (JP); Koki Sago, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 128 days.

(21) Appl. No.: 16/658,171

(22) Filed: Oct. 21, 2019

(65) Prior Publication Data
US 2020/0224099 A1 Jul. 16, 2020

(30) Foreign Application Priority Data

Dec. 3, 2018 (JP) .............................. JP2018-226262
Aug. 20, 2019 (JP) .............................. JP2019-150310

(51) Int. Cl.
| | | |
|---|---|---|
| *G02F 1/1333* | (2006.01) | |
| *C09K 19/12* | (2006.01) | |
| *C09K 19/30* | (2006.01) | |
| *C09K 19/52* | (2006.01) | |
| *C09K 19/18* | (2006.01) | |
| *C09K 19/06* | (2006.01) | |
| *C09K 19/04* | (2006.01) | |

(52) U.S. Cl.
CPC ............ *C09K 19/12* (2013.01); *C09K 19/066* (2013.01); *C09K 19/18* (2013.01); *C09K 19/3003* (2013.01); *C09K 19/3059* (2013.01); *C09K 19/52* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/181* (2013.01); *C09K 2019/3016* (2013.01); *C09K 2019/3025* (2013.01); *C09K 2019/3063* (2013.01)

(58) Field of Classification Search
CPC ................ C09K 19/12; C09K 19/3003; C09K 19/3059; C09K 19/52; C09K 19/18; C09K 19/066; C09K 2019/181; C09K 2019/122; C09K 2019/123; C09K 2019/3016; C09K 2019/3025; C09K 2019/124; C09K 2019/3063; C09K 2019/0466; C09K 2019/0448; C09K 2019/3422; C09K 2219/11; C09K 2019/186; G02F 1/1333
See application file for complete search history.

(56) References Cited

U.S. PATENT DOCUMENTS

| | | | | |
|---|---|---|---|---|
| 5,457,235 | A * | 10/1995 | Wand | C07C 43/225 252/299.6 |
| 6,312,618 | B1 * | 11/2001 | Wu | C07C 25/24 252/299.6 |
| 10,100,252 | B2 * | 10/2018 | Okabe | G02F 1/29 |
| 2012/0205583 | A1 | 8/2012 | Montenegro et al. | |
| 2018/0239213 | A1 | 8/2018 | Akselrod et al. | |

FOREIGN PATENT DOCUMENTS

| | | |
|---|---|---|
| JP | 2004285085 | 10/2004 |
| JP | 201174074 | 4/2011 |
| WO | 2017201515 | 11/2017 |

* cited by examiner

*Primary Examiner* — Geraldina Visconti
(74) *Attorney, Agent, or Firm* — JCIPRNET

(57) ABSTRACT

There is provided a liquid crystal composition which has favorable characteristics and excellent characteristic balance as a material for an element used for phase control of an electromagnetic wave signal with a frequency of 1 MHz to 400 THz. A liquid crystal composition which contains at least one compound selected from the group consisting of compounds represented by Formula (1), and is used for phase control of an electromagnetic wave signal with a frequency of 1 MHz to 400 THz:

(1)

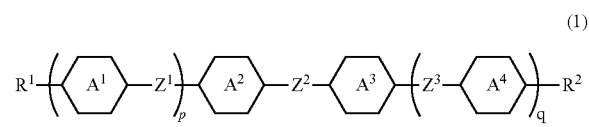

20 Claims, No Drawings

LIQUID CRYSTAL COMPOSITION USED FOR PHASE CONTROL OF ELECTROMAGNETIC WAVE SIGNAL

CROSS-REFERENCE TO RELATED APPLICATION

This application claims the priority of Japan patent application serial no. 2018-226262, filed on Dec. 3, 2018 and Japan application serial no. 2019-150310, filed on Aug. 20, 2019. The entirety of each of the above-mentioned patent applications is hereby incorporated by reference herein and made a part of this specification.

BACKGROUND

Technical Field

The disclosure relates to an element used for phase control of an electromagnetic wave signal with a frequency of 1 MHz to 400 THz and a liquid crystal composition used for the element. The composition has a nematic phase, and positive or negative dielectric anisotropy.

Description of Related Art

Examples of an element used for phase control of an electromagnetic wave signal with a frequency of 1 MHz to 400 THz include millimeter wave band and microwave band antennas and an infrared laser element. Various methods have been examined for such elements. Among these, a method using liquid crystal, which is thought to have few failures because there is no mechanical movable part, has been focused on.

In liquid crystals, alignment of molecules changes and a dielectric constant changes according to a bias electric field from the outside. When such a property is used, for example, it is possible to realize a microwave device that can electrically control transmission characteristics of a high frequency transmission line from the outside. Regarding such devices, a voltage-controlled millimeter wave band variable phase shifter in which a nematic liquid crystal is filled into a waveguide and a wideband variable phase shifter with a microwave and millimeter wave band in which a nematic liquid crystal is used as a dielectric substrate of a micro strip line have been reported (Patent Documents 1 and 2).

It is desirable for such elements used for phase control of an electromagnetic wave signal to have characteristics such as a wide temperature range in which the element can be used, a high gain, and low loss. Therefore, regarding characteristics of the liquid crystal composition, a high upper limit temperature of a nematic phase, a low lower limit temperature of a nematic phase, low viscosity, large optical anisotropy in a frequency range used for phase control, large dielectric anisotropy, small dielectric loss, a high specific resistance in a drive frequency range, and stability with respect to heat are required.

Compositions of the related art are disclosed in the following Patent Documents 3 and 4.

Patent Document 1: PCT International Publication No. WO 2017/201515
Patent Document 2: United States Patent Publication No. 2018/0239213
Patent Document 3: Japanese Patent Laid-Open No. 2004-285085
Patent Document 4: Japanese Patent Laid-Open No 2011-74074

SUMMARY

The disclosure provides a liquid crystal composition which has favorable required characteristics as described above and has characteristic balance as a material used for an element used for phase control of an electromagnetic wave signal with a frequency of 1 MHz to 400 THz.

The disclosure includes the following aspects.

[1] A liquid crystal composition which includes at least one compound selected from the group consisting of compounds represented by Formula (1) as a first component, and is used for phase control of an electromagnetic wave signal with a frequency of 1 MHz to 400 THz:

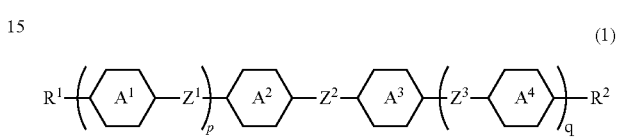

in Formula (1), $R^1$ represents an alkyl group having 1 to 12 carbon atoms, an alkoxy group having 1 to 12 carbon atoms, an alkylthio group having 1 to 12 carbon atoms, an alkenyl group having 2 to 12 carbon atoms, or an alkenyloxy group having 2 to 12 carbon atoms, and one, two, or more of $CH_2$'s present in the alkyl group, the alkoxy group, the alkylthio group, the alkenyl group or the alkenyloxy group may be substituted with —O—, —CO—, or —COO— in which O atoms are not directly bonded to each other, and $R^2$ represents $R^1$, —CN, —F, —Cl, —CF$_3$, —OCF$_3$, —CF$_2$H, —OCF$_2$H, —NCS, —SF$_5$, or —NO$_2$; and the ring $A^1$, the ring $A^2$, the ring $A^3$, and the ring $A^4$ independently represent a group represented by any of the following Formulae (I) to (XV), and at least one of the ring $A^2$ and the ring $A^3$ is a group represented by any of Formulae (I) to (XII);

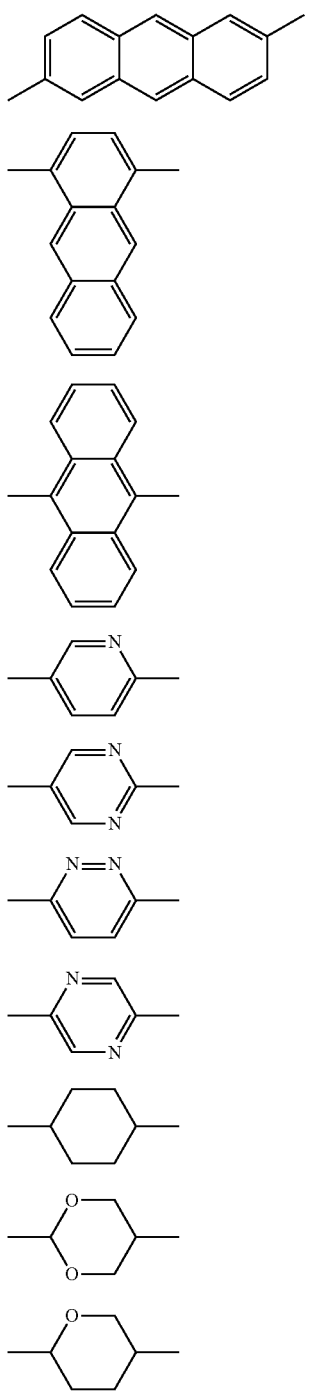

in groups of Formulae (I) to (XII), at least one hydrogen atom is optionally substituted with —CH$_3$, —CH$_2$CH$_3$, —CH$_2$CH$_2$CH$_3$, —OCH$_3$, —OCH$_2$CH$_3$, —SCH$_3$, or —F; and Z$^1$ and Z$^3$ independently represent a single bond, —CH$_2$CH$_2$—, —CF$_2$O—, —CH$_2$O—, —CH=CH—, —CF=CF—, —CH=CF—, —C≡C—, —C≡C—C≡C—, —COO—, —CH$_2$—, —O—, or —CO—, and Z$^2$ represents —C≡C—C≡C—; and p and q independently represent 0, 1, or 2, and when p and q are 2, the plurality of rings A$^1$, Z$^1$, Z$^3$, and rings A$^4$ may be the same as or different from each other.

[2] The liquid crystal composition according to [1], including 95 weight % to 10 weight % of at least one compound selected from the group consisting of compounds represented by Formula (1) with respect to a total weight of the composition, and including 5 weight % to 90 weight % of at least one compound selected from the group consisting of compounds represented by Formula (2) as a second component with respect to a total weight of the composition:

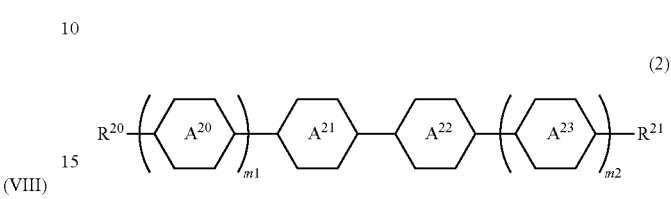

(2)

in Formula (2), the ring A$^{20}$ and the ring A$^{23}$ independently represent 1,4-cyclohexylene, 1,4-phenylene, 2,6-naphthylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl, and the ring A$^{21}$ and the ring A$^{22}$ independently represent 1,4-phenylene, 2,6-naphthylene, 2-fluoro-1,4-phenylene, 2-methyl-1,4-phenylene, 2,5-difluoro-1,4-phenylene, or 2,6-difluoro-1,4-phenylene;

m1 and m2 independently represent 0, 1, or 2, and when m1 and m2 are 2, the plurality of rings A$^{20}$ and rings A$^{23}$ may be the same as or different from each other; and R$^{20}$ represents an alkyl group having 1 to 12 carbon atoms, an alkoxy group having 1 to 12 carbon atoms, or an alkenyl group having 2 to 12 carbon atoms, and R$^{21}$ represents R$^{20}$, —CN, —F, —Cl, —CF$_3$, —OCF$_3$, —CF$_2$H, —OCF$_2$H, —NCS, or —SF$_5$.

[3] The liquid crystal composition according to [1], including 95 weight % to 10 weight % of at least one compound selected from the group consisting of compounds represented by Formula (1) with respect to a total weight of the composition, and including 5 weight % to 90 weight % of at least one compound selected from the group consisting of compounds represented by Formula (3) as a second component with respect to a total weight of the composition:

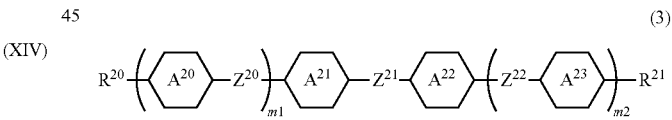

(3)

in Formula (3), the ring A$^{20}$ and the ring A$^{23}$ independently represent 1,4-cyclohexylene, 1,4-phenylene, 2,6-naphthylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl, and the ring A$^{21}$ and the ring A$^{22}$ independently represent 1,4-phenylene, 2,6-naphthylene, 2-fluoro-1,4-phenylene, 2,5-difluoro-1,4-phenylene, or 2,6-difluoro-1,4-phenylene;

Z$^{20}$ and Z$^{22}$ independently represent a single bond, —CH$_2$CH$_2$—, —CH$_2$O—, —CH=CH—, —CF=CF—, —CH=CF—, —C≡C—, —COO—, —CH$_2$—, —O—, or —CO—, and Z$^{21}$ represents —C≡C—;

m1 and m2 independently represent 0, 1, or 2, and when m1 and m2 are 2, the plurality of rings A$^{20}$, rings A$^{23}$, Z$^{20}$'s, and Z$^{22}$'s may be the same as or different from each other; and $R^{20}$ represents an alkyl group having 1 to 12 carbon atoms, an alkoxy group having 1 to 12 carbon atoms, or an alkenyl group having 2 to 12 carbon atoms, and $R^{21}$ represents $R^{20}$, —CN, —F, —Cl, —CF$_3$, —OCF$_3$, —CF$_2$H, —OCF$_2$H, —NCS, or —SF$_5$.

[4] The liquid crystal composition according to [1], including 95 weight % to 10 weight % of at least one compound selected from the group consisting of compounds represented by Formula (1) with respect to a total weight of the composition, and including 5 weight % to 90 weight % of at least one compound selected from the group consisting of compounds represented by Formula (4) as a second component with respect to a total weight of the composition:

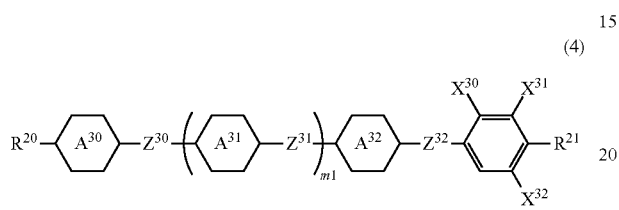

(4)

in Formula (4), the ring $A^{30}$, the ring $A^{31}$ and the ring $A^{32}$ independently represent 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl; and $Z^{30}$, $Z^{31}$, and $Z^{32}$ independently represent a single bond, —CH$_2$CH$_2$—, —CH=CH—, —CH$_2$O—, —COO—, —CF$_2$CF$_2$—, —C≡C—, or —CF$_2$O—, and at least one of $Z^{30}$, $Z^{31}$, and $Z^{32}$ represents —CF$_2$O—; and $X^{30}$, $X^{31}$, and $X^{32}$ independently represent a hydrogen atom or a fluorine atom;

when m1 is 0, 1, or 2, and m1 is 2, the plurality of rings $A^{31}$ and $Z^{31}$ may be the same as or different from each other;

$R^{20}$ represents an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

[5] The liquid crystal composition according to [2], including at least one compound selected from the group consisting of compounds represented by Formula (2-1) to Formula (2-32) as a second component:

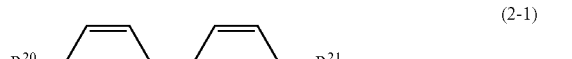

(2-1)

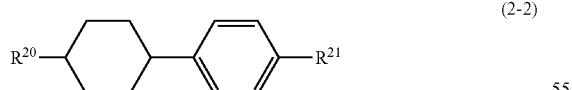

(2-2)

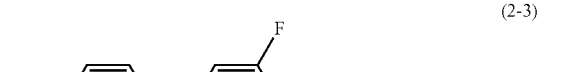

(2-3)

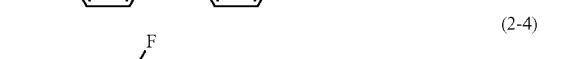

(2-4)

-continued

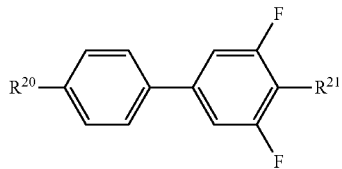

(2-5)

(2-6)

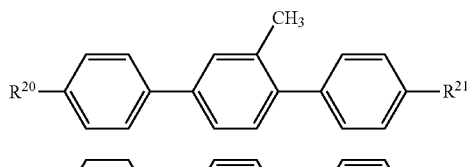

(2-7)

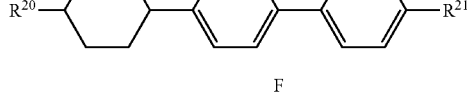

(2-8)

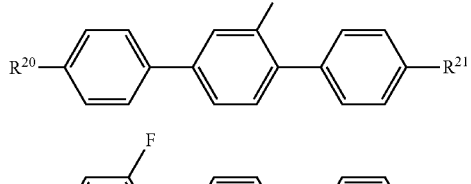

(2-9)

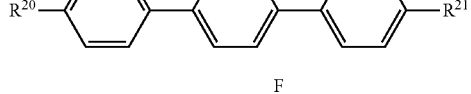

(2-10)

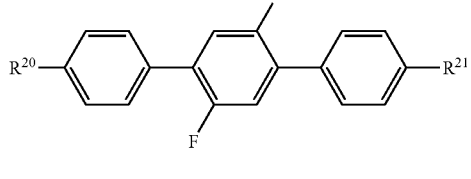

(2-11)

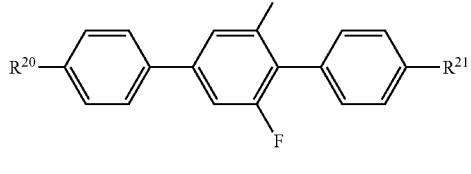

(2-12)

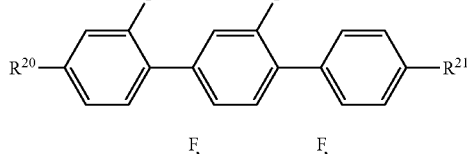

(2-13)

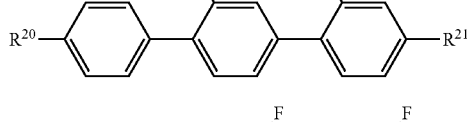

(2-14)

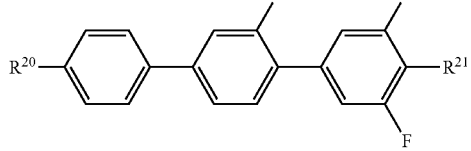

(2-15)

(2-16) 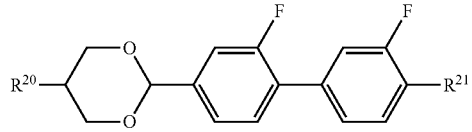

(2-17) 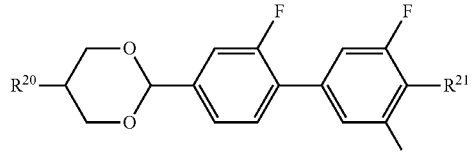

(2-18) 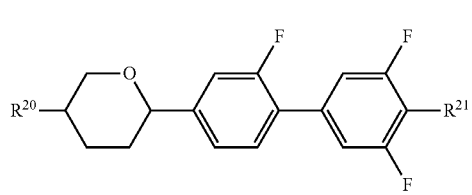

(2-19) 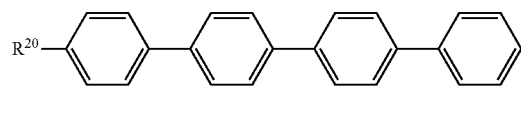

(2-20) 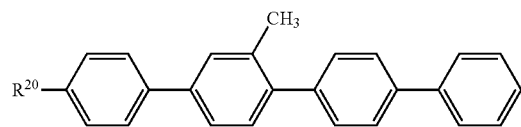

(2-21) 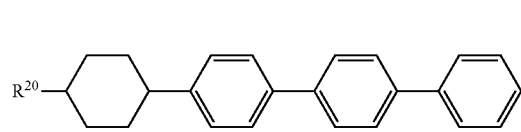

(2-22) 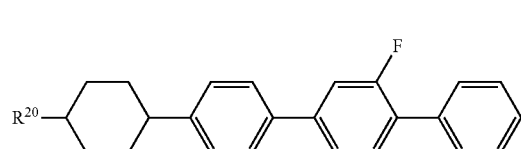

(2-23) 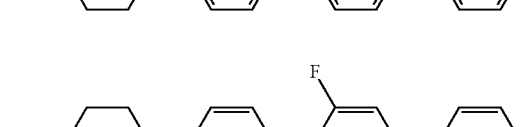

(2-24) 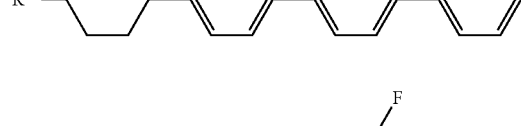

(2-25) 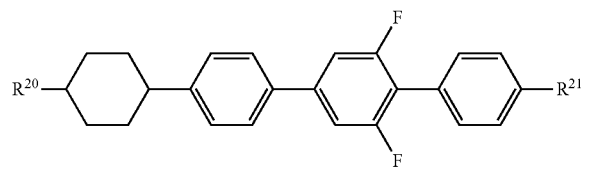

(2-26) 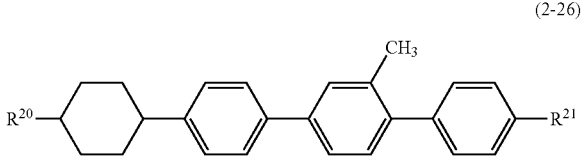

(2-27) 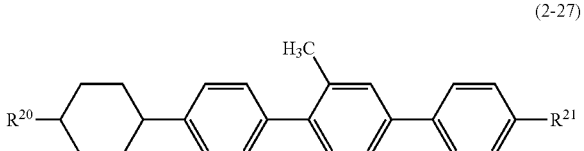

(2-28) 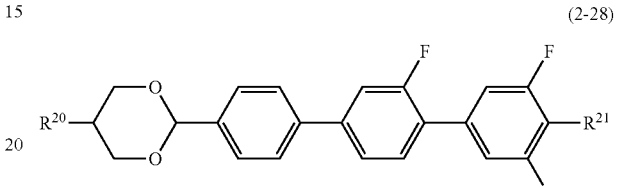

(2-29) 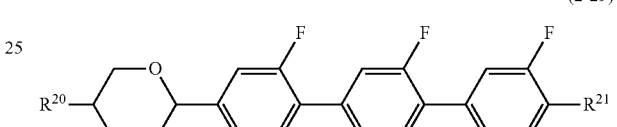

(2-30) 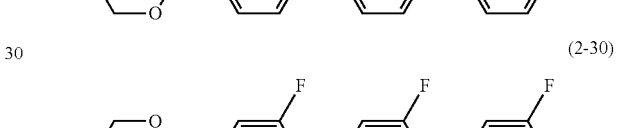

(2-31) 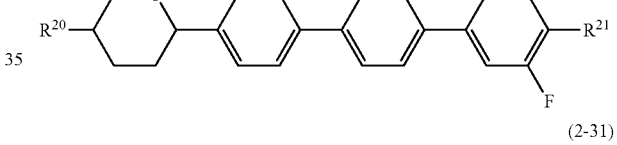

(2-32) 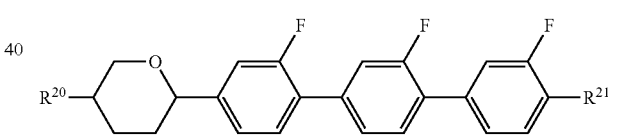

in these formulae, $R^{20}$ represents an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

[6] The liquid crystal composition according to [3], including at least one compound selected from the group consisting of compounds represented by Formula (3-1) to Formula (3-14) as a second component:

(3-1) 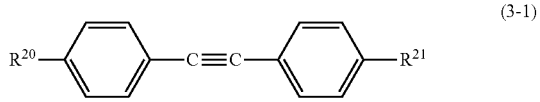

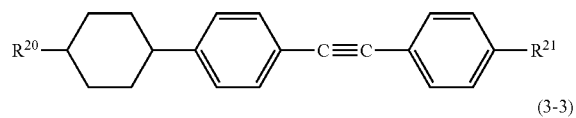 (3-2)

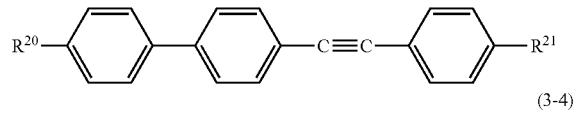 (3-3)

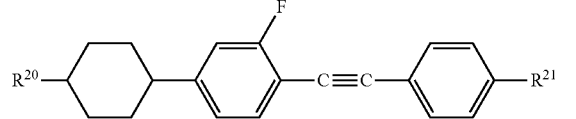 (3-4)

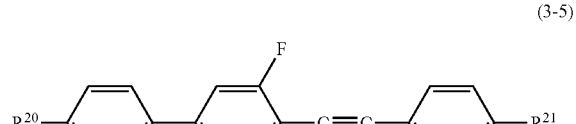 (3-5)

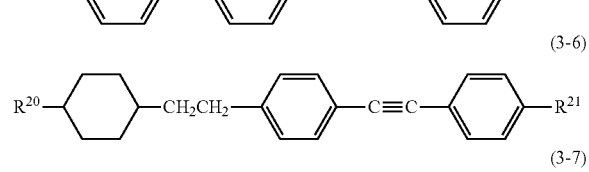 (3-6)

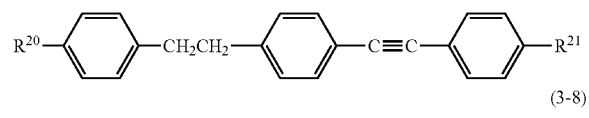 (3-7)

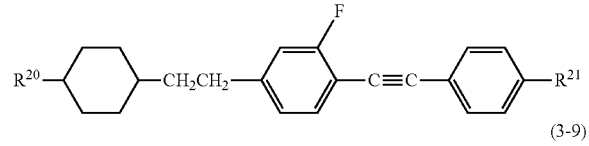 (3-8)

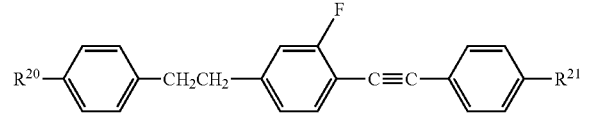 (3-9)

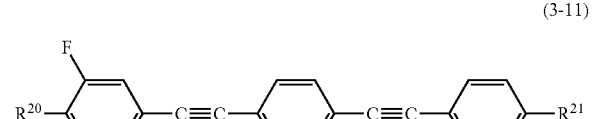 (3-10)

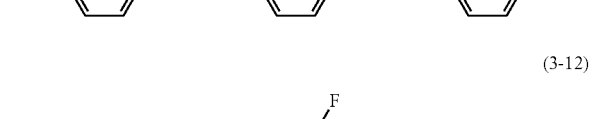 (3-11)

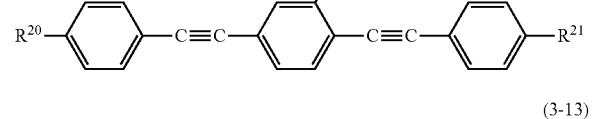 (3-12)

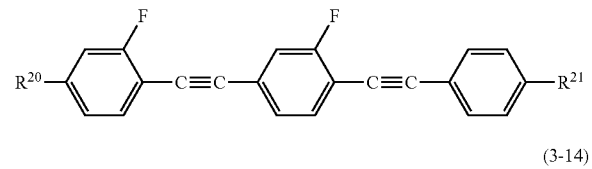 (3-13)

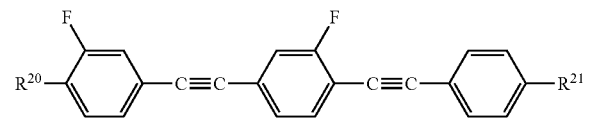 (3-14)

in these formulae, $R^{20}$ represents an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

[7] The liquid crystal composition according to [4], including at least one compound selected from the group consisting of compounds represented by Formula (4-1) to Formula (4-15) as a second component:

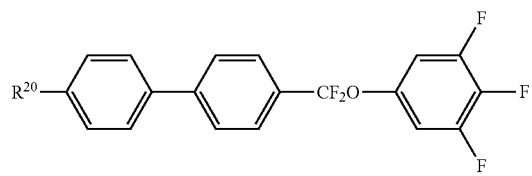 (4-1)

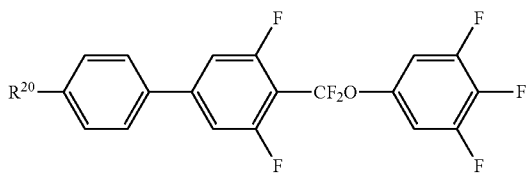 (4-2)

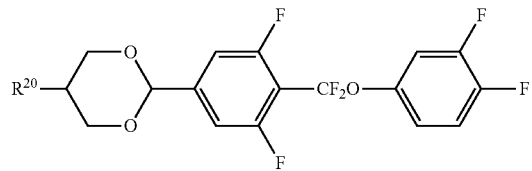 (4-3)

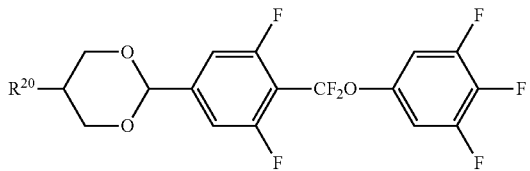 (4-4)

-continued
(4-5)
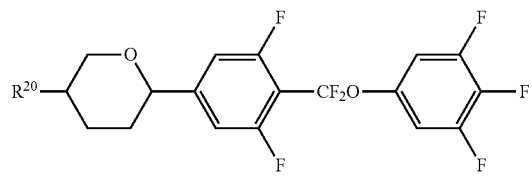
(4-6)
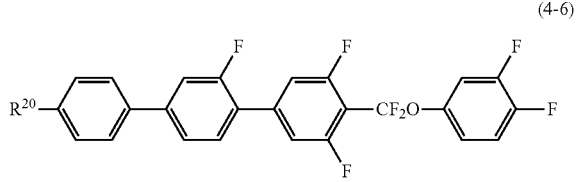
(4-7)
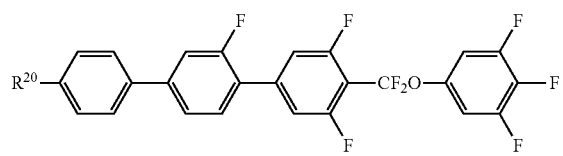
(4-8)
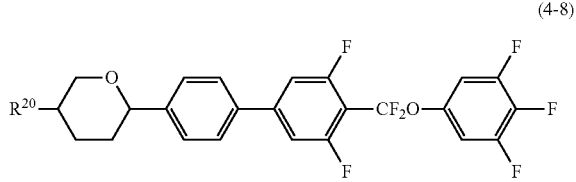
(4-9)
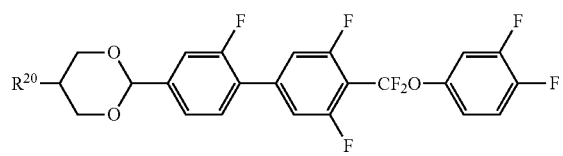
(4-10)
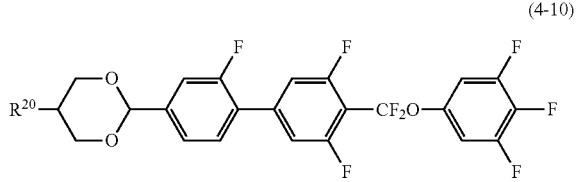
(4-11)
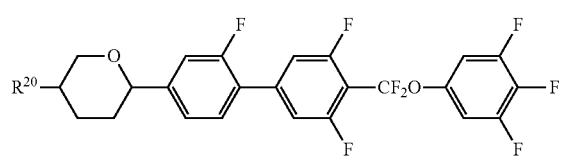
(4-12)
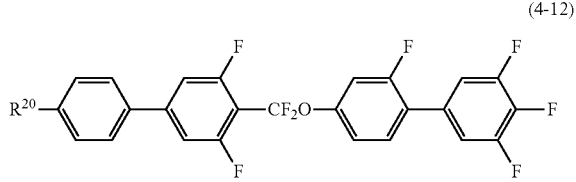
(4-13)
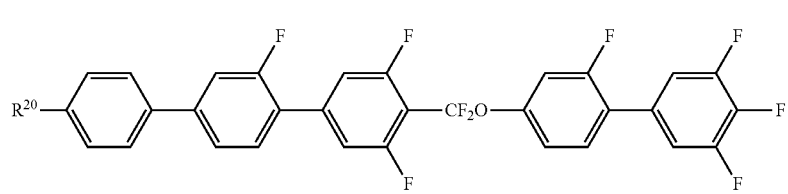
(4-14)
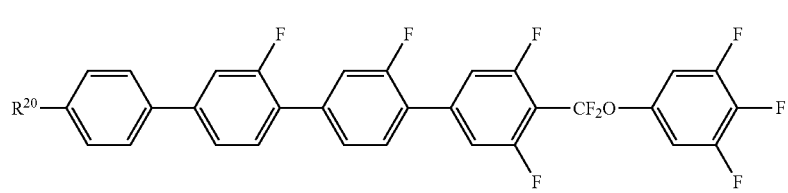
(4-15)
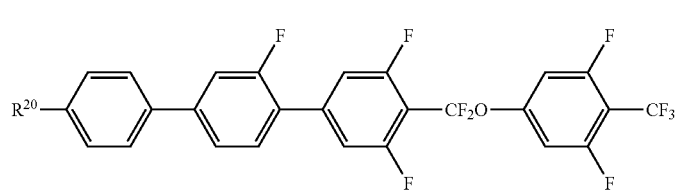

in these formulae, $R^{20}$ represents an alkyl group having 1 to 12 carbon atoms, an alkoxy group having 1 to 12 carbon atoms, or an alkenyl group having 2 to 12 carbon atoms.

[8] The liquid crystal composition according to [4], including at least one compound selected from the group consisting of compounds represented by Formula (4-16) to Formula (4-26) as a second component:

in the compounds represented by Formulae (2-1) to (2-32), a proportion of a compound in which $R^{21}$ represents —CN, —F, —Cl, —CF$_3$, —OCF$_3$, —CF$_2$H, —OCF$_2$H, —NCS, or —SF$_5$ is in a range of 5 weight % to 80 weight %, and in the compounds represented by Formula (3-1) to Formula (3-14), a proportion of a compound in which $R^{21}$ represents an alkyl group having 1 to 12 carbon atoms, an alkoxy group having

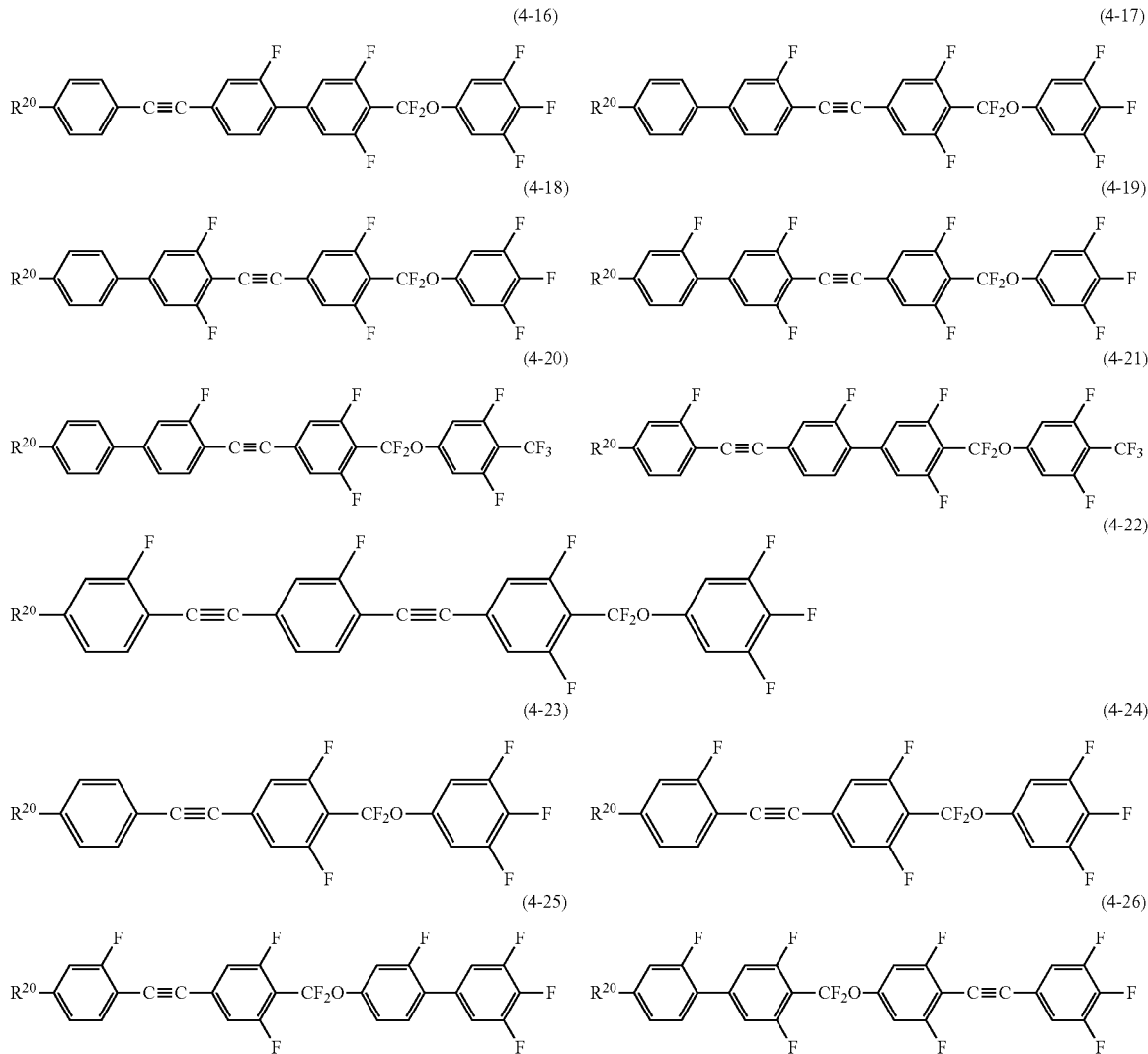

in these formulae, $R^{20}$ represents an alkyl group having 1 to 12 carbon atoms, an alkoxy group having 1 to 12 carbon atoms, or an alkenyl group having 2 to 12 carbon atoms.

[9] The liquid crystal composition according to [5],
wherein, based on the weight of the liquid crystal composition, proportion of the compound represented by Formula (1) is in a range of 10 weight % to 90 weight %, and in the compounds represented by Formulae (2-1) to (2-32), a proportion of a compound in which $R^{21}$ represents —CN, —F, —Cl, —CF$_3$, —OCF$_3$, —CF$_2$H, —OCF$_2$H, —NCS, or —SF$_5$ is in a range of 10 weight % to 90 weight %.

[10] The liquid crystal composition according to [5] or [6],
wherein, based on the weight of the liquid crystal composition, a proportion of the compound represented by Formula (1) is in a range of 10 weight % to 90 weight %, and 1 to 12 carbon atoms, or an alkenyl group having 2 to 12 carbon atoms is in a range of 5 weight % to 80 weight %.

[11] The liquid crystal composition according to [7],
wherein, based on the weight of the liquid crystal composition, a proportion of the compound represented by Formula (1) is in a range of 10 weight % to 90 weight %, and a proportion of the compound represented by Formula (4-1) to Formula (4-15) is in a range of 10 weight % to 90 weight %.

[12] The liquid crystal composition according to [8],
wherein, based on the weight of the liquid crystal composition, a proportion of the compound represented by Formula (1) is in a range of 10 weight % to 90 weight %, and a proportion of the compound represented by Formula (4-16) to Formula (4-26) is in a range of 10 weight % to 90 weight %.

[13] The liquid crystal composition according to [5] or [6], wherein, based on the weight of the liquid crystal composition, a proportion of the compound represented by Formula (1) is in a range of 10 weight % to 90 weight %, and in the compounds represented by Formulae (2-1) to (2-32), a proportion of a compound in which $R^{21}$ represents —CN, —F, —Cl, —CF$_3$, —OCF$_3$, —CF$_2$H, —OCF$_2$H, —NCS, or —SF$_5$ is in a range of 5 weight % to 80 weight %, and a proportion of the compound represented by Formula (3-1) to Formula (3-14) is in a range of 5 weight % to 80 weight %.

[14] The liquid crystal composition according to [6] or [7], wherein, based on the weight of the liquid crystal composition, a proportion of the compound represented by Formula (1) is in a range of 10 weight % to 90 weight %, and in the compounds represented by Formula (3-1) to Formula (3-14), a proportion of a compound in which $R^{21}$ represents an alkyl group having 1 to 12 carbon atoms, an alkoxy group having 1 to 12 carbon atoms, or an alkenyl group having 2 to 12 carbon atoms is in a range of 5 weight % to 80 weight %, and a proportion of the compound represented by Formula (4-1) to Formula (4-15) is in a range of 5 weight % to 80 weight %.

[15] The liquid crystal composition according to [6] or [8], wherein, based on the weight of the liquid crystal composition, a proportion of the compound represented by Formula (1) is in a range of 10 weight % to 90 weight %, and in the compounds represented by Formula (3-1) to Formula (3-14), a proportion of a compound in which $R^{21}$ represents an alkyl group having 1 to 12 carbon atoms, an alkoxy group having 1 to 12 carbon atoms, or an alkenyl group having 2 to 12 carbon atoms is in a range of 5 weight % to 80 weight %, and a proportion of the compound represented by Formula (4-16) to Formula (4-26) is in a range of 5 weight % to 80 weight %.

[16] The liquid crystal composition according to any one of [1] to [4], wherein, based on the weight of the liquid crystal composition, a proportion of a liquid crystal compound other than components selected from among Formula (2), Formula (3), and Formula (4) is in a range of 1 weight % to 20 weight %.

[17] The liquid crystal composition according to any one of [1] to [16], wherein a refractive index anisotropy (measured at 25° C.) at a wavelength of 589 nm is in a range of 0.18 to 0.35, and a dielectric anisotropy (measured at 25° C.) at a frequency of 1 kHz is in a range of 7 to 40.

[18] The liquid crystal composition according to any one of [1] to [16], wherein a refractive index anisotropy (measured at 25° C.) at a frequency of 50 GHz is in a range of 0.15 to 0.40.

[19] The liquid crystal composition according to any one of [1] to [18], including an acrylic monomer.

[20] The liquid crystal composition according to any one of [1] to [19], including a photopolymerization initiator.

[21] The liquid crystal composition according to any one of [1] to [20], including an optically active compound.

[22] An element which includes the liquid crystal composition according to any one of [1] to [21] and is used for phase control of an electromagnetic wave signal with a frequency of 1 MHz to 400 THz.

DESCRIPTION OF THE EMBODIMENTS

The inventors found that a liquid crystal composition containing a liquid crystal compound having a specific structure solves the above problems and completed the disclosure.

The liquid crystal composition of the disclosure may be abbreviated as a "composition." In the element of the disclosure, the phase in the "composition" may include not only a nematic phase but also other liquid crystal phases and isotropic liquid. When used as an element, the phase may be a liquid crystal phase, and a nematic phase is preferable.

Examples of an element used for phase control of an electromagnetic wave signal with a frequency of 1 MHz to 400 THz include a millimeter wave band variable phase shifter and a light detection and ranging (LiDAR) element.

A "liquid crystalline compound" refers to a compound having a liquid crystal phase such as a nematic phase and a smectic phase, or a compound that has no liquid crystal phase but is beneficial as a component of a composition. This beneficial compound contains a 6-membered ring such as 1,4-cyclohexylene and 1,4-phenylene and has a linear molecular structure. An optically active compound may be added to a composition. Even if this compound is a liquid crystalline compound, it is classified as an additive here.

An upper limit temperature of a nematic phase may be abbreviated as an "upper limit temperature." A lower limit temperature of a nematic phase may be abbreviated as a "lower limit temperature."

The expression "a specific resistance is high" means that a composition has a high specific resistance not only at room temperature in an initial stage but also at a high temperature, and after it is used for a long time, it has a high specific resistance not only at room temperature but also at a high temperature. Values measured in methods described in examples are used to explain characteristics such as optical anisotropy. A "proportion of a first component" refers to a weight percentage (weight %) based on the total weight of the liquid crystalline compound. This similarly applies to a proportion of a second component. A proportion of an additive mixed into the composition refers to a weight percentage (weight %) based on the total weight of the liquid crystalline compound.

A compound of Formula (1) which is a first component of the disclosure will be described in more detail. Stability with respect to ultraviolet (UV) light of a compound in which $Z^2$ in Formula (1) represents —C≡C—C≡C— of the disclosure tends to be inferior to, for example, that of a compound in which $Z^2$ represents a single bond. Therefore, it is difficult to put a composition including this compound into practical use for display applications when UV light or visible light close to UV light is used. However, since the compound of Formula (1) of the disclosure has large refractive index anisotropy, a composition including the same is suitably used for phase control applications for an electromagnetic wave signal with lower energy than UV light and visible light and a frequency of 1 MHz to 400 THz.

In this case, in order to extend a liquid crystal temperature range or improve the response speed while the optical anisotropy of the composition is maintained, an alkyl group, an alkoxy group, or an alkenyl group is preferably selected as $R^2$ in the compound of Formula (1). Regarding $R^1$ and $R^2$ in the compound of General Formula (1), in order to extend a temperature range of a nematic phase of the composition, a preferable alkyl group is a methyl, ethyl, propyl, butyl, pentyl, hexyl, heptyl, or octyl group. In order to lower the viscosity, a more preferable alkyl group is an ethyl, propyl, butyl, pentyl, or heptyl group.

Regarding $R^1$ and $R^2$ in the compound of Formula (1), in order to extend a temperature range of a nematic phase of the composition, a preferable alkoxy group is a methoxy, ethoxy, propoxy, butoxy, pentyloxy, hexyloxy, or heptyloxy group. In order to lower the viscosity, a more preferable alkoxy group is a methoxy or ethoxy group.

Regarding $R^1$ and $R^2$ in the compound of Formula (1), in order to extend a temperature range of a nematic phase of the composition, a preferable alkenyl group is a vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl group. In order to lower the viscosity, a more preferable alkenyl group is a vinyl, 1-propenyl, 3-butenyl, or 3-pentenyl group. A preferable configuration of —CH=CH— in these alkenyl groups depends on the position of a double bond. In order to lower the viscosity, trans is preferable in the alkenyl group such as 1-propenyl, 1-butenyl, 1-pentenyl, 1-hexenyl, 3-pentenyl, and 3-hexenyl groups. Cis is preferable in the alkenyl group such as 2-butenyl, 2-pentenyl, and 2-hexenyl groups. In these alkenyl groups, a linear alkenyl group is preferable to a branched alkenyl group.

Regarding $R^2$, in order to improve the dielectric anisotropy while the optical anisotropy of the composition is maintained, —CN, —NCS, and —NO$_2$ are preferably selected, and —CN and —NCS are more preferably selected. In addition, regarding $R^2$, in order to improve the dielectric anisotropy while the response speed of the element is maintained, —F, —CF$_3$, —OCF$_3$, —CF$_2$H, —OCF$_2$H, and —SF$_5$ are preferably selected, and —F, —CF$_3$, and —OCF$_3$ are more preferably selected.

Regarding p and q in Formula (1), in order to increase the upper limit temperature of the composition, p+q>2 is preferable. In order to lower the lower limit temperature of the composition and increase the response speed, p+q<1 is preferable, and p+q=0 is more preferable.

$Z^1$ and $Z^3$ independently represent a single bond, —CH$_2$CH$_2$—, —CF$_2$O—, —CH$_2$O—, —CH=CH—, —CF=CF—, —CH=CF—, —C≡C—, —C≡C—C≡C—, —COO—, —CH$_2$—, —O—, or —CO—. Regarding $Z^1$ and $Z^3$, in order to increase the optical anisotropy of the composition, a single bond, —CH=CH—, —CF=CF—, —CH=CF—, —C≡C—, or —C≡C—C≡C— is preferably selected, and in order to prevent deterioration of a material over time and reduce costs, a single bond or —C≡C— is more preferably selected.

The ring $A^1$, the ring $A^2$, the ring $A^3$, and the ring $A^4$ independently represent groups represented by Formula (I) to Formula (XV). In this case, in order to increase the optical anisotropy and dielectric anisotropy, groups represented by Formula (I) to Formula (VII) are preferably selected. In these ring structures, in order to improve the response speed of the element, groups represented by Formula (I), Formula (II), and Formula (VI) are preferably selected. In addition, in order to reduce dielectric loss of the element, groups represented by Formula (V), Formula (VII), and Formula (VIII) are preferably selected. In addition, in order to extend a drive temperature range of the element, groups represented by Formula (XIII), Formula (XIV), and Formula (XV) are preferably selected.

In groups of Formula (I) to Formula (XII), at least one hydrogen atom is optionally substituted with —CH$_3$, —CH$_2$CH$_3$, —CH$_2$CH$_2$CH$_3$, —OCH$_3$, —OCH$_2$CH$_3$, —SCH$_3$, or —F. Introduction of these groups is preferable in order to improve the compatibility of the composition by reducing an interaction between molecules of the compound, particularly when —CN, —NCS, and —NO$_2$ are selected as $R^2$. In this case, in order to improve the compatibility of the composition, —CH$_2$CH$_3$, —CH$_2$CH$_2$CH$_3$, —OCH$_3$, —OCH$_2$CH$_3$, and —SCH$_3$ are more preferably selected, and in order to reduce the response speed of the element, —CH$_3$ and —F are more preferably selected. On the other hand, in order to further reduce the response speed of the element, no substitution in these groups is preferable.

Regarding the compound represented by General Formula (1) of the disclosure, preferable compounds are compounds represented by the following Formula (1-1) to Formula (1-104).

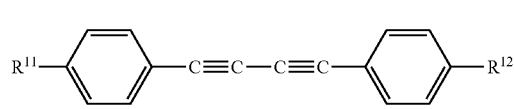

(1-1)

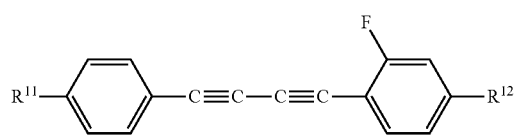

(1-2)

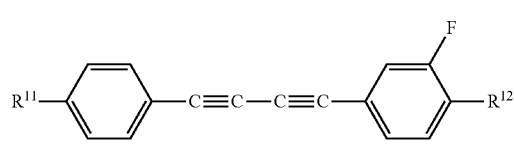

(1-3)

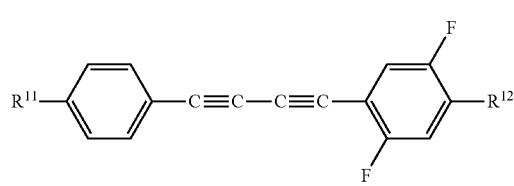

(1-4)

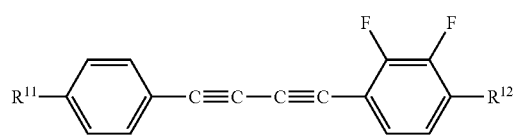

(1-5)

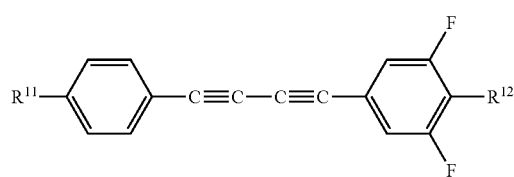

(1-6)

-continued
(1-7) 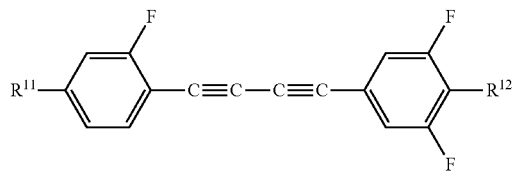
(1-8) 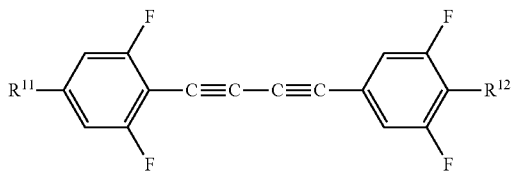
(1-9) 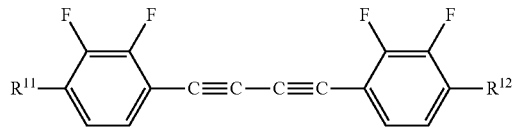
(1-10) 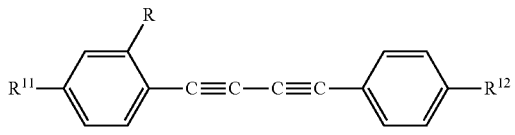
(1-11) 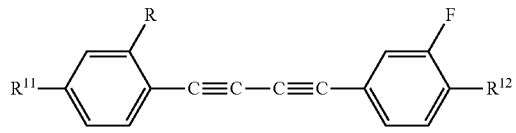
(1-12) 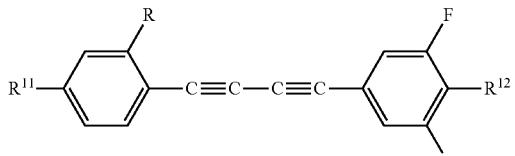
(1-13) 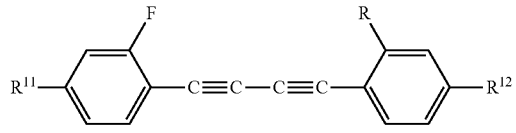
(1-14) 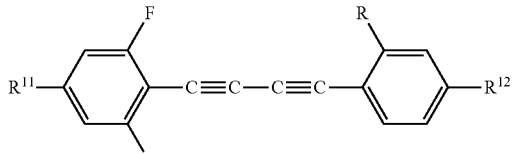
(1-15) 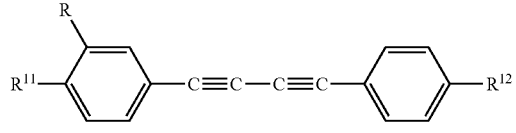
(1-16) 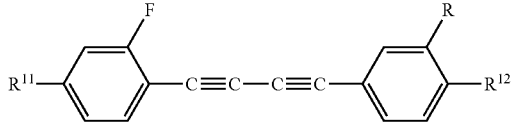
(1-17) 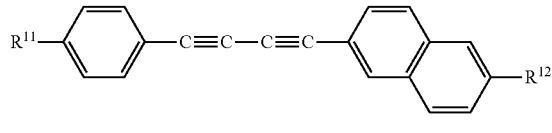
(1-18) 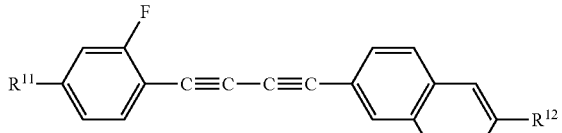
(1-19) 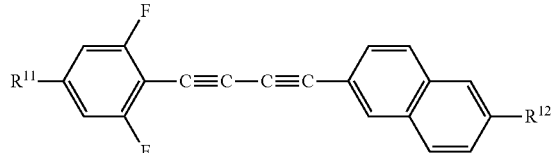
(1-20) 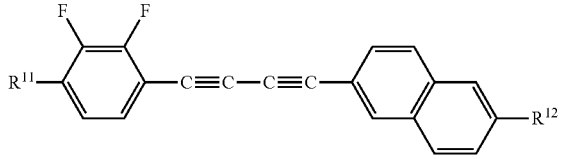
(1-21) 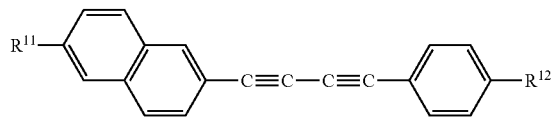
(1-22) 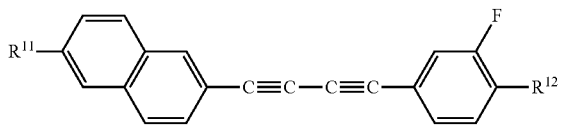
(1-23) 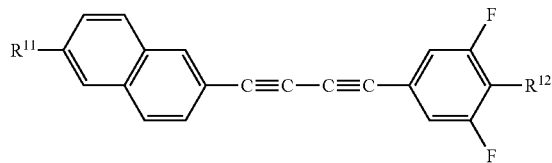
(1-24) 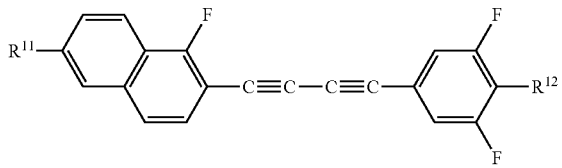

-continued
(1-25) 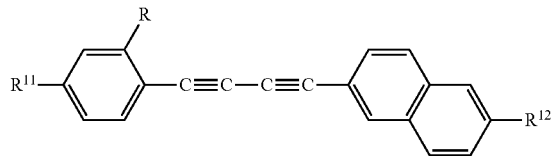
(1-26) 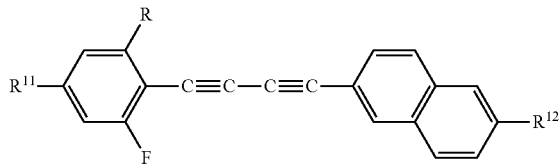
(1-27) 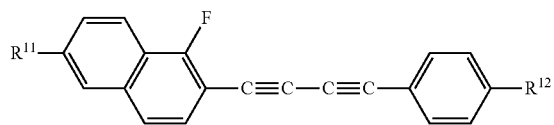
(1-28) 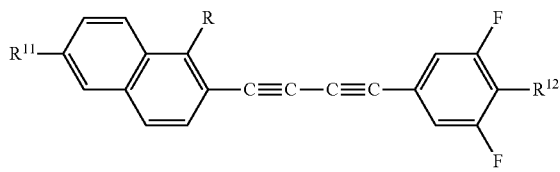
(1-29) 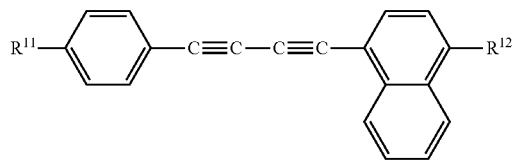
(1-30) 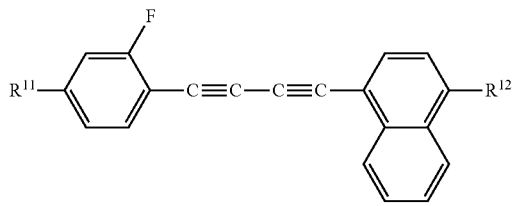
(1-31) 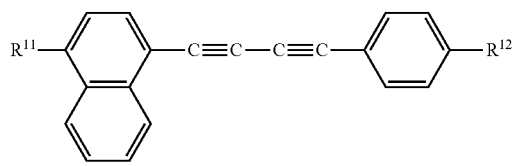
(1-32) 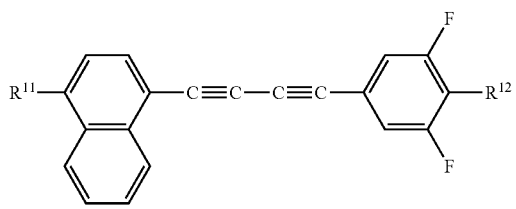
(1-33) 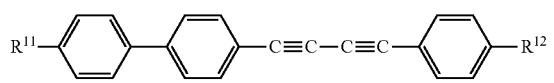
(1-34) 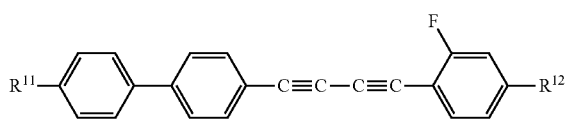
(1-35) 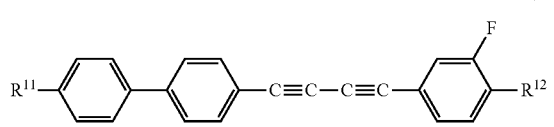
(1-36) 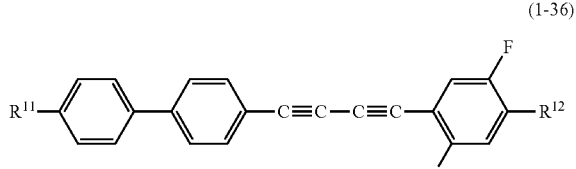
(1-37) 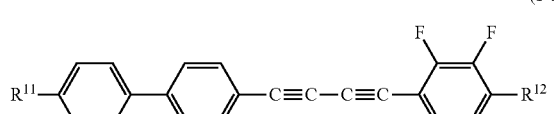
(1-38) 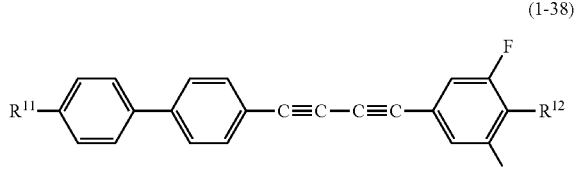
(1-39) 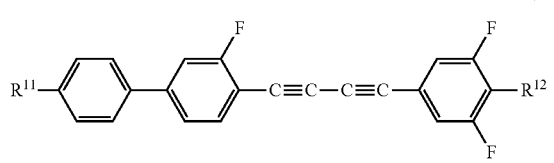
(1-40) 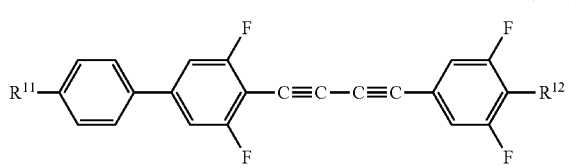

(1-41) 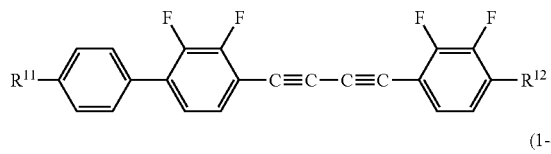
(1-42) 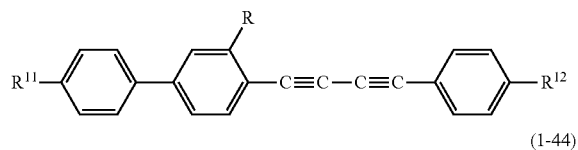
(1-43) 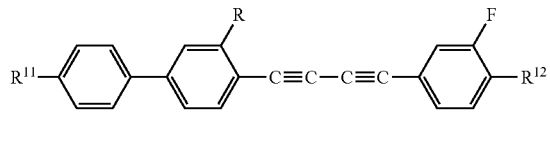
(1-44) 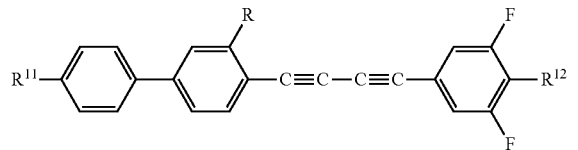
(1-45) 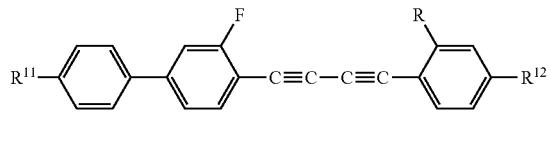
(1-46) 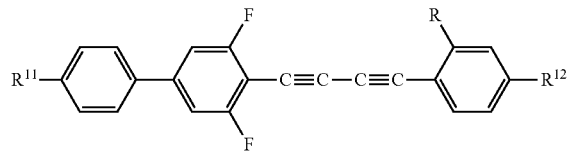
(1-47) 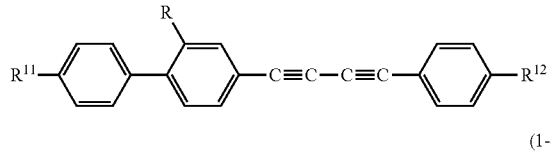
(1-48) 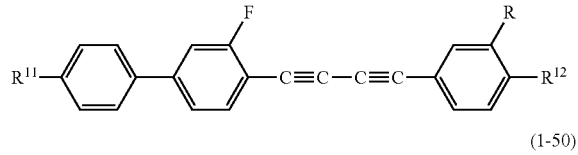
(1-49) 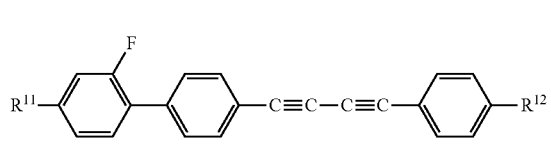
(1-50) 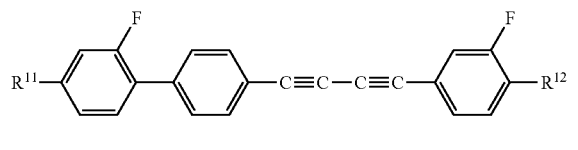
(1-51) 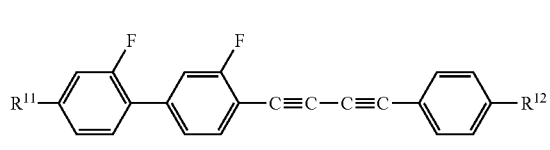
(1-52) 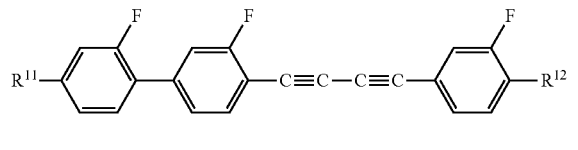
(1-53) 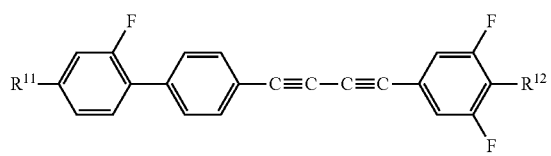
(1-54) 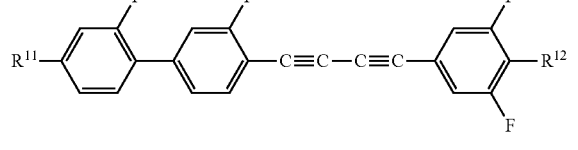
(1-55) 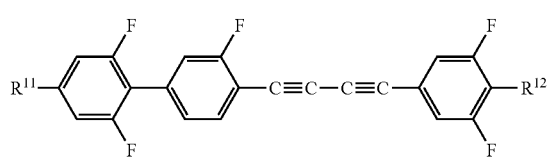
(1-56) 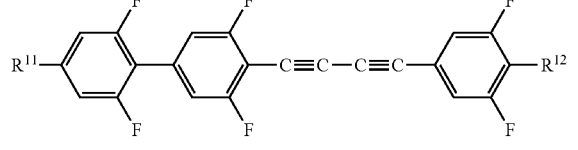
(1-57) 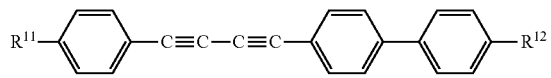
(1-58) 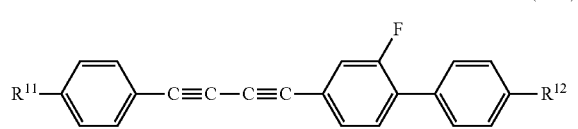

-continued
(1-59)
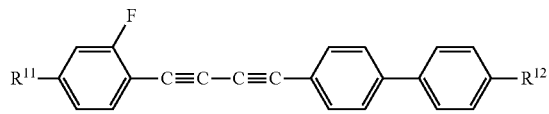
(1-60)
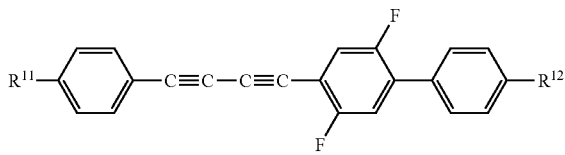
(1-61)
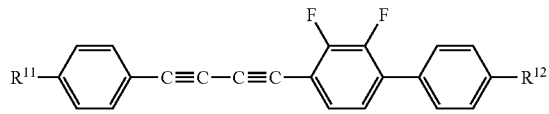
(1-62)
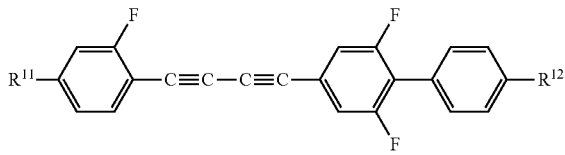
(1-63)
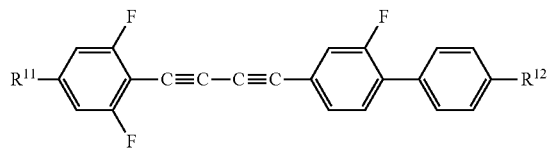
(1-64)
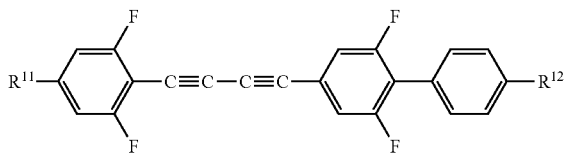
(1-65)
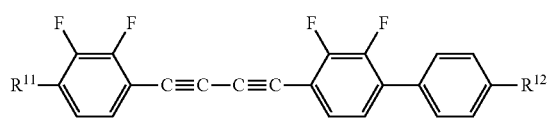
(1-66)
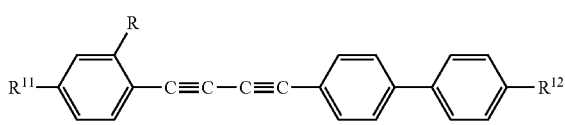
(1-67)
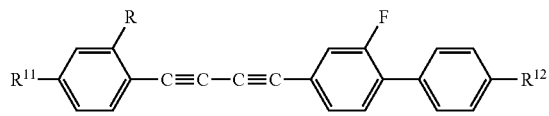
(1-68)
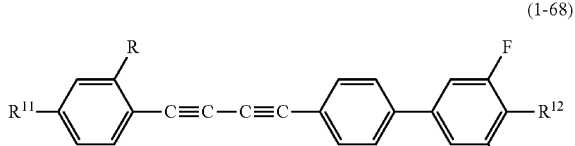
(1-69)
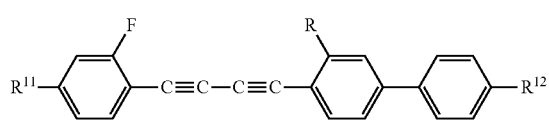
(1-70)
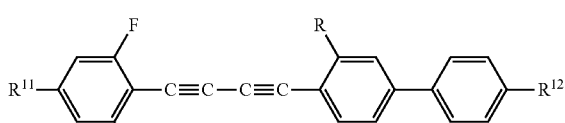
(1-71)
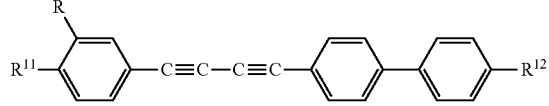
(1-72)
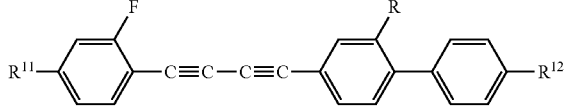
(1-73)
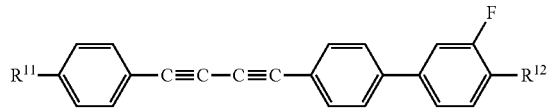
(1-74)
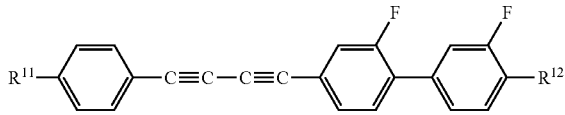
(1-75)
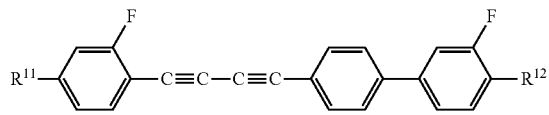
(1-76)
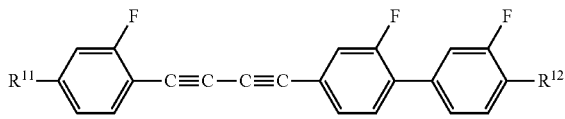

(1-77)
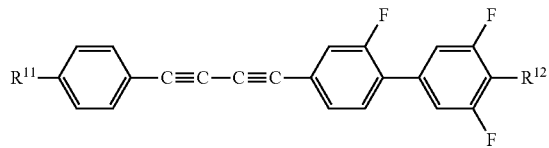
(1-78)
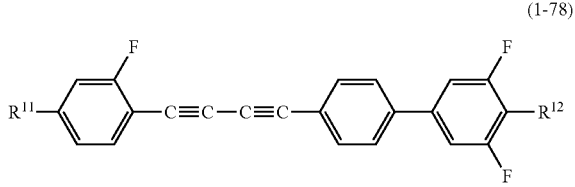
(1-79)
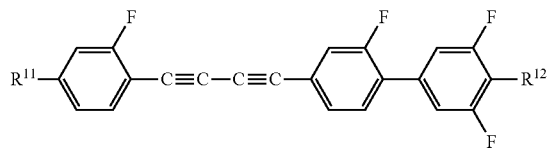
(1-80)
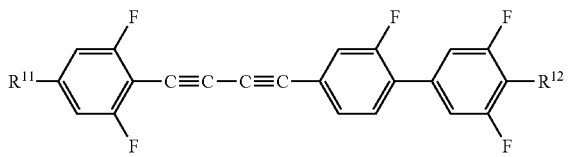
(1-81)
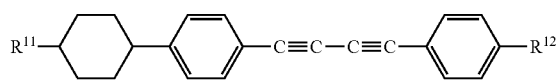
(1-82)
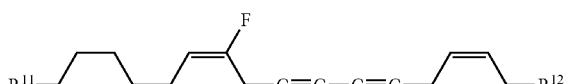
(1-83)
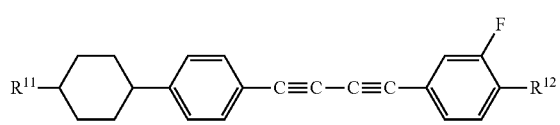
(1-84)
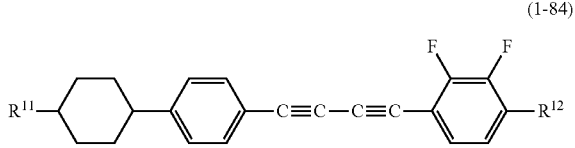
(1-85)
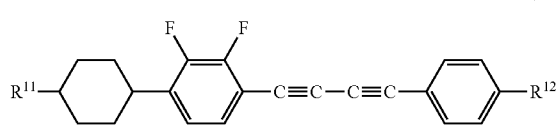
(1-86)
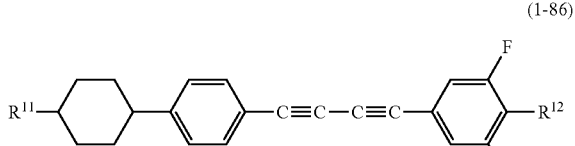
(1-87)
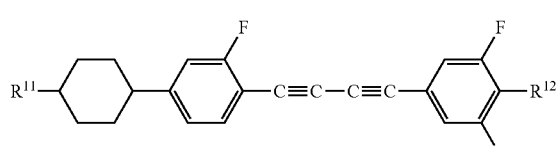
(1-88)
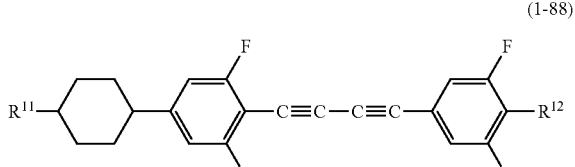
(1-89)
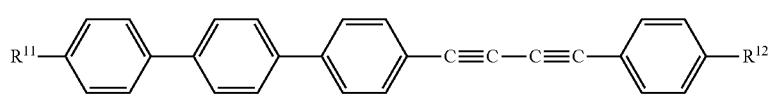
(1-90)
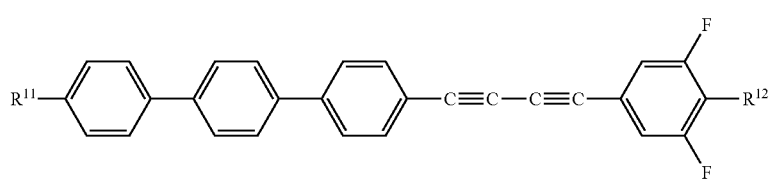
(1-91)
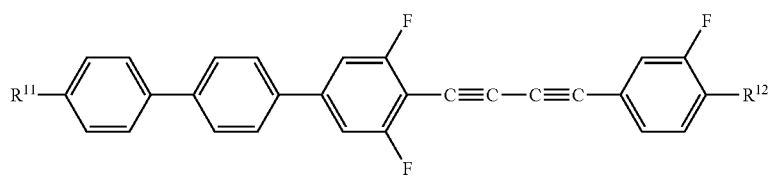

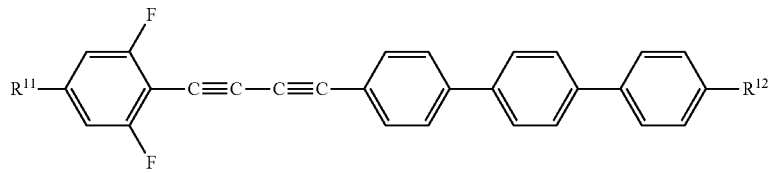 (1-92)
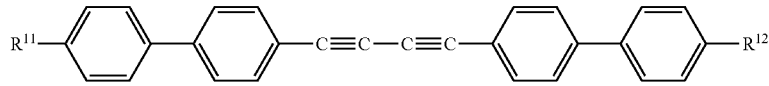 (1-93)
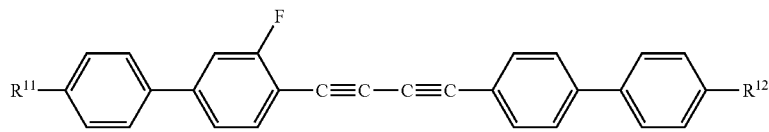 (1-94)
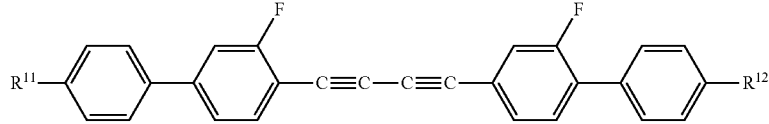 (1-95)
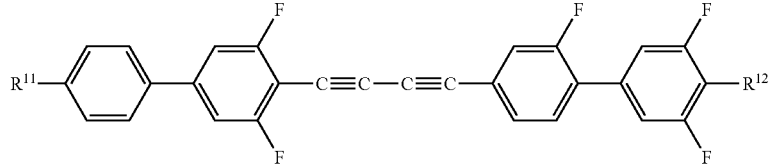 (1-96)
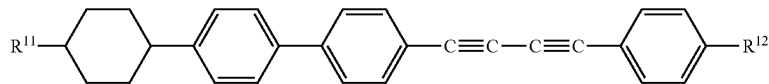 (1-97)
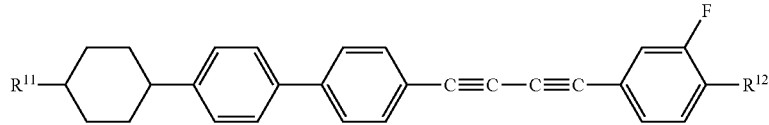 (1-98)
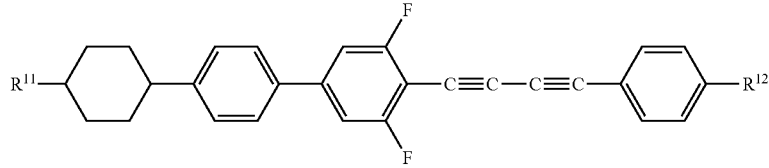 (1-99)
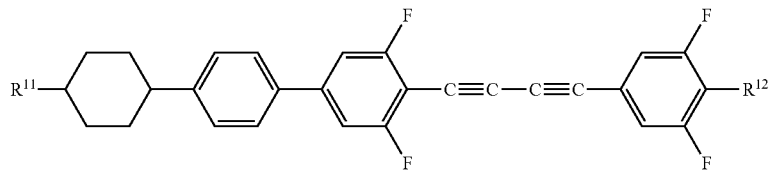 (1-100)
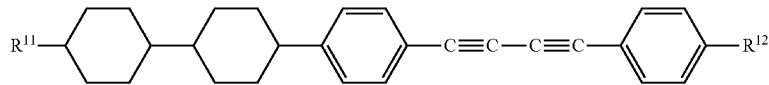 (1-101)
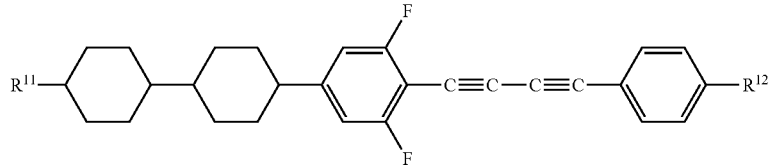 (1-102)

-continued

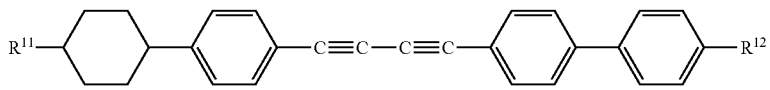

(1-103)

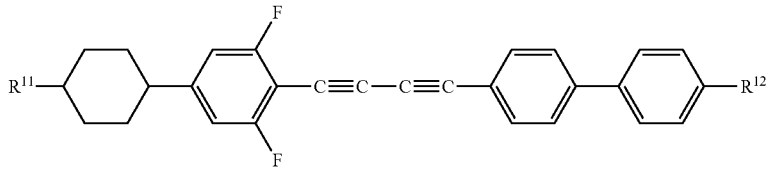

(1-104)

In the compounds represented by Formula (1-1) to Formula (1-104), $R^{11}$'s independently represent an alkyl group having 1 to 12 carbon atoms, an alkoxy group having 1 to 12 carbon atoms, an alkylthio group having 1 to 12 carbon atoms, or an alkenyl group having 2 to 12 carbon atoms; $R^{12}$ represents $R^{11}$, —CN, —F, —Cl, —CF$_3$, —OCF$_3$, —CF$_2$H, —OCF$_2$H, —NCS, —SF$_5$, or —NO$_2$; and R represents an alkyl group having 1 to 5 carbon atoms, an alkoxy group having 1 to 4 carbon atoms, or an alkenyl group having 2 to 5 carbon atoms.

In the compounds represented by Formula (1-1) to Formula (1-104), for the purpose of improving the efficiency of phase control in the element, and in order to impart larger optical anisotropy to the composition, structures of (1-1), (1-10), (1-15), (1-17), (1-21), (1-25), (1-27), (1-29), (1-31), (1-33), (1-42), (1-47), (1-57), (1-66), (1-71), (1-81), (1-89), (1-93), (1-97), (1-101), and (1-103) are preferably selected, and structures of (1-1), (1-10), (1-15), (1-17), (1-29), (1-33), (1-42), (1-47), (1-57), (1-66), (1-89), and (1-97) are more preferably selected.

In addition, regarding $R^{12}$, for the above purpose, —CN, —NCS, or —NO$_2$ is preferably selected, and —CN or —NCS is particularly preferably selected. On the other hand, when such a group is selected as $R^{12}$, an interaction between molecules is improved and the crystallinity of the compound is improved. Accordingly, the compatibility of the composition decreases and the lower limit temperature increases. In order to prevent deterioration of such characteristics, in the compounds represented by Formula (1-1) to Formula (1-104), structures of (1-10), (1-16), (1-25) to (1-28), (1-42) to (1-48), (1-66) to (1-72), (1-81) to (1-88), (1-97) to (1-104) are more preferably selected.

In the compounds represented by Formula (1-1) to Formula (1-104), for the purpose of lowering a drive voltage of the element, in order to impart larger dielectric anisotropy to the composition, structures of (1-6) to (1-8), (1-14), (1-19), (1-23), (1-24), (1-28), (1-38) to (1-40), (1-44), (1-46), (1-53) to (1-56), (1-62) to (1-64), (1-68), (1-77) to (1-80), (1-86) to (1-88), (1- 90) to (1-92), (1-96), (1-99) to (1-100), (1-102), and (1-104) are preferably selected. In addition, regarding $R^{12}$, for the above purpose, —CN, —F, —CF$_3$, —OCF$_3$, —CF$_2$H, —OCF$_2$H, —NCS, —SF$_5$, or —NO$_2$ is more preferably selected, and —CN, —F, —CF$_3$, —OCF$_3$, or —NCS is most preferably selected.

In the compounds represented by Formula (1-1) to Formula (1-104), for example, in a millimeter wave band variable phase shift element, for the purpose of maintaining the strength of waves, in order to reduce loss of the composition, structures of (1-29) to (1-32) are preferably selected.

When a content of the compound represented by General Formula (1) is 5 weight % or more, it can contribute to improving characteristics of the composition. However, in order to obtain the above desired characteristics, the content is preferably 10 weight % or more. On the other hand, the composition of the disclosure may include only the compound represented by General Formula (1), but in order to increase the lower limit temperature and increase the viscosity, 5 weight % or more of a compound other than those represented by General Formula (1) is preferably included and 10 weight % or more thereof is more preferably included.

Regarding a second component used for the composition of the disclosure, in order to obtain the above desired characteristics, compounds represented by Formula (2) to Formula (4) are preferably used.

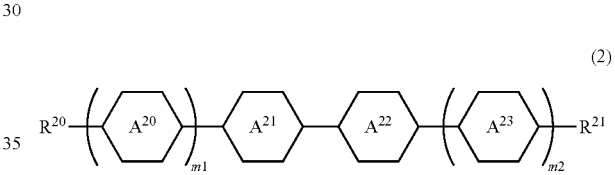

(2)

In Formula (2), the ring $A^{20}$ and the ring $A^{23}$ independently represent 1,4-cyclohexylene, 1,4-phenylene, 2,6-naphthylene, 2-fluoro-1,4-phenylene, 2-methyl-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl, and the ring $A^{21}$ and the ring $A^{22}$ independently represent 1,4-phenylene, 2,6-naphthylene, 2-fluoro-1,4-phenylene, 2-methyl-1,4-phenylene, 2,5-difluoro-1,4-phenylene, or 2,6-difluoro-1,4-phenylene;

m1 and m2 independently represent 0, 1, or 2, and when m1 and m2 are 2, the plurality of rings $A^{20}$ and rings $A^{23}$ may be the same as or different from each other; and $R^{20}$ represents an alkyl group having 1 to 12 carbon atoms, an alkoxy group having 1 to 12 carbon atoms, or an alkenyl group having 2 to 12 carbon atoms, and $R^{21}$ represents $R^{20}$, —CN, —F, —Cl, —CF$_3$, —OCF$_3$, —CF$_2$H, —OCF$_2$H, —NCS, or —SF$_5$.

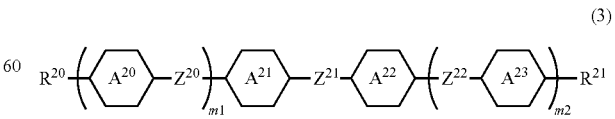

(3)

in Formula (3), the ring $A^{20}$ and the ring $A^{23}$ independently represent 1,4-cyclohexylene, 1,4-phenylene, 2,6-naphthylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl, and the ring $A^{21}$ and the ring $A^{22}$ independently represent 1,4-phenylene, 2,6-naphthylene, 2-fluoro-1,4-phenylene, 2,5-difluoro-1,4-phenylene, or 2,6-difluoro-1,4-phenylene;

$Z^{20}$ and $Z^{22}$ independently represent a single bond, —CH$_2$CH$_2$—, —CH$_2$O—, —CH=CH—, —CF=CF—, —CH=CF—, —C≡C—, —COO—, —CH$_2$—, —O—, or —CO—, and $Z^{21}$ represents —C≡C—;

m1 and m2 independently represent 0, 1, or 2, and when m1 and m2 are 2, the plurality of rings $A^{20}$, rings $A^{23}$, $Z^{20}$'s, and $Z^{22}$'s may be the same as or different from each other; and $R^{20}$ represents an alkyl group having 1 to 12 carbon atoms, an alkoxy group having 1 to 12 carbon atoms, or an alkenyl group having 2 to 12 carbon atoms, and $R^{21}$ represents $R^{20}$, —CN, —F, —Cl, —CF$_3$, —OCF$_3$, —CF$_2$H, —OCF$_2$H, —NCS, or —SF$_5$.

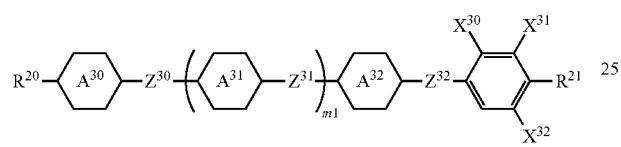

(4)

In Formula (4), the ring $A^{30}$, the ring $A^{31}$ and the ring $A^{32}$ independently represent 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl, and $Z^{30}$, $Z^{31}$, and $Z^{32}$ independently represent a single bond, —CH$_2$CH$_2$—, —CH=CH—, —CH$_2$O—, —COO—, —CF$_2$CF$_2$—, —C≡C—, or —CF$_2$O—, and at least one of $Z^{30}$, $Z^{31}$, and $Z^{32}$ represents —CF$_2$O—; and $X^{30}$, $X^{31}$, and $X^{32}$ independently represent a hydrogen atom or a fluorine atom;

when m1 is 0, 1, or 2, and m1 is 2, the plurality of rings $A^{31}$ and $Z^{31}$ may be the same as or different from each other;

$R^{20}$'s independently represent an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

Among the compounds represented by Formula (2), compounds represented by Formula (2-1) to Formula (2-32) are suitably used for the disclosure.

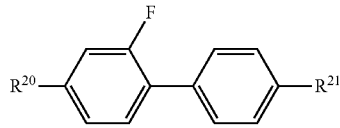
(2-1)

(2-2)

(2-3)

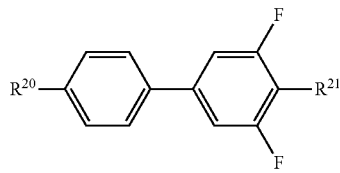
(2-4)

(2-5)

(2-6)

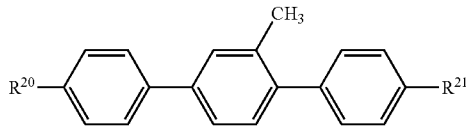
(2-7)

(2-8)

(2-9)

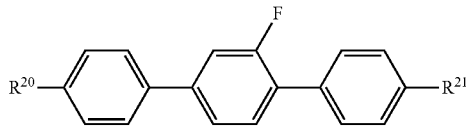
(2-10)

(2-11)

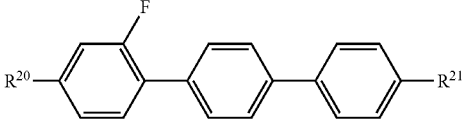
(2-12)

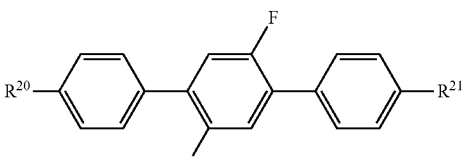
(2-13)

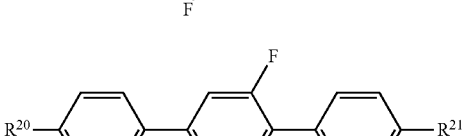

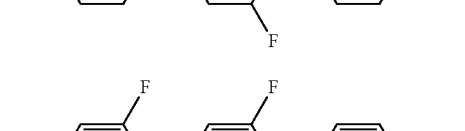

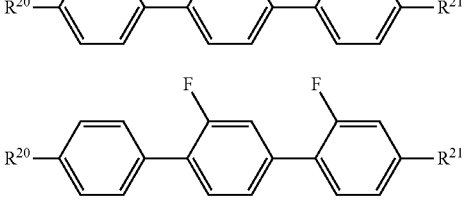
(2-14)

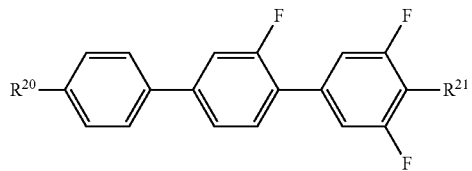
(2-15)

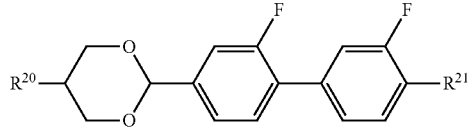
(2-16)

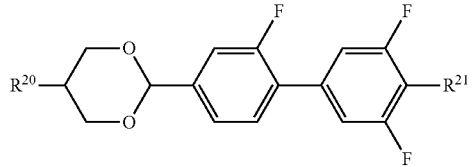
(2-17)

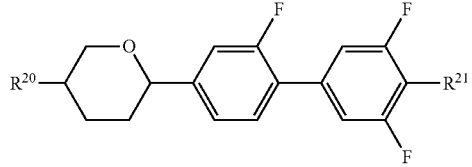
(2-18)

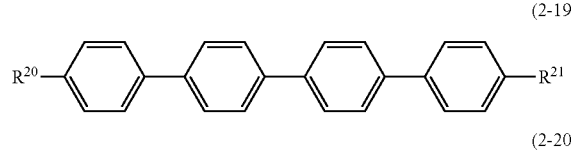
(2-19)

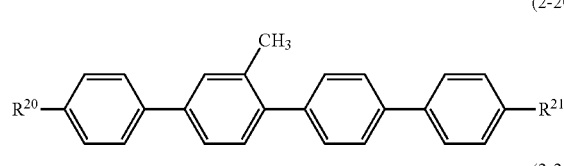
(2-20)

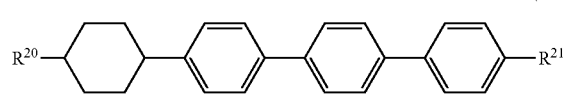
(2-21)

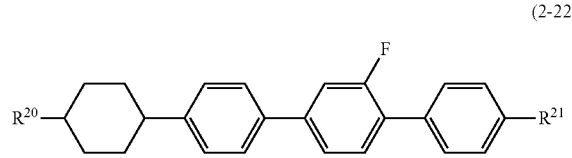
(2-22)

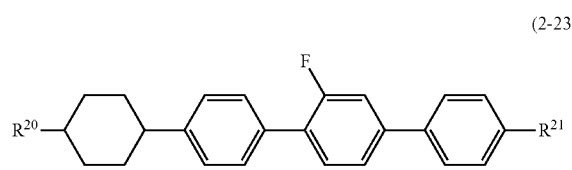
(2-23)

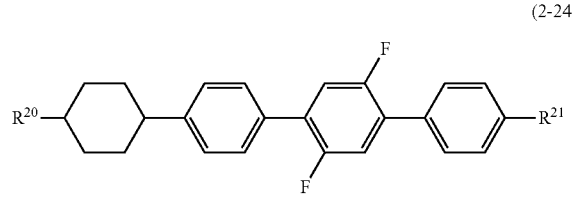
(2-24)

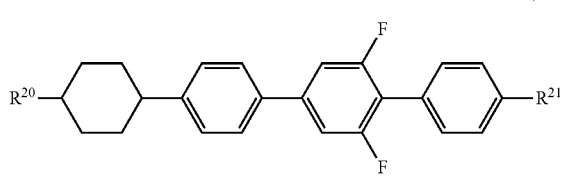
(2-25)

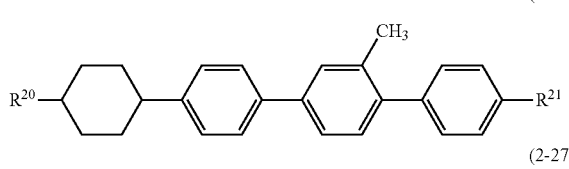
(2-26)

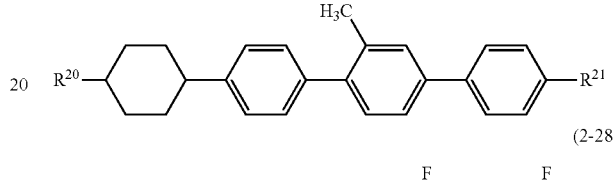
(2-27)

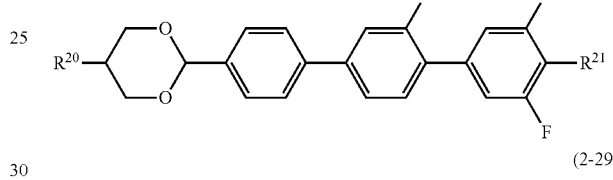
(2-28)

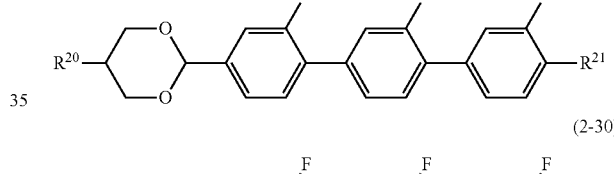
(2-29)

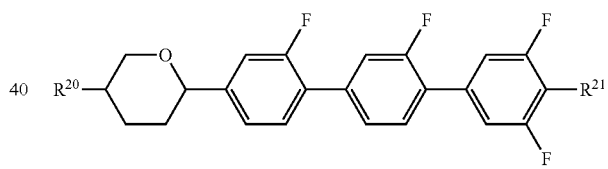
(2-30)

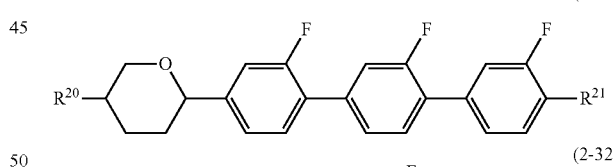
(2-31)

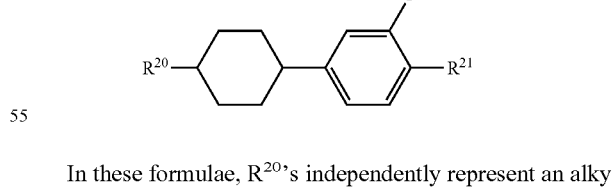
(2-32)

In these formulae, $R^{20}$'s independently represent an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

Among these compounds represented by Formula (2-1) to Formula (2-32), in order to obtain the above desired characteristics, Formulae (2-1), (2-2), (2-8), (2-9), (2-10), (2-11), (2-15), (2-17), (2-18), (2-22), (2-28), (2-29), (2-30), (2-31), and (2-32) are particularly preferably selected.

Among the compounds represented by Formula (3), compounds represented by Formula (3-1) to Formula (3-14) are suitably used for the disclosure.

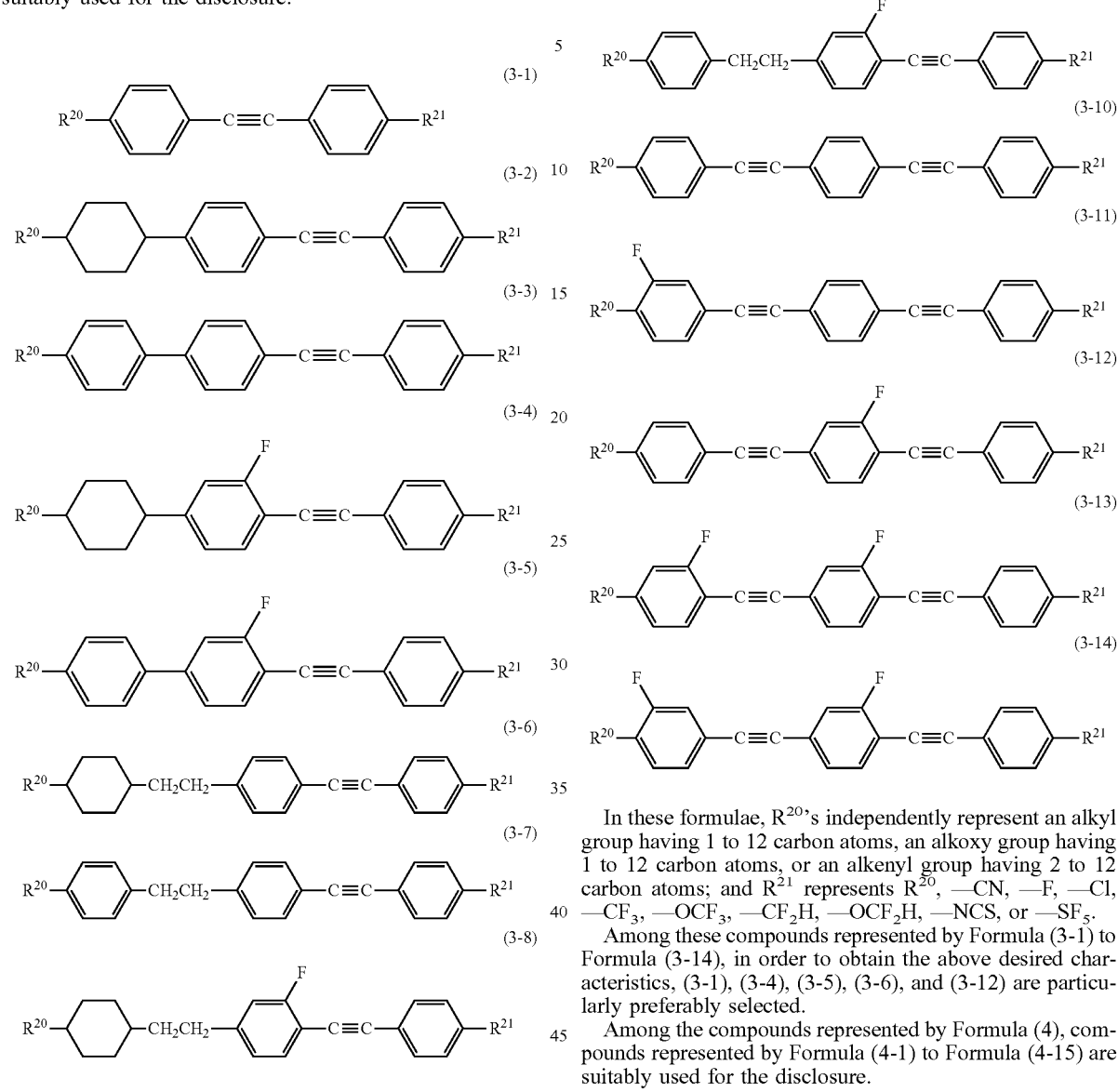

In these formulae, $R^{20}$'s independently represent an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

Among these compounds represented by Formula (3-1) to Formula (3-14), in order to obtain the above desired characteristics, (3-1), (3-4), (3-5), (3-6), and (3-12) are particularly preferably selected.

Among the compounds represented by Formula (4), compounds represented by Formula (4-1) to Formula (4-15) are suitably used for the disclosure.

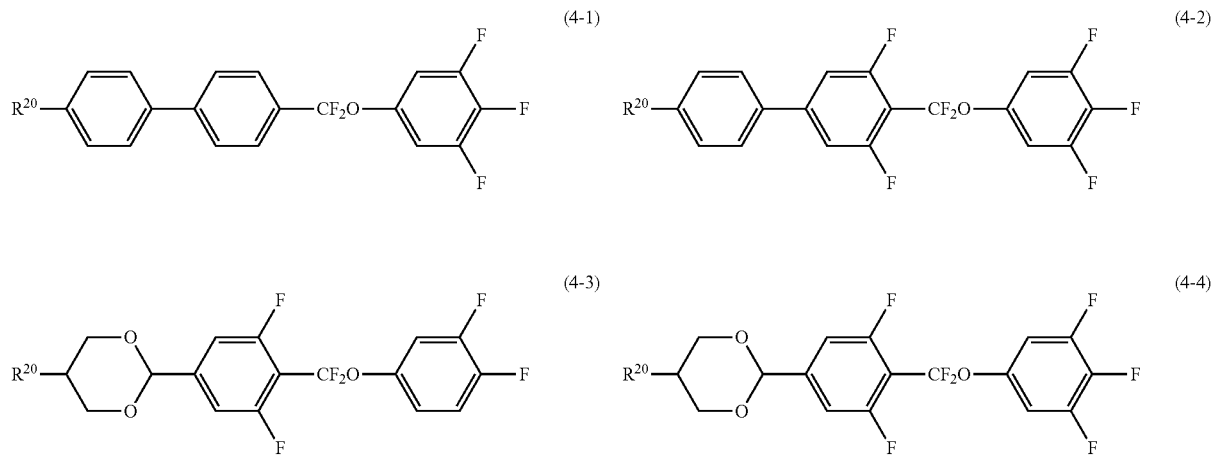

|   |   |
|---|---|
| (4-5) 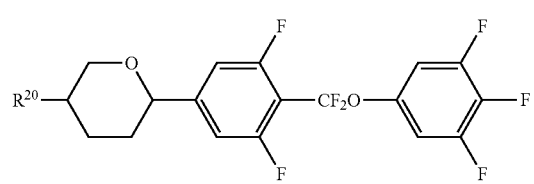 | (4-6) 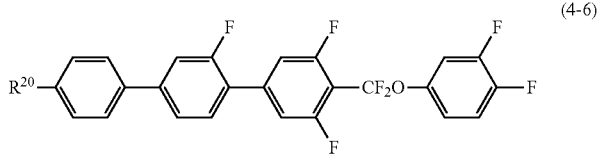 |
| (4-7) 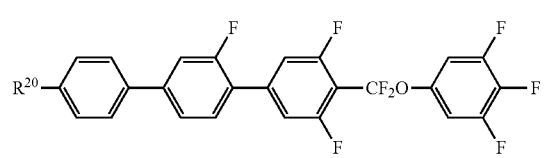 | (4-8) 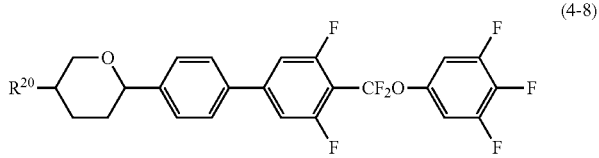 |
| (4-9) 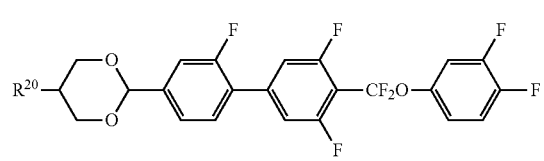 | (4-10) 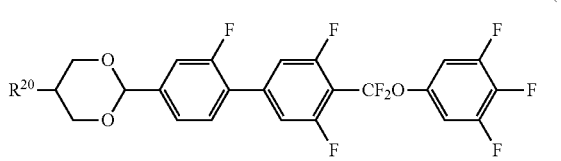 |
| (4-11) 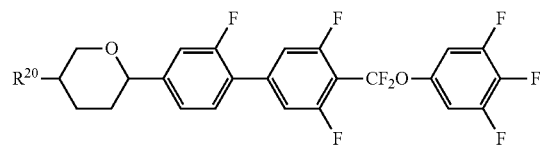 | (4-12) 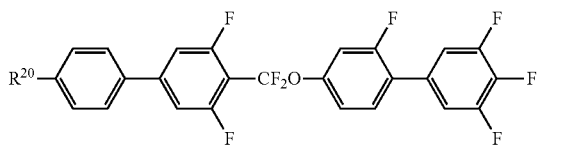 |

(4-13)
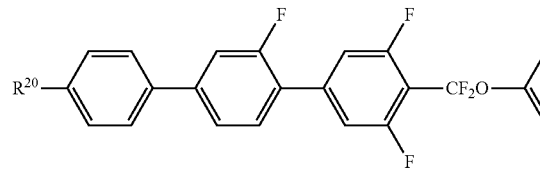

(4-14)
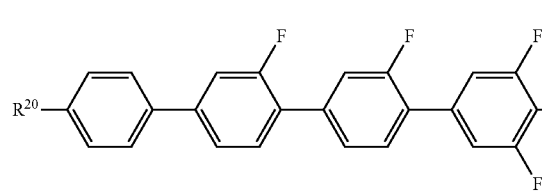

(4-15)
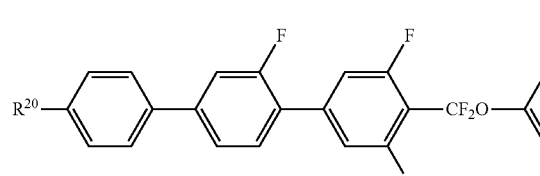

In these formulae, $R^{20}$'s independently represent an alkyl group having 1 to 12 carbon atoms, an alkoxy group having 1 to 12 carbon atoms, or an alkenyl group having 2 to 12 carbon atoms.

Among these compounds represented by Formula (4-1) to Formula (4-15), in order to obtain the above desired characteristics, (4-1), (4-2), (4-4), (4-5), (4-6), (4-7), (4-10), (4-11), and (4-12) are particularly preferably selected.

Among the compounds represented by Formula (4), examples of compounds suitably used for the disclosure include compounds represented by Formula (4-16) to Formula (4-26).

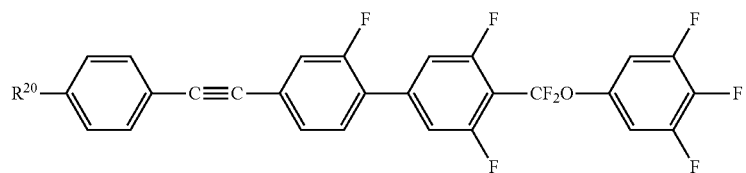
(4-16)
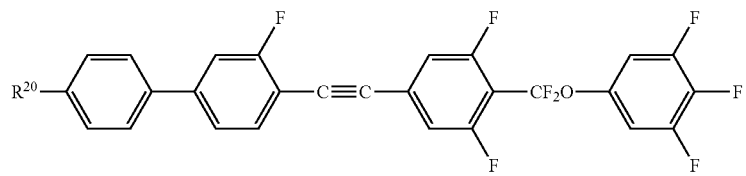
(4-17)
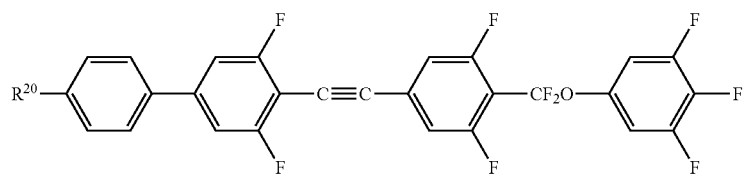
(4-18)
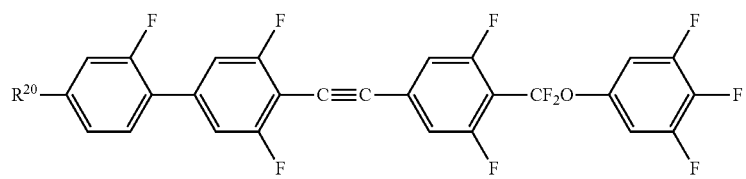
(4-19)
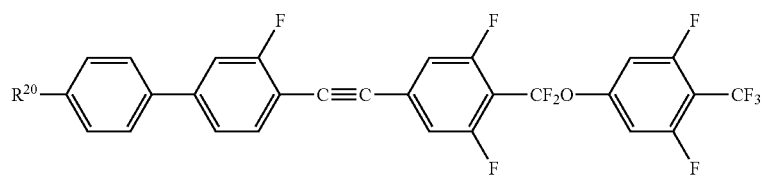
(4-20)
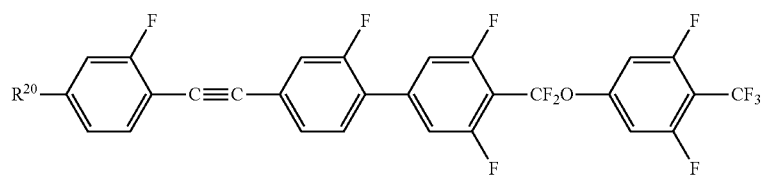
(4-21)
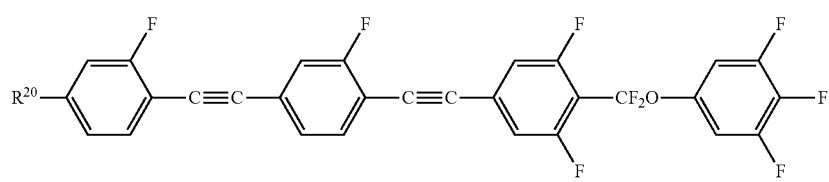
(4-22)
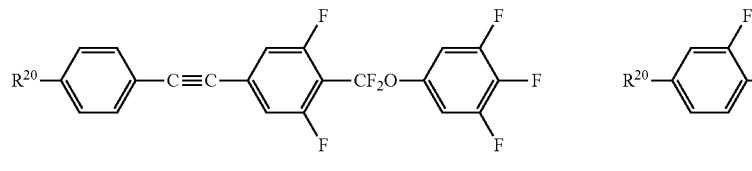
(4-23)
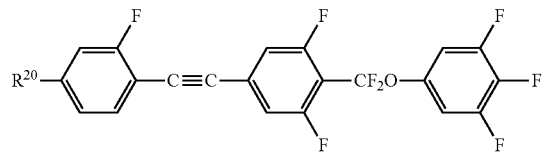
(4-24)
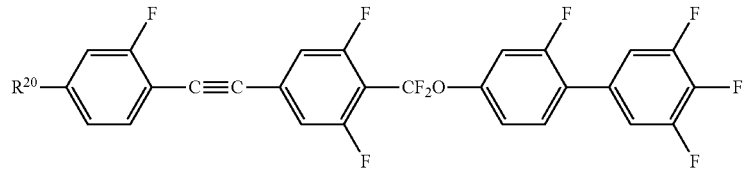
(4-25)

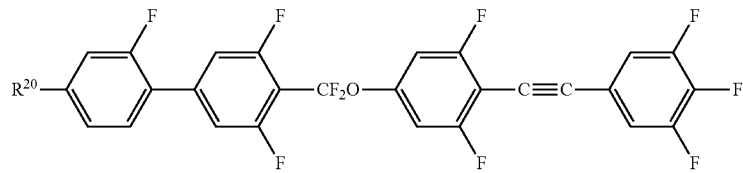

(4-26)

In these formulae, $R^{20}$'s independently represent an alkyl group having 1 to 12 carbon atoms, an alkoxy group having 1 to 12 carbon atoms, or an alkenyl group having 2 to 12 carbon atoms.

Among these compounds represented by Formula (4-16) to Formula (4-26), in order to obtain the above desired characteristics, (4-16) is particularly preferably selected.

In the composition of the disclosure, in order to improve characteristics, additives such as a light stabilizer, an antioxidant, an optically active compound, a dye, a polymerizable compound, and a photopolymerization initiator may be contained.

In order to reduce deterioration of the above liquid crystal composition due to heat and light, a light stabilizer, an antioxidant, and the like may be added to the composition of the disclosure. Regarding such a light stabilizer and an antioxidant, compounds represented by the following Formula (AI) are suitable because their effects are strong and it is possible to prevent a liquid crystal temperature range of the composition from being narrowed.

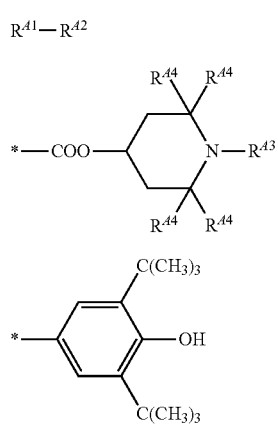

Here, $R^{41}$ represents a group of Formula (AI-1) or Formula (AI-2), and in Formula (AI-1) or Formula (AI-2), $R^{43}$ represents a hydrogen atom or an alkyl group having 1 to 5 carbon atoms, $R^{44}$'s independently represent an alkyl group having 1 to 5 carbon atoms, and * indicates a bonding position. $R^{42}$ represents an organic group having 1 to 18 carbon atoms, and one to three of —H's of the organic group may be substituted with a group of Formula (AI-1) or Formula (AI-2) like $R^{41}$.

In Compound (AI), a compound having a group of (AI-1) is a light stabilizer, and a compound having a group of (AI-2) is an antioxidant. Regarding the antioxidant, a compound of the following Formula (AI-2-1) is preferably selected. In Formula (AI-2-1), k is an integer of 1 to 12.

In particular, since Compound (AI-2-1) in which k is 1 has high volatility, it is effective to prevent reduction in a specific resistance due to heat in the air. Since Compound (AI-2-1) in which k is 7 has low volatility, it is effective to maintain the reliability not only at room temperature but also at a relatively high temperature after a high frequency antenna is used for a long time.

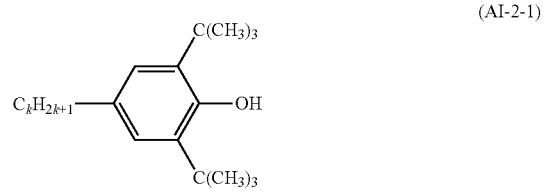

A preferable proportion of the light stabilizer is 100 ppm or more in order to obtain effects thereof and is 0.5% or less in order to prevent the upper limit temperature from decreasing or prevent the lower limit temperature from increasing. A more preferable proportion is 100 ppm to 1,000 ppm. In addition, a preferable proportion of the antioxidant is 50 ppm or more in order to obtain effects thereof, and is 600 ppm or less in order to prevent the upper limit temperature from decreasing or prevent the lower limit temperature from increasing. A more preferable proportion is 100 ppm to 300 ppm.

An optically active compound may be added to the composition of the disclosure. The compound is mixed into the composition in order to form a twist angle by inducing a liquid crystal helical structure. Examples of such a compound include Compounds (C-1) to (C-5). A preferable proportion of the optically active compound is 5% or less. A more preferable proportion is in a range of 0.01% to 2%.

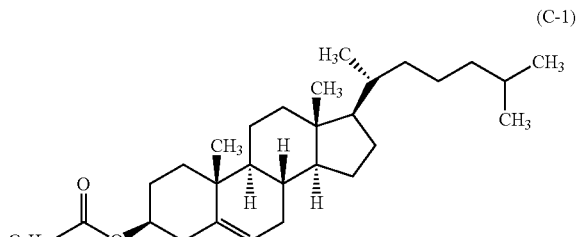

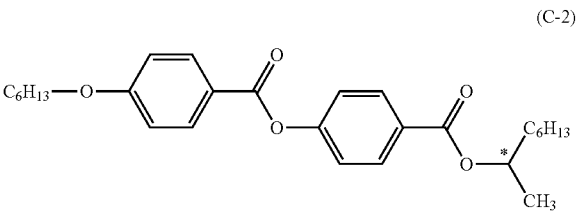

-continued

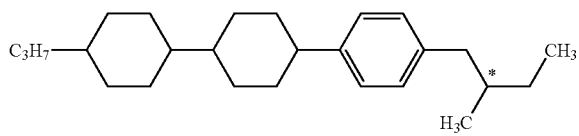
(C-3)

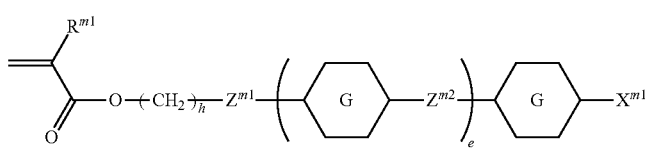
(C-4)

(C-5)

In Formula (C-5), $R^{C1}$'s independently represent a hydrocarbon having a ring structure and up to 30 carbon atoms. * indicates an asymmetric carbon atom.

In order to improve the anisotropy at a frequency of 1 MHz to 400 THz, azo, carcinoid, flavonoid, quinone and porphyrin dyes may be contained in the composition of the disclosure.

A polymerizable compound may be contained in the composition of the disclosure in order to improve characteristics. For such purposes, examples in which characteristics of an antenna element are improved using a polymer-dispersed type liquid crystal include IEEJ Transactions on Fundamentals and Materials, vol. 137, No. 6, pp. 356 (2017). Also in the composition of the disclosure, for the purpose of such improvement, a polymerizable compound may be added to the composition. Regarding such a polymerizable compound, in order to maintain electrical characteristics of the element, a radically polymerizable compound is preferable, and in consideration of the reactivity during polymerization and the solubility in a liquid crystal, a (meth)acrylic group is more preferably selected.

Regarding those suitably used as such a polymerizable compound, first, (meth)acrylic derivatives having a framework similar to that of a liquid crystal may be exemplified. These compounds are suitably used when the composition that is aligned in one direction is used because they do not significantly reduce a phase transition point of the composition. Regarding those suitable as such compounds, compounds represented by the following Formula (M-1) to Formula (M-3) may be exemplified.

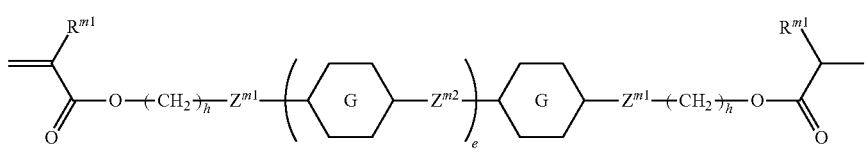
(M-1)

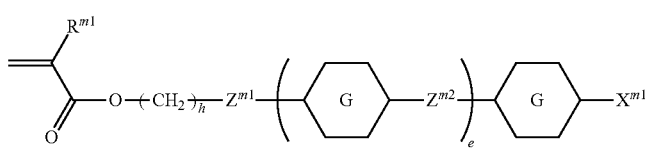

(M-2)

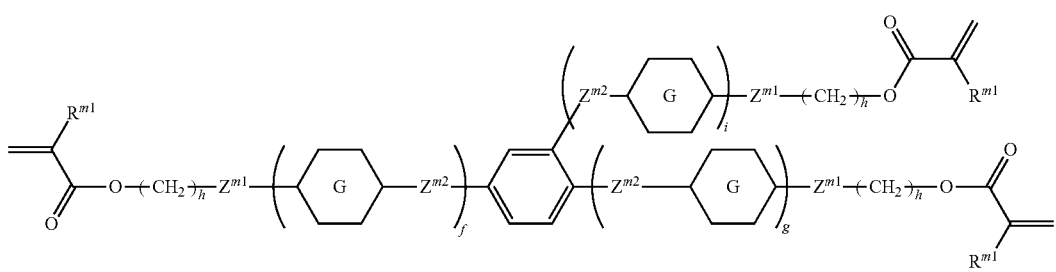
(M-3)

In Formula (M-1), Formula (M-2), and Formula (M-3), the rings G independently represent 1,4-cyclohexylene, 1,4-phenylene, 1,3-dioxane-2,5-diyl, naphthalene-2,6-diyl, or fluorene-2,7-diyl, and here, at least one hydrogen atom is optionally substituted with a fluorine atom, a trifluoromethyl group, an alkyl group having 1 to 12 carbon atoms, an alkoxy group having 1 to 12 carbon atoms, an alkoxycarbonyl group having 1 to 12 carbon atoms, or an alkanoyl group having 1 to 12 carbon atoms; $Z^{m1}$'s independently represent a single bond, —OCH$_2$—, —COO—, or —OCOO—; $Z^{m2}$ represents a single bond, —O—, —OCH$_2$—, or —COO—; $X^{m1}$ represents a hydrogen atom, a fluorine atom, a chlorine atom, a trifluoromethyl group, a trifluoromethoxy group, a cyano group, an alkyl group having 1 to 20 carbon atoms, an alkenyl group having 2 to 20 carbon atoms, an alkoxy group having 1 to 20 carbon atoms, or an alkoxy carbonyl group having 1 to 20 carbon atoms; e is an integer of 1 to 4; f, and g are independently an integer of 0 to 3; a sum of f and g is 1 to 4; i is 0 or 1, h's are independently an integer of 0 to 20; and $R^{m1}$'s independently represent a hydrogen atom or CH$_3$.

Regarding those suitably used as such a polymerizable compound, additionally, (meth)acrylic derivatives having no framework similar to that of a liquid crystal may be exemplified. These compounds are suitably used when a drive voltage of the element is lowered. Regarding those suitable as such compounds, a compound represented by the following Formula (M-4) may be exemplified.

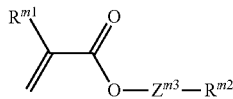

(M-4)

In Formula (M-4), $Z^{m3}$ represents a single bond or an alkylene group having 1 to 80 carbon atoms, and in the alkylene group, at least one hydrogen atom is optionally substituted with an alkyl group having 1 to 20 carbon atoms, a fluorine atom, or a group of the following Formula (7), and at least one —CH$_2$— is optionally substituted with —O—, —CO—, —COO—, —OCO—, —NH—, or —N (R$^{m3}$)—, and when substituted with a plurality of —O—'s, these —O—'s are not adjacent, and R$^3$ represents an alkyl group having 1 to 12 carbon atoms; and at least one —CH$_2$—CH$_2$— is optionally substituted with —CH=CH—, or —C≡C—;

$R^{m2}$ represents an alkyl group having 1 to 20 carbon atoms, and in the alkyl group, at least one hydrogen atom is optionally substituted with a fluorine atom, and at least one —CH$_2$— is optionally substituted with —O—, —CO—, —COO—, or —OCO—, and when substituted with a plurality of —O—'s, these —O—'s are not adjacent, at least one —CH$_2$— is optionally substituted with a divalent group generated from removing two hydrogen atoms from a carbocyclic saturated aliphatic compound, a heterocyclic saturated aliphatic compound, a carbocyclic unsaturated aliphatic compound, or a heterocyclic unsaturated aliphatic compound, and in these divalent groups, the number of carbon atoms is 5 to 35, at least one hydrogen atom is optionally substituted with an alkyl group having 1 to 12 carbon atoms, and in the alkyl group, one —CH$_2$— is optionally substituted with —O—, —CO—, —COO—, or —OCO—; and R$^{m1}$ represents a hydrogen atom or —CH$_3$.

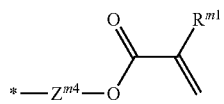

(7)

In Formula (7), $Z^{m4}$ represents an alkylene group having 1 to 12 carbon atoms, R$^{m1}$ represents a hydrogen atom or —CH$_3$, and * indicates a bonding position.

Suitable examples of the compounds represented by Formula (M-1) to Formula (M-4) include the following formulae.

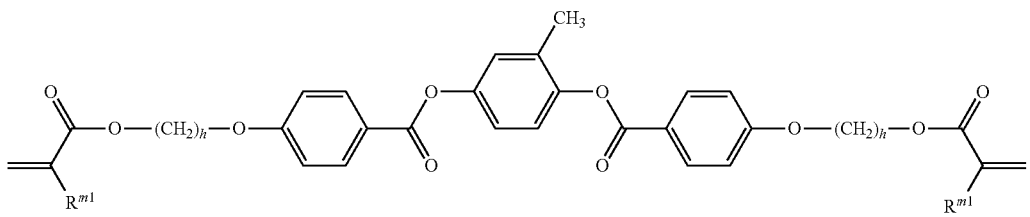

(M-2-1)

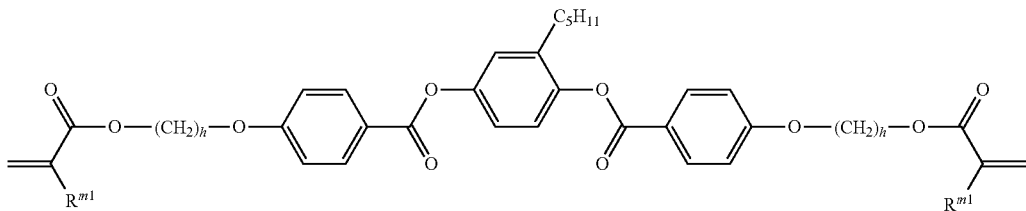

(M-2-2)

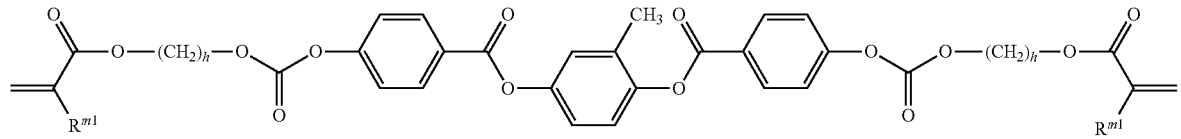

(M-2-3)

-continued
(M-2-4)
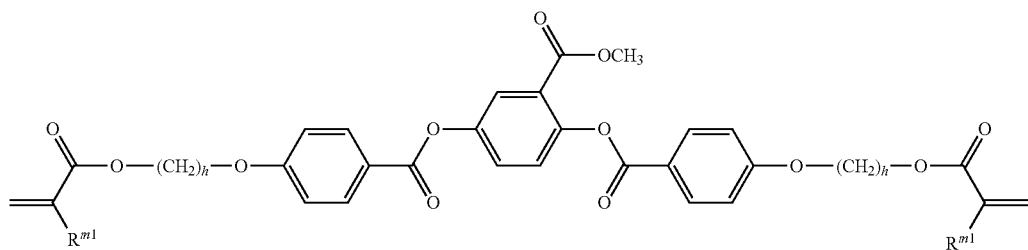
(M-2-5)
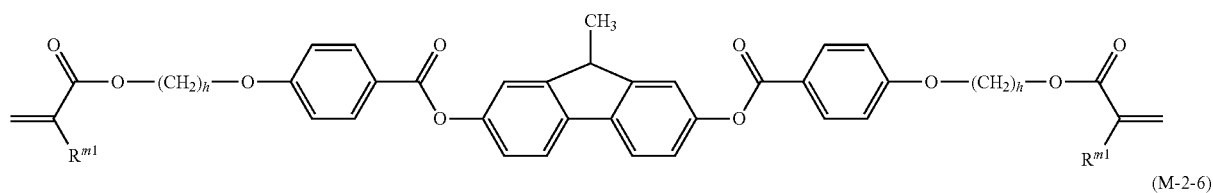
(M-2-6)
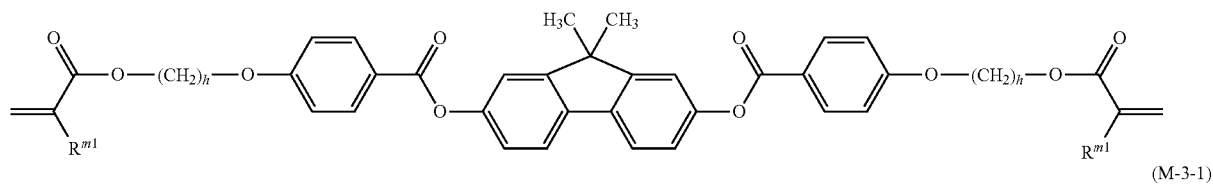
(M-3-1)
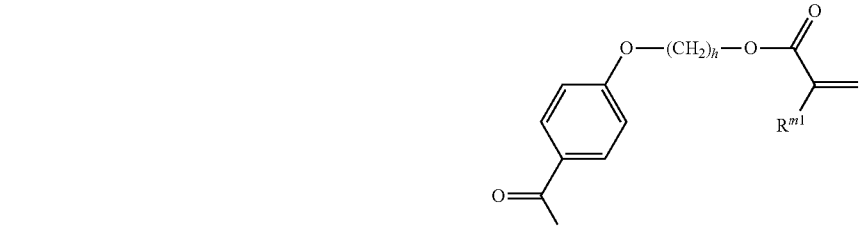
In the above formulae, $R^{m1}$'s independently represent a hydrogen atom or —$CH_3$, and h's are independently an integer of 1 to 20.
(M-4-1)
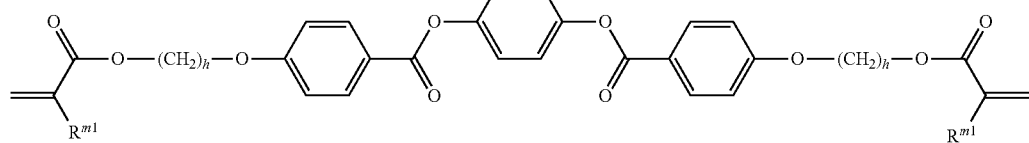
(M-4-2)
(M-4-3)
-continued
(M-4-4)
(M-4-5)
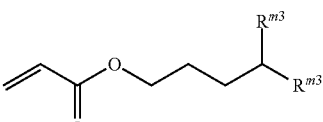
(M-4-6)
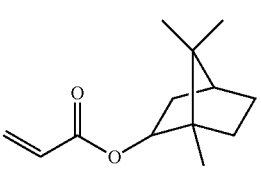
In the above formulae, $R^{m2}$ represents an alkyl group having 5 to 20 carbon atoms, and in the alkyl group, at least one —$CH_2$— is optionally substituted with —O—, —CO—, —COO—, or —OCO—, $R^{m3}$'s independently represent an alkyl group having 3 to 10 carbon atoms, and in the alkyl group, at least one —CH$_2$— is optionally substituted with —O—, —CO—, —COO—, or —OCO—.

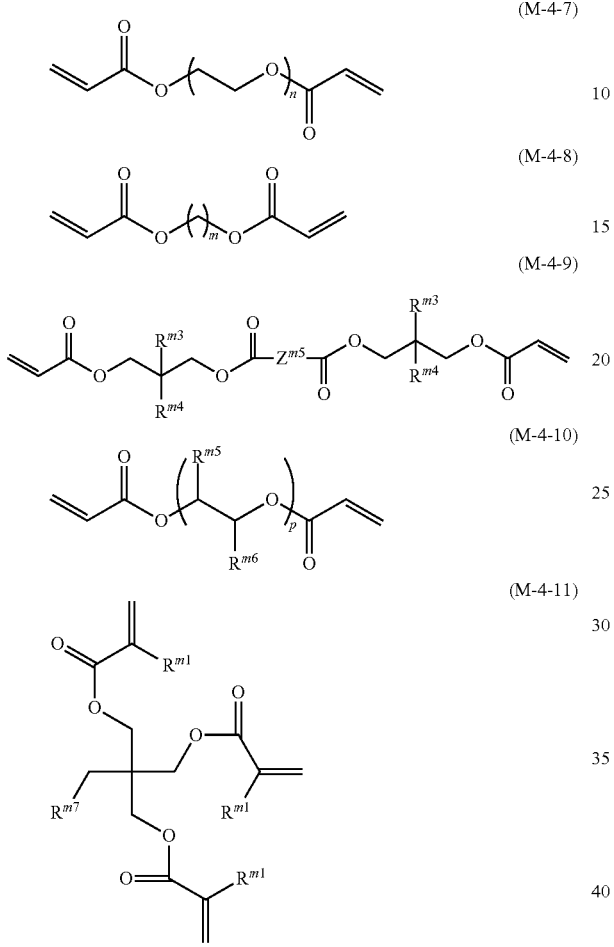

In Formula (M-4-7), n is an integer of 1 to 10,
in Formula (M-4-8), m is an integer of 2 to 20,
in Formula (M-4-9), $R^{m3}$'s independently represent an alkyl group having 1 to 5 carbon atoms, $R^{m4}$'s independently represent an alkyl group having 1 to 20 carbon atoms, and in the alkyl group, at least one —CH$_2$— is optionally substituted with —O—, —CO—, —COO—, or —OCO—, and $R^{m3}$ and $R^{m4}$ in the same formula may be the same as or different from each other, $Z^{m5}$ represents an alkylene group having 10 to 30 carbon atoms, and in the alkylene group, at least one —CH$_2$— is optionally substituted with —O—, —CO—, —COO—, or —OCO—, and the alkylene group include those having a branched alkyl group, in Formula (M-4-10), p is an integer of 3 to 10, and $R^{m5}$ and $R^{m6}$ represent a hydrogen atom or —CH$_3$, and any one of them is —CH$_3$, in Formula (M-4-11), $R^{m7}$ has a structure in which —OH, a (meth)acryloyl group, or the residues other than $R^{m7}$ in Formula (M-4-11) are bonded via —O—, and $R^{m1}$'s independently represent a hydrogen atom or —CH$_3$. Formula (M-4-11-1) in which $R^{m7}$ has a structure in which the residues other than $R^{m7}$ in Formula (M-4-11) are bonded via —O— is shown below.

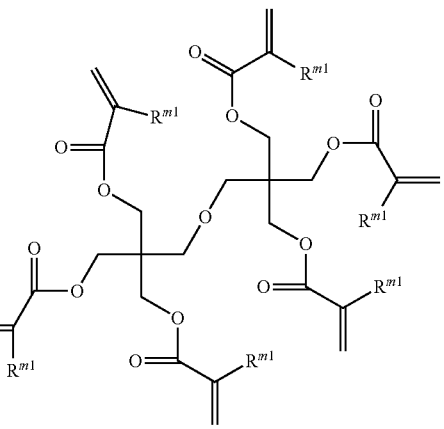

The polymerizable compound is polymerized when UV light is emitted. Polymerization may be performed in the presence of an initiator such as a photopolymerization initiator. Appropriate conditions for polymerization, and an appropriate type and appropriate amount of the initiator are known to those skilled in the art, and are described in the literature. For example, the photopolymerization initiator, Irgacure 651 (registered trademark; BASF), Irgacure 184 (registered trademark; BASF), or Darocure 1173 (registered trademark; BASF) is appropriate for radical polymerization. A preferable proportion of the photopolymerization initiator is in a range of about 0.1 parts by weight to about 5 parts by weight based on 100 parts by weight of the polymerizable compound. A more preferable proportion is in a range of about 1 part by weight to about 3 parts by weight.

When the liquid crystal composition of the disclosure is applied to the element, an alignment film made of a polyimide or the like is used in order to align the liquid crystal composition. On the other hand, an alignment control agent is also added to the liquid crystal in order to align the liquid crystal composition. Regarding such an alignment control agent, compounds described in WO2017-057162, WO2012-104008, WO2016-129490, and the like are suitably used.

Finally, applications of the composition will be described. Most compositions have a lower limit temperature of −10° C. or lower, an upper limit temperature of 70° C. or higher, and an optical anisotropy of 0.16 to 0.35.

A dielectric constant of a dielectric substance such as a liquid crystal varies depending on the frequency and the temperature. Therefore, the dependence of such a dielectric constant on the frequency is called a dielectric characteristic of the dielectric substance. When an alternating electric field is applied to a liquid crystal, since the internal electric dipole can follow the change in the electric field as the frequency f increases, the dielectric constant ε' decreases, and at the same time, the electrical conductivity σ' increases, and the dielectric loss ε" may exhibit a peak, and this phenomenon is dielectric relaxation.

In a microwave and millimeter wave range, depending on a frequency range in which measurement is performed, methods of attaching devices and samples are completely different from each other. Up to 10 GHz, an open-ended coaxial type cell is used for a probe because it is easy to analysis an electromagnetic field, and a measurement system including a central network analyzer is assembled in many cases, and a spectrum (dielectric relaxation spectrum) of a complex dielectric constant of a sample is obtained by sweeping the frequency. At several 10 GHz or more, it is necessary to use a waveguide rather than a coaxial cable. In order to calculate the dielectric constant, it is necessary to properly determine boundary conditions when an electromagnetic wave enters a sample, and when the wavelength becomes shorter, more precise processing is necessary accordingly. In a low frequency range, a cell that will become a capacitor is made and a sample is inserted therein, and a dielectric constant is determined from the change in the capacitance.

EXAMPLES

The disclosure will be described in further detail with reference to examples. The disclosure is not limited to these examples. Unless otherwise specified, examples were performed at room temperature (25° C.).

<Measurement Method>

Measurement and verifying were performed by the following methods. Unless otherwise specified, measurement methods not described in this specification are shown in JEITA (Japan Electronics and Information Technology Industries Association).ED-2521B.

<NMR (Nuclear Magnetic Resonance)>

NMR was measured using DRX-500 (commercially available from Bruker BioSpin). In measurement of $^1$H-NMR, a sample was dissolved in a deuterated solvent such as $CDCl_3$. Measurement was performed at room temperature and 500 MHz. In this case, a cumulative number of measurements was 16. An internal reference was tetramethylsilane. In symbols for NMR, s is singlet, d is doublet, t is triplet, q is quartet, quin is quintet, sex is sextet, m is multiplet, and br is broad.

<DSC (Differential Scanning Calorimetry) Measurement>

Measurement was performed using a differential scanning calorimeter (Diamond DSC commercially available from Perkin Elmer). A transition temperature is indicated in degrees Celsius, which is shown between notations showing a phase. In the notation indicating a phase, C is a crystal layer, N is a nematic phase, S is a smectic phase, and I is an isotropic liquid. In the notation indicating a phase, the description of a phase in the parentheses indicates a monotropic liquid crystal phase.

<Gas Chromatograph Analysis>

A GC-2014 type gas chromatograph (commercially available from Shimadzu Corporation) was used for measurement. A carrier gas was helium (2 mL/min). A sample vaporization chamber was set to 280° C. and a detector (FID) was set to 300° C. In order to separate component compounds, a capillary column DB-1 (with a length of 30 m, an inner diameter of 0.32 mm, and a film thickness of 0.25 μm; a fixed liquid phase was dimethylpolysiloxane; nonpolar) (commercially available from Agilent Technologies Inc) was used. A sample was prepared in an acetone solution (0.1 weight %) and 1 μL thereof was then injected into the sample vaporization chamber. The obtained gas chromatogram showed retention times of peaks corresponding to component compounds and areas of the peaks.

<HPLC (High Performance Liquid Chromatography) Analysis>

A flow rate of the solvent was measured at 1 ml/min using HPLC LC-2000Plus (commercially available from JASCO Corporation). Peaks of respective components were detected using a UV-Vis detector and at a wavelength of 254 nm.

<Upper Limit Temperature of Nematic Phase>

In the examples, "NI" indicates an "upper limit temperature."

The upper limit temperature was a value of a temperature measured when a sample was placed on a hot plate of a melting point measurement device including a polarized light microscope, heated at a rate of 1° C./min, and a part of the sample was changed from a nematic phase to an isotropic liquid.

<Lower Limit Temperature of Nematic Phase>

In the examples, "Tc" indicates a "lower limit temperature."

The lower limit temperature was determined when a sample having a nematic phase was put into a glass bottle, stored in a freezer at 0° C., −10° C., −20° C., −30° C., and −40° C. for 10 days, and a phase was observed.

<Refractive Index Anisotropy with Visible Light>

In the examples, the refractive index anisotropy is indicated as "Δn."

Δn was measured using an Abbe refractometer to which a polarizing plate was attached to an eyepiece.

After the surface of the main prism was rubbed in one direction, the sample was added dropwise to the main prism, a refractive index when a polarized light direction was perpendicular to the rubbing direction was measured as n⊥, and a refractive index when the polarized light direction was parallel to the rubbing direction was measured as n∥. Δn was calculated as Δn=n∥−n⊥.

In this case, light with a wavelength of 589 nm was used and a measurement temperature was 25° C.

<Dielectric Anisotropy at 1 kHz>

The value of dielectric anisotropy was calculated from the formula Δε=ε∥−ε⊥. The dielectric constant (ε∥ and ε⊥) was measured as follows.

(A) Measurement of dielectric constant (ε∥): An ethanol (20 mL) solution containing octadecyltriethoxysilane (0.16 mL) was applied to a well-washed glass substrate. The glass substrate was rotated by a spinner and then heated at 150° C. for 1 hour. A sample was inserted into a VA element in which an interval between two glass substrates was 4 μm, and the element was sealed using an adhesive that was cured with UV light. A sine wave (0.5 V, 1 kHz) was applied to the element, and after 2 seconds, a dielectric constant (ε∥) in a long axis direction of liquid crystal molecules was measured.

(B) Measurement of dielectric constant (ε⊥): A polyimide solution was applied to a well-washed glass substrate. The glass substrate was fired and the obtained alignment film was then rubbed. A sample was inserted into a TN element in which an interval between two glass substrates was 9 μm and a twist angle was 80 degrees. A sine wave (0.5 V, 1 kHz) was applied to the element, and after 2 seconds, a dielectric constant (ε⊥) in a short axis direction of liquid crystal molecules was measured.

<Voltage Holding Ratio (VHR)>

A cell used for measurement had the following structure. That is, an ITO electrode and a rubbed polyimide alignment film were disposed on respective substrates in this order. Two substrates were bonded so that an angle between upper and lower substrates in the rubbing direction was 80 degrees, and the surface of the alignment film faced inward. An interval between two glass substrates (cell gap) was 5 μm. A liquid crystal composition was put into the cell and then sealed using an adhesive that was cured with UV light. A pulse voltage (for 60 microseconds at 5 V) was applied to the TN element and charged. An attenuating voltage was measured for 16.7 milliseconds using a high-speed voltmeter and an area A between a voltage curve in a unit cycle and the horizontal axis was obtained. An area B was an area when the voltage was not attenuated. The voltage holding ratio was expressed as a percentage of the area A with respect to the area B.

<Refractive Index Anisotropy and Dielectric Loss at 50 GHz>

Measurement was performed according to the method disclosed in Applied Optics, Vol. 44, No. 7, p 1150 (2005). For the refractive index anisotropy, a liquid crystal was filled into a V band adjustable short-circuited waveguide to which a window material was attached and left in a static magnetic field of 0.3 T for 3 minutes. A microwave of 50 GHz was input to the waveguide and an amplitude ratio of reflected waves to incident waves was measured. Measurement was performed by changing the direction of the static magnetic field and the tube length of the short-circuit device, and refractive indexes (ne, no) and loss parameters (αe, αo) were determined. The refractive index anisotropy (Δn) was calculated by ne−no.

The dielectric loss was calculated as (tan δ)=ε"/ε' using complex dielectric constants (ε', ε"). In order to calculate the complex dielectric constant, the refractive indexes and loss parameters calculated above and the following relational formulae were used.

Here, c is the speed of light in vacuum. A larger value was used since the anisotropy appeared in dielectric loss.

$\varepsilon' = n^2 - \kappa^2$ $\varepsilon'' = 2n\kappa$ $\alpha = 2\omega c/\kappa$ <Bulk Viscosity>

In the examples, the bulk viscosity of the composition is indicated as "η."

The bulk viscosity was measured using an E type rotational viscometer (commercially available from Tokyo Keiki Co., Ltd.). A measurement temperature was 20° C.

<Compounds>

Regarding the compound represented by Formula (1), the following Formula (1-1-1), (1-1-2), (1-1-3), (1-17-1), (1-1-4), (1-1-5), (1-1-6), (1-1-7), (1-1-8), (1-1-9), and (1-29-1) were used. Compound (1-1-1) was synthesized in the same method described in J. Appl. Phys., 65 (11), 4372 (1989), and (1-1-3) was synthesized in the same method described in Japanese Patent Laid-Open No. 2012-167068.

(1-1-1)

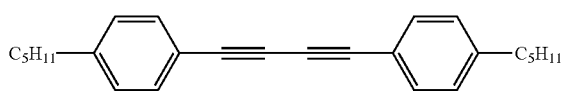

(1-1-2)

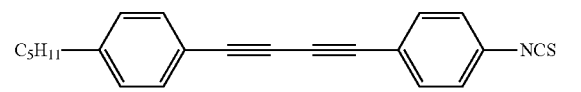

(1-1-3)

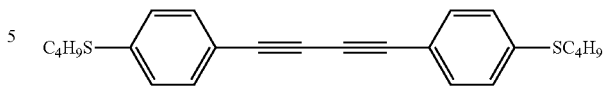

(1-17-1)

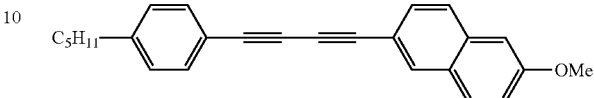

(1-1-4)

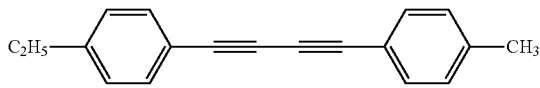

(1-1-5)

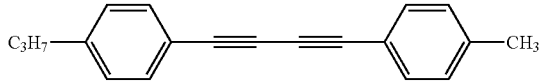

(1-1-6)

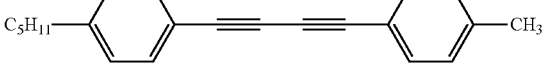

(1-1-7)

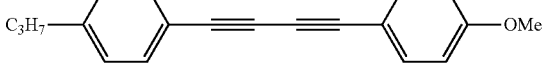

(1-1-8)

(1-1-9)

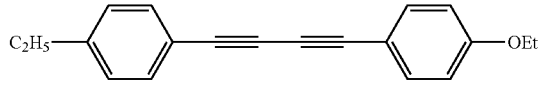

(1-29-1)

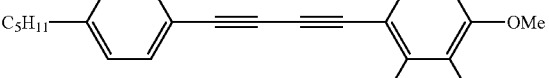

Example 1

Synthesis of Compound Represented by Formula (1-1-2)

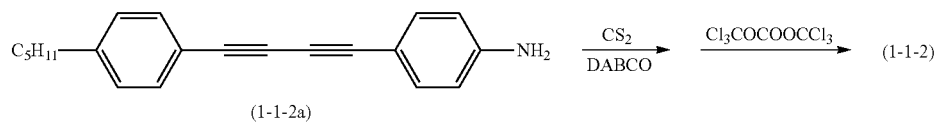

21 ml (349 mmol) of $CS_2$ was added to a solution (THF 100 ml) containing 10.0 g (34.8 mmol) of the compound represented by Formula (1-1-2a) synthesized according to Liquid Crystals, 27 (6), 801 (2000), and 23.4 g (208 mmol) of 1,4-diazabicyclo[2.2.2]octane (DABCO), and the mixture was stirred overnight under a nitrogen atmosphere at room temperature. The generated precipitate was filtered. The obtained powder was transferred to a flask, and 100 ml of $CHCl_3$ was added thereto, and the mixture was stirred. A solution ($CHCl_3$ 50 ml) containing 3.8 g (12.8 mmol) of triphosgene was slowly added to the mixed solution at room temperature. Then, the mixture was refluxed under a nitrogen atmosphere for 3 hours. The reaction solution was cooled, and 100 ml of pure water was then added thereto. An organic layer was separated, and washing with the same amount of pure water was then performed, and drying with $MgSO_4$ was performed. After filtration and distilling off of the solvent under a reduced pressure, the obtained product was recrystallized through column chromatography (silica gel, heptane/toluene=2/1) and in a toluene/ethanol mixture solvent, and thereby (1-1-2) was obtained. Yield point 7.1 g (yield 62%). GC purity: 100%. Phase transition temperature (° C.): C·141.0·N·147.4·I.

Example 2

Synthesis of Compound Represented by Formula (1-17-1)

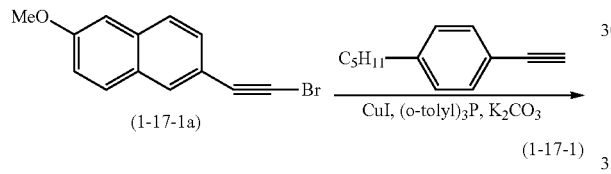

In the same method as in Synthesis, (10), 1541 (2011), a mixture containing 3.5 g (13.4 mmol) of the compound represented by Formula (1-17-1a) synthesized according to Synthesis, (5), 816 (2011), 3.1 g (18.0 mmol) of 1-ethynyl-4-pentylbenzene, 260 mg (13.6 mmol) of CuI, 820 mg (2.7 mmol) of tri(o-tolyl)phosphine and 1.9 g (13.7 mmol) of $K_2CO_3$ was refluxed in ethanol (50 ml) under a nitrogen atmosphere for 12 hours. The reaction solution was cooled, and 100 ml of toluene and 100 ml of pure water were then added thereto. An organic layer was separated and drying with $MgSO_4$ was then performed. After filtration and distilling off of the solvent under a reduced pressure, the obtained product was recrystallized through column chromatography (silica gel, heptane/toluene=2/1) and in a toluene/ethanol mixture solvent, and thereby (1-17-1) was obtained. Yield point 1.3 g (yield 28%). GC purity: 100%. Phase transition temperature (° C.): C·91.2·N·199.5·I.

Example 2-2

Synthesis of Compound Represented by Formula (1-29-1)

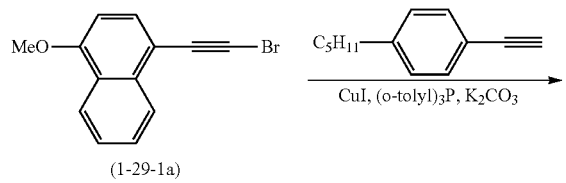

Synthesis was performed in the same method as in Example 2 using the compound represented by Formula (1-29-1a) in place of the compound represented by Formula (1-17-1a). The obtained product was recrystallized through column chromatography (silica gel, heptane/toluene=2/1) and in ethanol, and thereby (1-29-1) was obtained. Yield point 2.2 g (yield 47%). HPLC purity (elution solvent acetonitrile): 100%. Phase transition temperature (° C.): C·101.3·I.

The compound represented by Formula (1-29-1a) was synthesized as follows. 50 g (70-75% aqueous solution) of $Bu_4NF$ was added to a solution (N,N-dimethylformamide (DMF) 100 ml) containing 10.0 g (29.2 mmol) of the compound represented by Formula (1-29-1b) synthesized according to Synthesis, (12), 2040 (2009) and the mixture was stirred at 60° C. for 1 hour. The reaction solution was cooled, and 100 ml of toluene and 100 ml of pure water were then added thereto. An organic layer was separated, and drying with $MgSO_4$ was performed. After filtration and distilling off of the solvent under a reduced pressure, the obtained product was purified through column chromatography (silica gel, heptane/toluene=2/1), and thereby (1-29-1a) was obtained. Yield point 7.6 g (yield 78%).

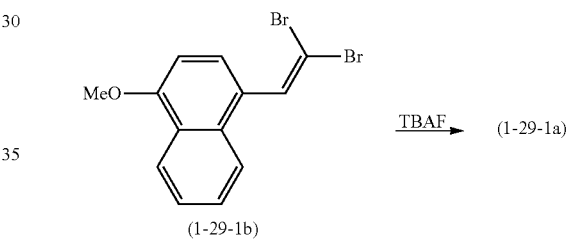

<Liquid Crystal Composition>

A composition was prepared using Formulae (1-1-1), (1-1-2), (1-1-3), (1-17-1), (1-1-4), (1-1-5), (1-1-6), (1-1-7), (1-1-8), (1-1-9), and (1-29-1), and by combining a liquid crystal of a second component. The liquid crystal compound of the second component was represented according to the notation in Table 1. Unless otherwise specified, the divalent group of the 6-membered ring in Table 1 had a trans configuration. The number in parentheses after the compound shown in the liquid crystal composition represents a chemical formula to which the compound belongs. The symbol (—) refers to other liquid crystal compounds. The proportion of the liquid crystal compound is a weight percentage based on the weight of the liquid crystal composition containing no additives.

TABLE 1

| Method of representing compound using symbols $R—(A_1)—Z_1— \ldots —Z_n—(A_n)—R'$ | |
|---|---|
| 1) Left terminal group R— | symbols |
| $C_nH_{2n+1}$— | n- |
| $C_nH_{2n+1}O$— | nO— |
| $C_mH_{2m+1}OC_nH_{2n}$— | mOn- |
| $CH_2=CH$— | V— |
| $C_nH_{2n+1}$—CH=CH— | nV— |
| $CH_2=CH—C_nH_{2n}$— | Vn- |

TABLE 1-continued

Method of representing compound using symbols
R—(A₁)—Z₁— ... —Zₙ—(Aₙ)—R'

| | |
|---|---|
| $C_mH_{2m+1}$—CH=CH—$C_nH_{2n}$— | mVn- |
| $CF_2$=CH— | VFF— |
| $CF_2$=CH—$C_nH_{2n}$— | VFFn- |
| 2) Right terminal group —R' | symbols |
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —$C_nH_{2n}$—CH=CH—$C_mH_{2m+1}$ | -nVm |
| —CH=$CF_2$ | —VFF |
| —$COOCH_3$ | -EMe |
| —F | —F |
| —Cl | —CL |
| —$OCF_3$ | —OCF3 |
| —$CF_3$ | —CF3 |
| —CN | —C |
| —OCH=CH—$CF_2H$ | —OVCF2H |
| —OCH=CH—$CF_3$ | —OVCF3 |
| 3) Linking group —$Z_n$— | symbols |
| —$C_2H_4$— | 2 |
| —COO— | E |
| —CH=CH— | V |
| —C≡C— | T |
| —$CF_2O$— | X |
| —$CH_2O$— | 1O |
| 4) Ring structure —$A_n$— | symbols |
|  | H |
| 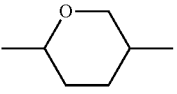 | Dh |
| 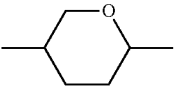 | dh |
| 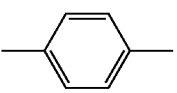 | B |
| 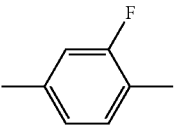 | B(F) |
| 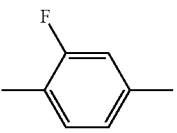 | B(2F) |
| 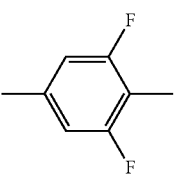 | B(F,F) |
| 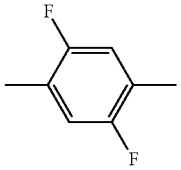 | B(2F,5F) |
| 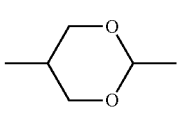 | G |
| 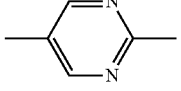 | Py |

5) Representation examples

Example 1  3-BB(F)TB-2

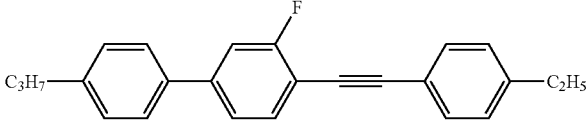

Example 2  3-BB(F)B(F,F)—F

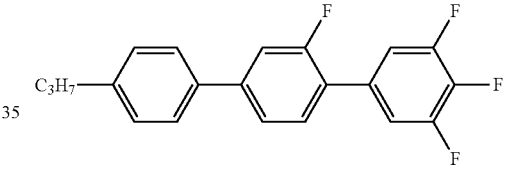

Example 3  4-BB(F)B(F,F)XB(F,F)—F

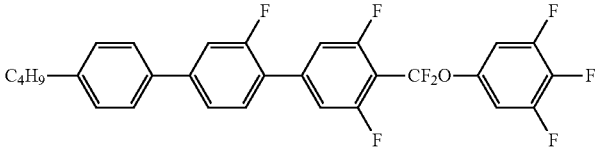

Example 3

Preparation and Physical Properties of Liquid Crystal Composition 1

| | | |
|---|---|---|
| (1-1-1) | | 15.0% |
| 5-BB-C | (2-1) | 43.3% |
| 7-BB-C | (2-1) | 21.3% |
| 5-BBB-C | (2-6) | 6.8% |
| 3-H2BTB-2 | (3-6) | 8.5% |
| 1V2-BEB(F,F)-C | (—) | 5.1% |

NI=90.0° C.; Tc<−20° C.; Δn=0.253; Δε=14.1; η=48.4 mPa·s; VHR=98.7%.

The refractive index anisotropy and dielectric loss at 50 GHz of the liquid crystal composition 1 were as follows.

Refractive index anisotropy; 0.15

Dielectric loss; 0.016

Example 4

Preparation and Physical Properties of Liquid Crystal Composition 2

| (1-1-2) | | 10.0% |
|---|---|---|
| 5-BB-C | (2-1) | 46.2% |
| 7-BB-C | (2-1) | 22.5% |
| 3-HB(F)-C | (2-32) | 5.1% |
| 5-BBB-C | (2-6) | 7.2% |
| 3-H2BTB-2 | (3-6) | 9.0% |

NI=90.0° C.; Tc<−20° C.; Δn=0.257; Δε=14.8; η=55.4 mPa·s; VHR=98.7%.

The refractive index anisotropy and dielectric loss at 50 GHz of the liquid crystal composition 2 were as follows.
Refractive index anisotropy; 0.15
Dielectric loss; 0.015

Example 5

Preparation and Physical Properties of Liquid Crystal Composition 3

| (1-1-3) | | 10.0% |
|---|---|---|
| 5-BB-C | (2-1) | 46.2% |
| 7-BB-C | (2-1) | 22.5% |
| 3-HB(F)-C | (2-32) | 5.1% |
| 5-BBB-C | (2-6) | 7.2% |
| 3-H2BTB-2 | (3-6) | 9.0% |

NI=90.4° C.; Tc<−20° C.; Δn=0.263; Δε=14.2; η=56.2 mPa·s; VHR=98.5%.

The refractive index anisotropy and dielectric loss at 50 GHz of the liquid crystal composition 2 were as follows.
Refractive index anisotropy; 0.16
Dielectric loss; 0.015

Example 6

Preparation and Physical Properties of Liquid Crystal Composition 4

| (1-17-1) | | 10.0% |
|---|---|---|
| 5-BB-C | (2-1) | 46.2% |
| 7-BB-C | (2-1) | 22.5% |
| 3-HB(F)-C | (2-32) | 5.1% |
| 5-BBB-C | (2-6) | 7.2% |
| 3-H2BTB-2 | (3-6) | 9.0% |

NI=90.6° C.; Tc<−20° C.; Δn=0.264; Δε=14.0; η=49.0 mPa·s; VHR=98.8%.

The refractive index anisotropy and dielectric loss at 50 GHz of the liquid crystal composition 2 were as follows.
Refractive index anisotropy; 0.17
Dielectric loss; 0.015

Example 7

Preparation and Physical Properties of Liquid Crystal Composition 5

| (1-1-1) | | 15.0% |
|---|---|---|
| 3-BB(F)B(F,F)-F | (2-15) | 2.6% |
| 2-BTB-O1 | (3-1) | 6.5% |
| 3-BTB-O1 | (3-1) | 6.5% |
| 4-BTB-O1 | (3-1) | 6.5% |
| 4-BTB-O2 | (3-1) | 6.5% |
| 5-BTB-O1 | (3-1) | 6.6% |
| 3-HB(F)TB-2 | (3-4) | 4.3% |
| 3-HB(F)TB-3 | (3-4) | 4.3% |
| 3-HB(F)TB-4 | (3-4) | 4.3% |
| 3-H2BTB-2 | (3-6) | 2.6% |
| 3-H2BTB-3 | (3-6) | 2.6% |
| 3-H2BTB-4 | (3-6) | 2.6% |
| 3-BB(F,F)XB(F,F)-F | (4-2) | 7.7% |
| 3-BB(F)B(F,F)XB(F)-F | (4-6) | 2.6% |
| 3-BB(F)B(F,F)XB(F,F)-F | (4-7) | 1.7% |
| 4-BB(F)B(F,F)XB(F,F)-F | (4-7) | 6.0% |
| 5-BB(F)B(F,F)XB(F,F)-F | (4-7) | 6.0% |
| 3-BB(F,F)XB(F)B(F,F)-F | (4-12) | 5.1% |

NI=92.4° C.; Tc<−20° C.; Δn=0.262; Δε=7.7; η=41.2 mPa·s; VHR=98.7%.

The refractive index anisotropy and dielectric loss at 50 GHz of the liquid crystal composition 1 were as follows.
Refractive index anisotropy; 0.23
Dielectric loss; 0.010

Example 8

Preparation and Physical Properties of Liquid Crystal Composition 6

| (1-17-1) | | 15.0% |
|---|---|---|
| 3-BB(F)B(F,F)-F | (2-15) | 2.6% |
| 2-BTB-O1 | (3-1) | 6.5% |
| 3-BTB-O1 | (3-1) | 6.5% |
| 4-BTB-O1 | (3-1) | 6.5% |
| 4-BTB-O2 | (3-1) | 6.5% |
| 5-BTB-O1 | (3-1) | 6.6% |
| 3-HB(F)TB-2 | (3-4) | 4.3% |
| 3-HB(F)TB-3 | (3-4) | 4.3% |
| 3-HB(F)TB-4 | (3-4) | 4.3% |
| 3-H2BTB-2 | (3-6) | 2.6% |
| 3-H2BTB-3 | (3-6) | 2.6% |
| 3-H2BTB-4 | (3-6) | 2.6% |
| 3-BB(F,F)XB(F,F)-F | (4-2) | 7.7% |
| 3-BB(F)B(F,F)XB(F)-F | (4-6) | 2.6% |
| 3-BB(F)B(F,F)XB(F,F)-F | (4-7) | 1.7% |
| 4-BB(F)B(F,F)XB(F,F)-F | (4-7) | 6.0% |
| 5-BB(F)B(F,F)XB(F,F)-F | (4-7) | 6.0% |
| 3-BB(F,F)XB(F)B(F,F)-F | (4-12) | 5.1% |

NI=108.8° C.; Tc<−20° C.; Δn=0.292; Δε=7.9; η=48.2 mPa·s; VHR=98.1%.

The refractive index anisotropy and dielectric loss at 50 GHz of the liquid crystal composition 1 were as follows.
Refractive index anisotropy; 0.25
Dielectric loss; 0.010

Example 9

Preparation and Physical Properties of Liquid Crystal Composition 7

| (1-1-7) | | 10.0% |
|---|---|---|
| 3-BB(F)B(F,F)-F | (2-15) | 2.7% |
| 2-BTB-O1 | (3-1) | 7.0% |
| 3-BTB-O1 | (3-1) | 7.0% |
| 4-BTB-O1 | (3-1) | 7.0% |
| 4-BTB-O2 | (3-1) | 7.0% |
| 5-BTB-O1 | (3-1) | 7.0% |
| 3-HB(F)TB-2 | (3-4) | 4.5% |
| 3-HB(F)TB-3 | (3-4) | 4.5% |

-continued

| | | |
|---|---|---|
| 3-HB(F)TB-4 | (3-4) | 4.5% |
| 3-H2BTB-2 | (3-6) | 2.7% |
| 3-H2BTB-3 | (3-6) | 2.7% |
| 3-H2BTB-4 | (3-6) | 2.7% |
| 3-BB(F,F)XB(F,F)-F | (4-2) | 8.1% |
| 3-BB(F)B(F,F)XB(F)-F | (4-6) | 2.7% |
| 3-BB(F)B(F,F)XB(F,F)-F | (4-7) | 1.8% |
| 4-BB(F)B(F,F)XB(F,F)-F | (4-7) | 6.3% |
| 5-BB(F)B(F,F)XB(F,F)-F | (4-7) | 6.3% |
| 3-BB(F,F)XB(F)B(F,F)-F | (4-12) | 5.5% |

NI=92.5° C.; Tc<−20° C.; Δn=0.270; Δε=7.8; η=42.6 mPa·s; VHR=98.9%.

The refractive index anisotropy and dielectric loss at 50 GHz of the liquid crystal composition 1 were as follows.
Refractive index anisotropy; 0.22
Dielectric loss; 0.013

Example 10

Preparation and Physical Properties of Liquid Crystal Composition 8

| | | |
|---|---|---|
| (1-29-1) | | 10.0% |
| 3-BB(F)B(F,F)-F | (2-15) | 2.7% |
| 2-BTB-O1 | (3-1) | 7.0% |
| 3-BTB-O1 | (3-1) | 7.0% |
| 4-BTB-O1 | (3-1) | 7.0% |
| 4-BTB-O2 | (3-1) | 7.0% |
| 5-BTB-O1 | (3-1) | 7.0% |
| 3-HB(F)TB-2 | (3-4) | 4.5% |
| 3-HB(F)TB-3 | (3-4) | 4.5% |
| 3-HB(F)TB-4 | (3-4) | 4.5% |
| 3-H2BTB-2 | (3-6) | 2.7% |
| 3-H2BTB-3 | (3-6) | 2.7% |
| 3-H2BTB-4 | (3-6) | 2.7% |
| 3-BB(F,F)XB(F,F)-F | (4-2) | 8.1% |
| 3-BB(F)B(F,F)XB(F)-F | (4-6) | 2.7% |
| 3-BB(F)B(F,F)XB(F,F)-F | (4-7) | 1.8% |
| 4-BB(F)B(F,F)XB(F,F)-F | (4-7) | 6.3% |
| 5-BB(F)B(F,F)XB(F,F)-F | (4-7) | 6.3% |
| 3-BB(F,F)XB(F)B(F,F)-F | (4-12) | 5.5% |

NI=89.7° C.; Tc<−20° C.; Δn=0.254; Δε=7.9; η=44.5 mPa·s; VHR=98.2%.

The refractive index anisotropy and dielectric loss at 50 GHz of the liquid crystal composition 1 were as follows.
Refractive index anisotropy; 0.20
Dielectric loss; 0.009

Example 11

Preparation and Physical Properties of Liquid Crystal Composition 9

| | | |
|---|---|---|
| (1-1-8) | | 10.0% |
| 3-BB(F)B(F,F)-F | (2-15) | 2.7% |
| 2-BTB-O1 | (3-1) | 7.0% |
| 3-BTB-O1 | (3-1) | 7.0% |
| 4-BTB-O1 | (3-1) | 7.0% |
| 4-BTB-O2 | (3-1) | 7.0% |
| 5-BTB-O1 | (3-1) | 7.0% |
| 3-HB(F)TB-2 | (3-4) | 4.5% |
| 3-HB(F)TB-3 | (3-4) | 4.5% |
| 3-HB(F)TB-4 | (3-4) | 4.5% |
| 3-H2BTB-2 | (3-6) | 2.7% |
| 3-H2BTB-3 | (3-6) | 2.7% |
| 3-H2BTB-4 | (3-6) | 2.7% |
| 3-BB(F,F)XB(F,F)-F | (4-2) | 8.1% |
| 3-BB(F)B(F,F)XB(F)-F | (4-6) | 2.7% |
| 3-BB(F)B(F,F)XB(F,F)-F | (4-7) | 1.8% |
| 4-BB(F)B(F,F)XB(F,F)-F | (4-7) | 6.3% |
| 5-BB(F)B(F,F)XB(F,F)-F | (4-7) | 6.3% |
| 3-BB(F,F)XB(F)B(F,F)-F | (4-12) | 5.5% |

NI=104.3° C.; Tc<−20° C.; Δn=0.288; Δε=7.8; η=47.8 mPa·s; VHR=98.3%.

The refractive index anisotropy and dielectric loss at 50 GHz of the liquid crystal composition 1 were as follows.
Refractive index anisotropy; 0.24
Dielectric loss; 0.010

Example 12

Preparation and Physical Properties of Liquid Crystal Composition 10

| | | |
|---|---|---|
| (1-1-9) | | 10.0% |
| 3-BB(F)B(F,F)-F | (2-15) | 2.7% |
| 2-BTB-O1 | (3-1) | 7.0% |
| 3-BTB-O1 | (3-1) | 7.0% |
| 4-BTB-O1 | (3-1) | 7.0% |
| 4-BTB-O2 | (3-1) | 7.0% |
| 5-BTB-O1 | (3-1) | 7.0% |
| 3-HB(F)TB-2 | (3-4) | 4.5% |
| 3-HB(F)TB-3 | (3-4) | 4.5% |
| 3-HB(F)TB-4 | (3-4) | 4.5% |
| 3-H2BTB-2 | (3-6) | 2.7% |
| 3-H2BTB-3 | (3-6) | 2.7% |
| 3-H2BTB-4 | (3-6) | 2.7% |
| 3-BB(F,F)XB(F,F)-F | (4-2) | 8.1% |
| 3-BB(F)B(F,F)XB(F)-F | (4-6) | 2.7% |
| 3-BB(F)B(F,F)XB(F,F)-F | (4-7) | 1.8% |
| 4-BB(F)B(F,F)XB(F,F)-F | (4-7) | 6.3% |
| 5-BB(F)B(F,F)XB(F,F)-F | (4-7) | 6.3% |
| 3-BB(F,F)XB(F)B(F,F)-F | (4-12) | 5.5% |

NI=98.2° C.; Tc<−20° C.; Δn=0.280; Δε=7.8; η=46.4 mPa·s; VHR=98.1%.

The refractive index anisotropy and dielectric loss at 50 GHz of the liquid crystal composition 1 were as follows.
Refractive index anisotropy; 0.23
Dielectric loss; 0.010

Example 13

Preparation and Physical Properties of Liquid Crystal Composition 11

| | | |
|---|---|---|
| (1-1-4) | | 10.0% |
| (1-1-5) | | 10.0% |
| (1-1-6) | | 10.0% |
| 3-BB(F)B(F,F)-F | (2-15) | 3.0% |
| 2-BTB-1 | (3-1) | 9.0% |
| 3-BTB-1 | (3-1) | 5.0% |
| 3-HB(F)TB-2 | (3-4) | 4.0% |
| 3-H2BTB-2 | (3-6) | 5.0% |
| 3-H2BTB-3 | (3-6) | 5.0% |
| 3-H2BTB-4 | (3-6) | 5.0% |
| 3-BB(F,F)XB(F,F)-F | (4-2) | 9.0% |
| 3-BB(F)B(F,F)XB(F)-F | (4-6) | 3.0% |
| 3-BB(F)B(F,F)XB(F,F)-F | (4-7) | 2.0% |
| 4-BB(F)B(F,F)XB(F,F)-F | (4-7) | 7.0% |
| 5-BB(F)B(F,F)XB(F,F)-F | (4-7) | 7.0% |
| 3-BB(F,F)XB(F)B(F,F)-F | (4-12) | 6.0% |

NI=91.2° C.; Tc<−20° C.; Δn=0.272; Δε=9.4; η=43.2 mPa·s; VHR=98.9%.

The refractive index anisotropy and dielectric loss at 50 GHz of the liquid crystal composition 1 were as follows.

Refractive index anisotropy; 0.23
Dielectric loss; 0.010

Example 14

Preparation and Physical Properties of Liquid Crystal Composition 12

| (1-1-4)               |         | 10.0% |
| (1-1-5)               |         | 10.0% |
| (1-1-6)               |         | 10.0% |
| 2-BTB-1               | (3-1)   | 8.0%  |
| 3-BTB-1               | (3-1)   | 5.0%  |
| 3-BB(F)TB-2           | (3-5)   | 7.0%  |
| 3-BB(F)TB-3           | (3-5)   | 7.0%  |
| 3-BB(F)TB-4           | (3-5)   | 7.0%  |
| 3-BB(F)B(F,F)XB(F,F)-F | (4-7)  | 2.0%  |
| 4-BB(F)B(F,F)XB(F,F)-F | (4-7)  | 10.0% |
| 5-BB(F)B(F,F)XB(F,F)-F | (4-7)  | 6.0%  |
| 3-BB(F,F)XB(F)B(F,F)-F | (4-12) | 6.0%  |
| 4-BTB(F)B(F,F)XB(F,F)-F | (4-16) | 6.0% |
| 5-BTB(F)B(F,F)XB(F,F)-F | (4-16) | 6.0% |

NI=110.5° C.; Tc<−20° C.; Δn=0.318; Δε=11.0; η=46.1 mPa·s; VHR=99.0%.

The refractive index anisotropy and dielectric loss at 50 GHz of the liquid crystal composition 1 were as follows.
Refractive index anisotropy; 0.28
Dielectric loss; 0.009

Example 15

Preparation and Physical Properties of Liquid Crystal Composition 13

| (1-1-4)               |         | 10.0% |
| (1-1-5)               |         | 10.0% |
| (1-1-6)               |         | 10.0% |
| 3-HB(F)TB-2           | (3-4)   | 5.0%  |
| 3-HB(F)TB-3           | (3-4)   | 4.0%  |
| 3-BB(F)TB-2           | (3-5)   | 4.0%  |
| 3-BB(F)TB-3           | (3-5)   | 4.0%  |
| 3-BB(F)TB-4           | (3-5)   | 4.0%  |
| 3-BB(F,F)XB(F,F)-F    | (4-2)   | 13.0% |
| 3-GB(F,F)XB(F,F)-F    | (4-4)   | 6.0%  |
| 3-BB(F)B(F,F)XB(F,F)-F | (4-7)  | 2.0%  |
| 4-BB(F)B(F,F)XB(F,F)-F | (4-7)  | 8.0%  |
| 5-BB(F)B(F,F)XB(F,F)-F | (4-7)  | 6.0%  |
| 4-GB(F)B(F,F)XB(F,F)-F | (4-10) | 4.0%  |
| 5-GB(F)B(F,F)XB(F,F)-F | (4-10) | 4.0%  |
| 3-BB(F,F)XB(F)B(F,F)-F | (4-12) | 6.0%  |

NI=119.0° C.; Tc<−20° C.; Δn=0.322; Δε=11.3; η=48.1 mPa·s; VHR=98.9%.

The refractive index anisotropy and dielectric loss at 50 GHz of the liquid crystal composition 1 were as follows.
Refractive index anisotropy; 0.29
Dielectric loss; 0.009

Comparative Example 1

Preparation and Physical Properties of Liquid Crystal Composition Ref. 1

The following Comparative Compound (ref. 1) was synthesized according to Japanese Patent No. 5859189. The following liquid crystal composition ref. 1 was prepared using the compound in the same manner as in Example 1. Values of physical properties of the liquid crystal composition are shown below.

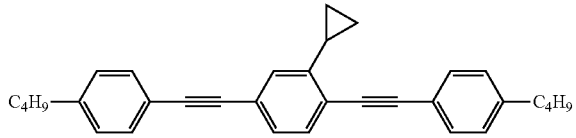

(ref. 1)

| (ref. 1)              |         | 15.0% |
| 3-BB(F)B(F,F)-F       | (2-15)  | 2.6%  |
| 2-BTB-O1              | (3-1)   | 6.5%  |
| 3-BTB-O1              | (3-1)   | 6.5%  |
| 4-BTB-O1              | (3-1)   | 6.5%  |
| 4-BTB-O2              | (3-1)   | 6.5%  |
| 5-BTB-O1              | (3-1)   | 6.6%  |
| 3-HB(F)TB-2           | (3-4)   | 4.3%  |
| 3-HB(F)TB-3           | (3-4)   | 4.3%  |
| 3-HB(F)TB-4           | (3-4)   | 4.3%  |
| 3-H2BTB-2             | (3-6)   | 2.6%  |
| 3-H2BTB-3             | (3-6)   | 2.6%  |
| 3-H2BTB-4             | (3-6)   | 2.6%  |
| 3-BB(F,F)XB(F,F)-F    | (4-2)   | 7.7%  |
| 3-BB(F)B(F,F)XB(F)-F  | (4-6)   | 2.6%  |
| 3-BB(F)B(F,F)XB(F,F)-F | (4-7)  | 1.7%  |
| 4-BB(F)B(F,F)XB(F,F)-F | (4-7)  | 6.0%  |
| 5-BB(F)B(F,F)XB(F,F)-F | (4-7)  | 6.0%  |
| 3-BB(F,F)XB(F)B(F,F)-F | (4-12) | 5.1%  |

NI=93.9° C.; Tc<−20° C.; Δn=0.267; Δε=7.6; η=54.7 mPa·s; VHR=98.0%.

The refractive index anisotropy and dielectric loss at 50 GHz of the liquid crystal composition 1 were as follows.
Refractive index anisotropy; 0.23
Dielectric loss; 0.011

The liquid crystal composition 5 and the liquid crystal composition 7 of Example 7 and Example 9 had approximately the same refractive index anisotropy as the liquid crystal composition ref. 1 of Comparative Example 1, but had a low viscosity. Accordingly, it was found that the liquid crystal composition of the disclosure was a material having excellent characteristic balance as a material for the element used for phase control of an electromagnetic wave signal with a frequency of 1 MHz to 400 THz.

The liquid crystal composition of the disclosure can be suitably used as a material for the element used for phase control of an electromagnetic wave signal with a frequency of 1 MHz to 400 THz.

The composition of the disclosure has a high upper limit temperature of a nematic phase, a low lower limit temperature of a nematic phase, large optical anisotropy in a frequency range used for phase control, small dielectric loss, and stability with respect to heat. Therefore, an element using this material has practically excellent characteristics.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A liquid crystal composition which comprises at least one compound selected from a group consisting of compounds represented by Formula (1) as a first component, at least one compound selected from a group consisting of compounds represented by Formula (3) as a second component, and is used for phase control of an electromagnetic wave signal with a frequency of 1 MHz to 400 THz:

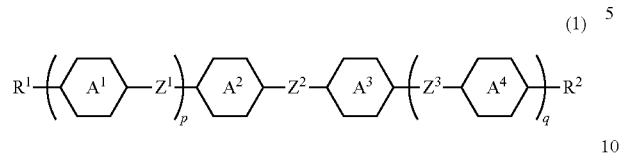
(1)

in Formula (1),

R¹ represents an alkyl group having 1 to 12 carbon atoms, an alkoxy group having 1 to 12 carbon atoms, an alkylthio group having 1 to 12 carbon atoms, an alkenyl group having 2 to 12 carbon atoms, or an alkenyloxy group having 2 to 12 carbon atoms, and one, two, or more of $CH_2$'s present in the alkyl group, the alkoxy group, the alkylthio group, the alkenyl group or the alkenyloxy group may be substituted with —O—, —CO—, or —COO— in which O atoms are not directly bonded to each other; R² represents R¹, —CN, —F, —Cl, —CF₃, —OCF₃, —CF₂H, —OCF₂H, —NCS, —SF₅, or —NO₂; and ring A¹, ring A², ring A³, and ring A⁴ independently represent a group represented by any of the following Formulae (I) to (XV), and at least one of ring A² and ring A³ is a group represented by any of Formulae (I) to (XII);

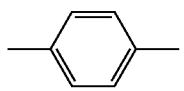
(I)

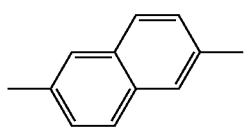
(II)

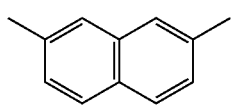
(III)

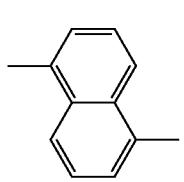
(IV)

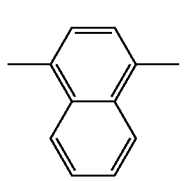
(V)

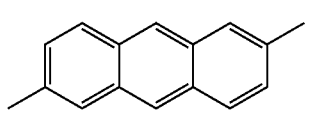
(VI)

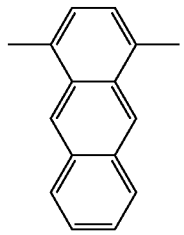
(VII)

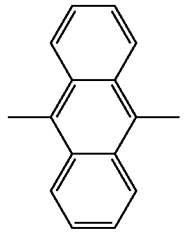
(VIII)

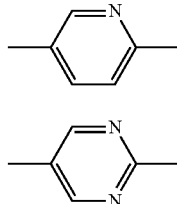
(IX)

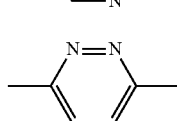
(X)

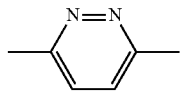
(XI)

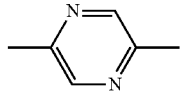
(XII)

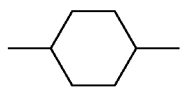
(XIII)

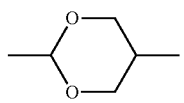
(XIV)

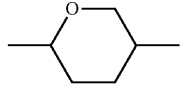
(XV)

in groups of Formulae (I) to (XII), at least one hydrogen atom is optionally substituted with —CH₃, —CH₂CH₃, —CH₂CH₂CH₃, —OCH₃, —OCH₂CH₃, —SCH₃, or —F; and Z¹ and Z³ independently represent a single bond, —CH₂CH₂—, —CF₂O—, —CH₂O—, —CH═CH—, —CF═CF—, —CH═CF—, —C≡C—, —C≡C—C≡C—, —COO—, —CH₂—, —O—, or —CO—, and Z² represents —C≡C—C≡C—; and p and q independently represent 0, 1, or 2, and when p and q are 2, a plurality of rings A¹, Z¹, Z³, and rings A⁴ may be the same as or different from each other, and

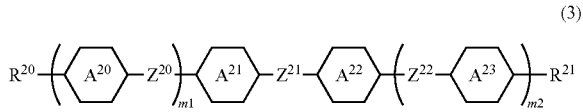

(3)

in Formula (3), ring $A^{20}$ and ring $A^{23}$ independently represent 1,4-cyclohexylene, 1,4-phenylene, 2,6-naphthylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl, and ring $A^{21}$ and ring $A^{22}$ independently represent 1,4-phenylene, 2,6-naphthylene, 2-fluoro-1,4-phenylene, 2,5-difluoro-1,4-phenylene or 2,6-difluoro-1,4-phenylene;

$Z^{20}$ and $Z^{22}$ independently represent a single bond, —CH$_2$CH$_2$—, —CH$_2$O—, —CH=CH—, —CF=CF—, —CH=CF—, —C≡C—, —COO—, —CH$_2$—, —O—, or —CO—, and $Z^{21}$ represents —C≡C—;

m1 and m2 independently represent 0, 1, or 2, and when m1 and m2 are 2, a plurality of rings $A^{20}$, rings $A^{23}$, $Z^{20}$'s, and $Z^{22}$'s may be the same as or different from each other; and $R^{20}$ represents an alkyl group having 1 to 12 carbon atoms, an alkoxy group having 1 to 12 carbon atoms, or an alkenyl group having 2 to 12 carbon atoms, and $R^{21}$ represents $R^{20}$, —CN, —F, —Cl, —CF$_3$, —OCF$_3$, —CF$_2$H, —OCF$_2$H, —NCS, or —SF$_5$.

2. The liquid crystal composition according to claim 1, comprising 95 weight % to 10 weight % of at least one compound selected from the group consisting of compounds represented by Formula (1) with respect to a total weight of the composition, and comprising 5 weight % to 90 weight % of at least one compound selected from a group consisting of compounds represented by Formula (2) as a third component with respect to a total weight of the composition:

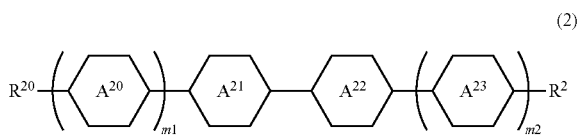

(2)

in Formula (2), ring $A^{20}$ and ring $A^{23}$ independently represent 1,4-cyclohexylene, 1,4-phenylene, 2,6-naphthylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl, and the ring $A^{21}$ and the ring $A^{22}$ independently represent 1,4-phenylene, 2,6-naphthylene, 2-fluoro-1,4-phenylene, 2-methyl-1,4-phenylene, 2,5-difluoro-1,4-phenylene, or 2,6-difluoro-1,4-phenylene;

m1 and m2 independently represent 0, 1, or 2, and when m1 and m2 are 2, a plurality of rings $A^{20}$ and rings $A^{23}$ may be the same as or different from each other; and $R^{20}$ represents an alkyl group having 1 to 12 carbon atoms, an alkoxy group having 1 to 12 carbon atoms, or an alkenyl group having 2 to 12 carbon atoms, and $R^{21}$ represents $R^{20}$, —CN, —F, —Cl, —CF$_3$, —OCF$_3$, —CF$_2$H, —OCF$_2$H, —NCS, or —SF$_5$.

3. The liquid crystal composition according to claim 1, comprising 95 weight % to 10 weight % of at least one compound selected from the group consisting of compounds represented by Formula (1) with respect to a total weight of the composition, and 5 weight % to 90 weight % of at least one compound selected from the group consisting of compounds represented by Formula (3) with respect to a total weight of the composition.

4. The liquid crystal composition according to claim 1, comprising 95 weight % to 10 weight % of at least one compound selected from the group consisting of compounds represented by Formula (1) with respect to a total weight of the composition, and comprising 5 weight % to 90 weight % of at least one compound selected from a group consisting of compounds represented by Formula (4) as a third component with respect to a total weight of the composition:

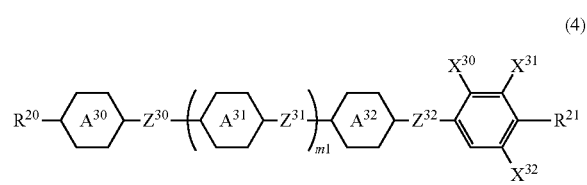

(4)

in Formula (4), ring $A^{30}$, ring $A^{31}$, and ring $A^{32}$ independently represent 1,4-cyclohexylene, 1,4-phenylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl; and $Z^{30}$, $Z^{31}$, and $Z^{32}$ independently represent a single bond, —CH$_2$CH$_2$—, —CH=CH—, —CH$_2$O—, —COO—, —CF$_2$CF$_2$—, —C≡C—, or —CF$_2$O—, and at least one of $Z^{30}$, $Z^{31}$, and $Z^{32}$ represents —CF$_2$O—; and $X^{30}$, $X^{31}$, and $X^{32}$ independently represent a hydrogen atom or a fluorine atom;

when m1 is 0, 1, or 2, and m1 is 2, a plurality of rings $A^{31}$ and $Z^{31}$ may be the same as or different from each other;

$R^{20}$ represents an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

5. The liquid crystal composition according to claim 2, comprising at least one compound selected from a group consisting of compounds represented by Formula (2-1) to Formula (2-32) as the third component:

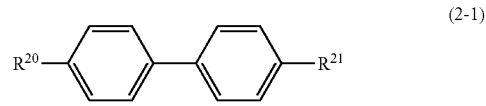

(2-1)

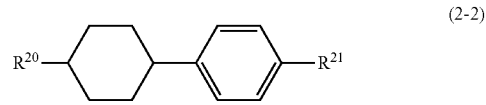

(2-2)

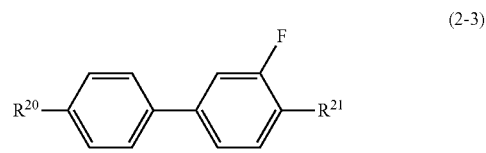

(2-3)

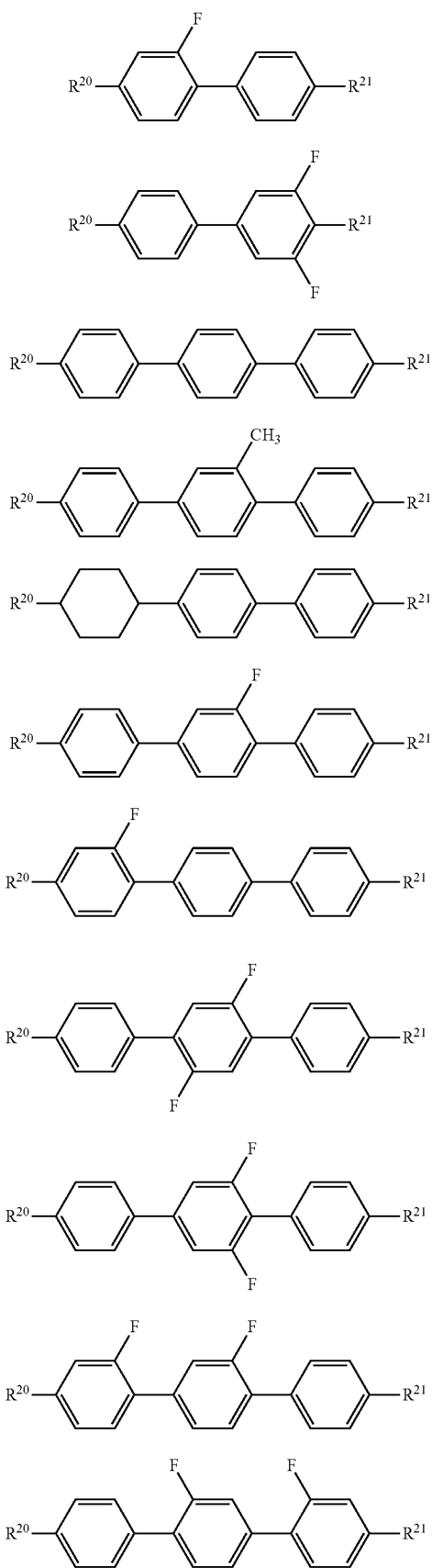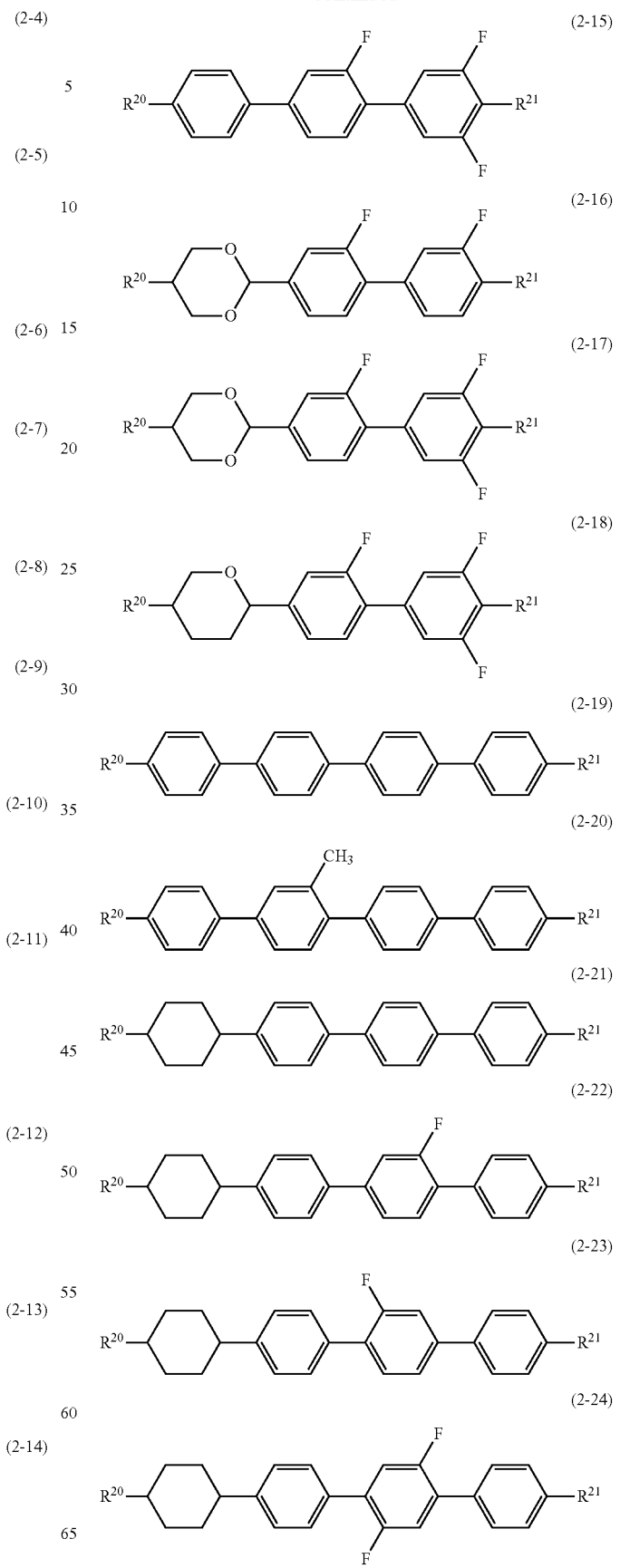

-continued

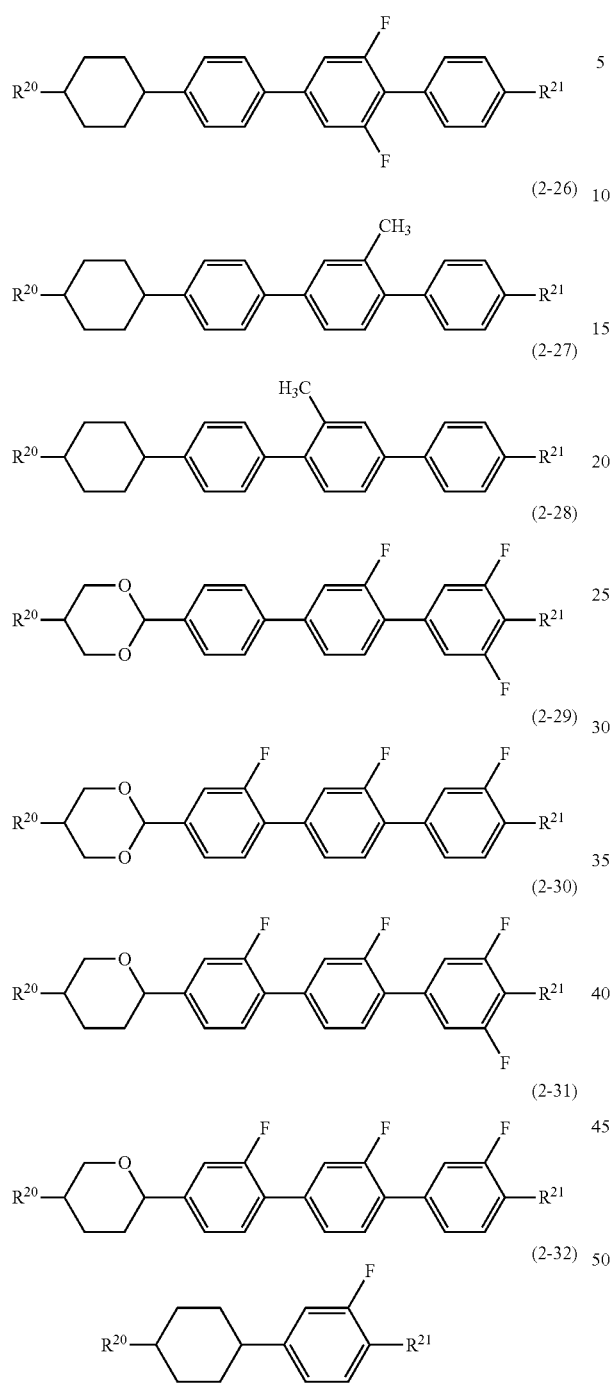

in these formulae, $R^{20}$ represents an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

6. The liquid crystal composition according to claim 1, comprising at least one compound selected from a group consisting of compounds represented by Formula (3-1) to Formula (3-14) as the second component:

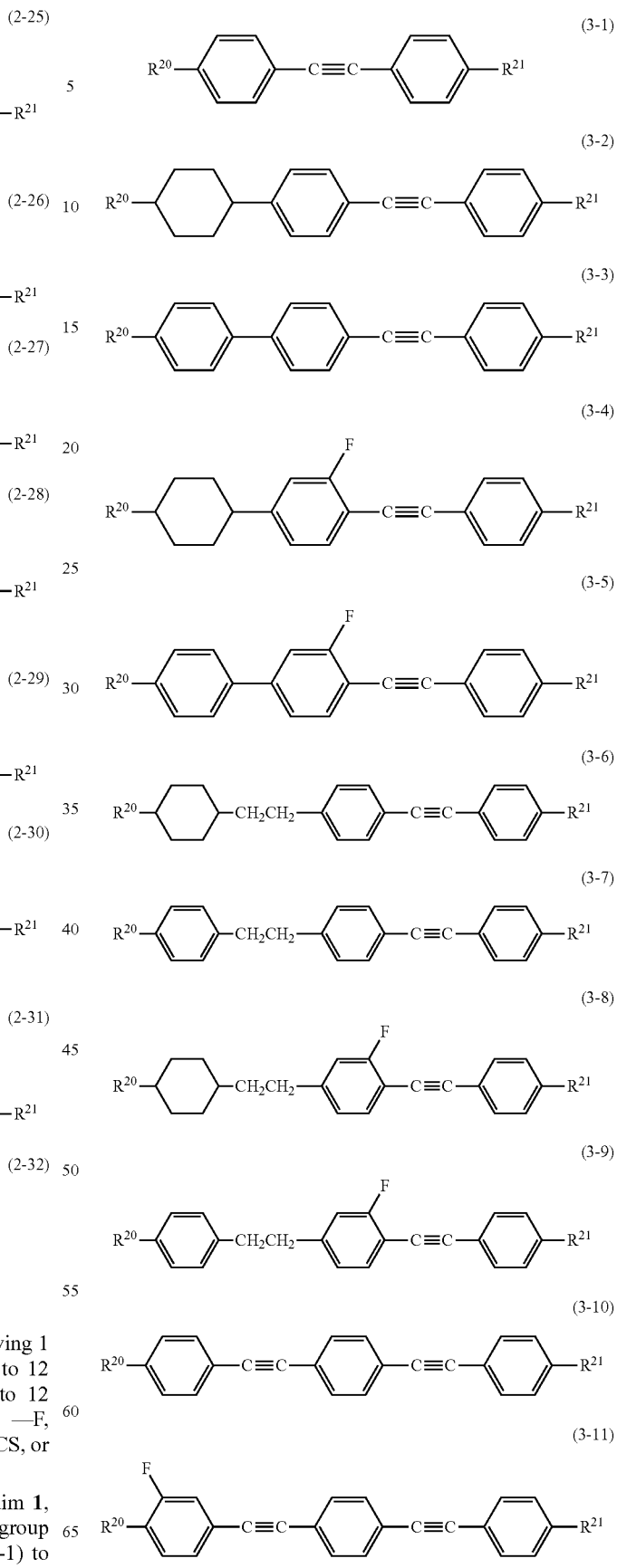

(3-12)
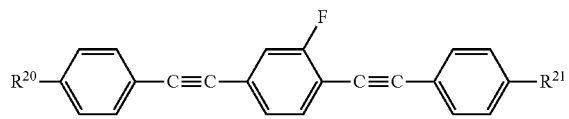

(3-13)
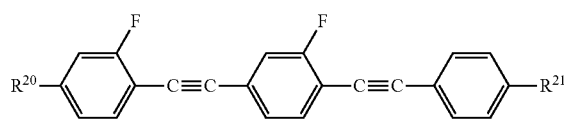

(3-14)
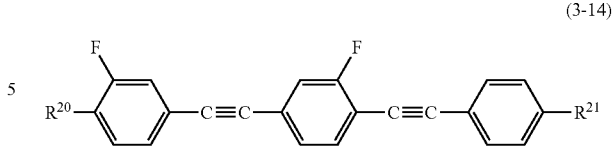

in these formulae, $R^{20}$ represents an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$.

7. The liquid crystal composition according to claim 4, comprising at least one compound selected from the group consisting of compounds represented by Formula (4-1) to Formula (4-15) as the third component:

(4-1)
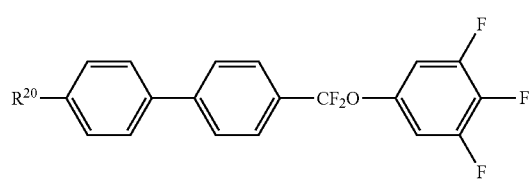

(4-2)
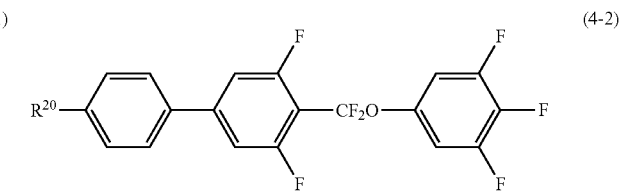

(4-3)
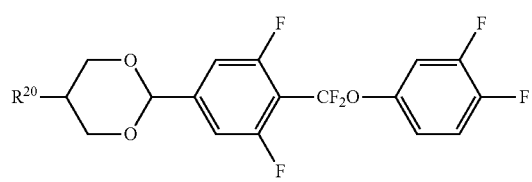

(4-4)
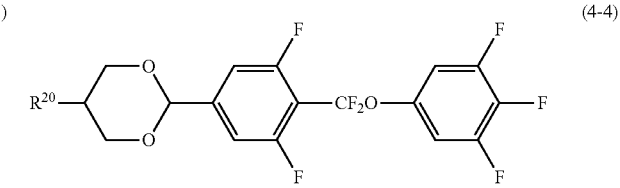

(4-5)
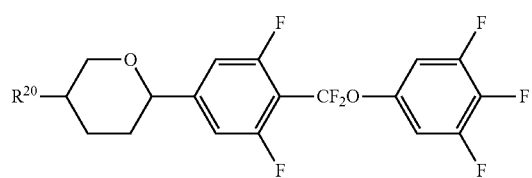

(4-6)
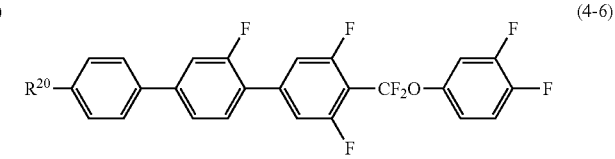

(4-7)
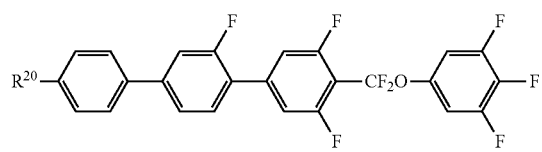

(4-8)
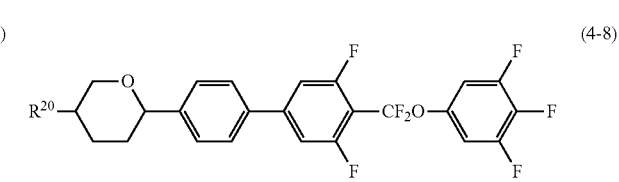

(4-9)
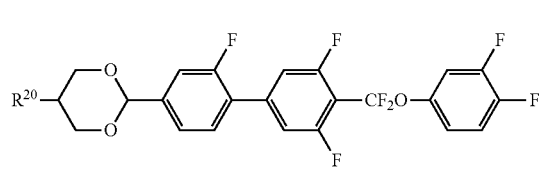

(4-10)
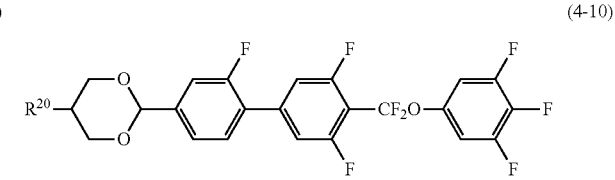

(4-11)
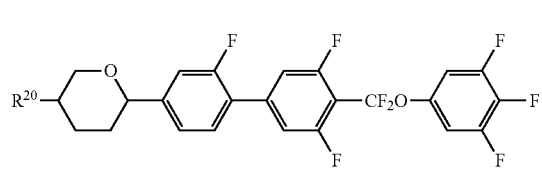

(4-12)
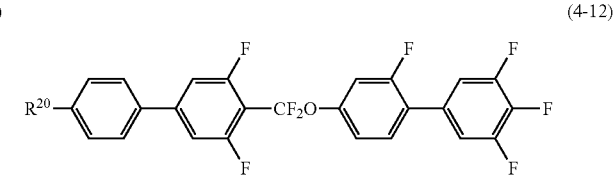

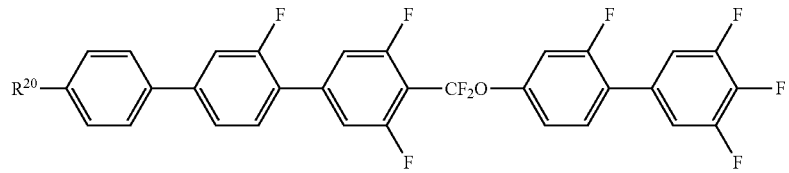
(4-13)
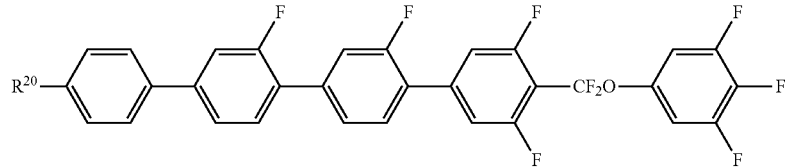
(4-14)
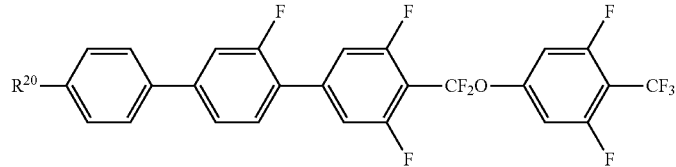
(4-15)
in these formulae, R²⁰ represents an alkyl group having 1 to 12 carbon atoms, an alkoxy group having 1 to 12 carbon atoms, or an alkenyl group having 2 to 12 carbon atoms.
8. The liquid crystal composition according to claim 4, comprising at least one compound selected from a group consisting of compounds represented by Formula (4-16) to Formula (4-26) as the third component:
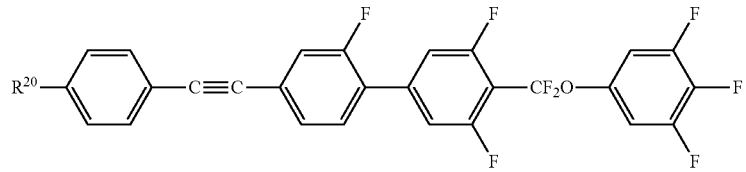
(4-16)
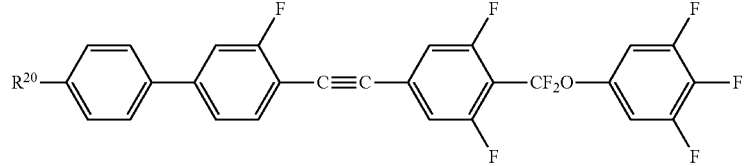
(4-17)
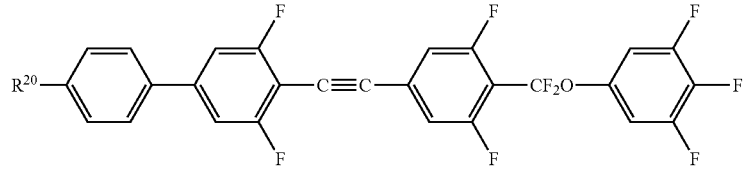
(4-18)
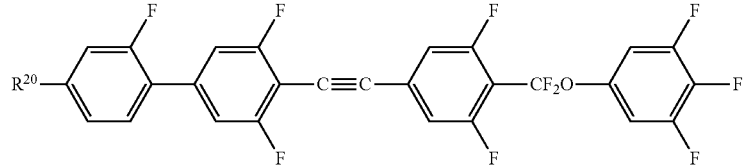
(4-19)

-continued (4-20)
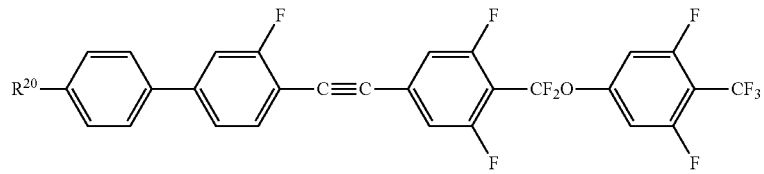

(4-21)
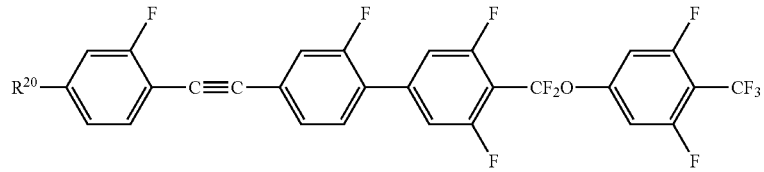

(4-22)
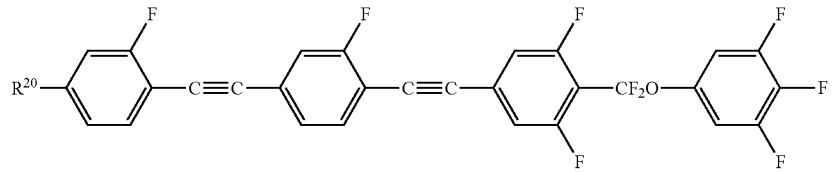

(4-23) (4-24)
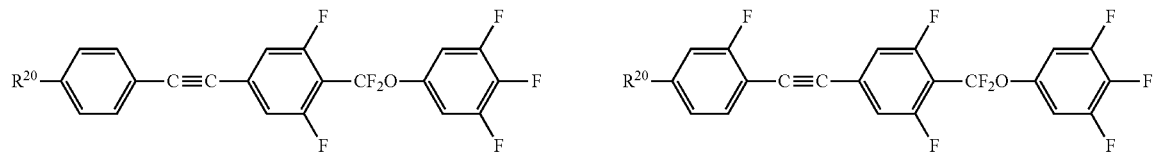

(4-25)
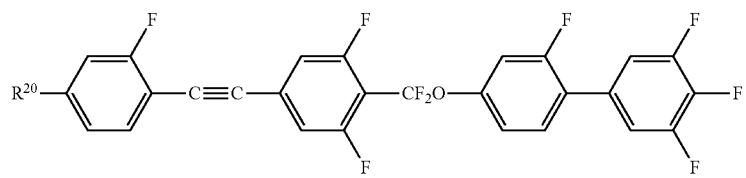

(4-26)
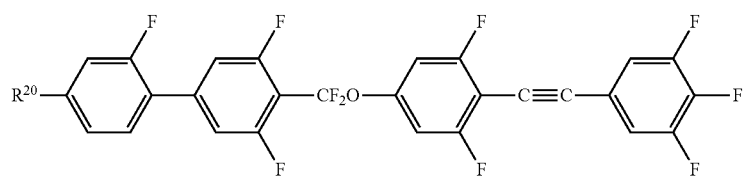

in these formulae, $R^{20}$ represents an alkyl group having 1 to 12 carbon atoms, an alkoxy group having 1 to 12 carbon atoms, or an alkenyl group having 2 to 12 carbon atoms.

9. The liquid crystal composition according to claim 5, wherein, based on the weight of the liquid crystal composition, a proportion of the compound represented by Formula (1) is in a range of 10 weight % to 90 weight %, and in the compounds represented by Formulae (2-1) to (2-32), a proportion of a compound in which $R^{21}$ represents —CN, —F, —Cl, —CF₃, —OCF₃, —CF₂H, —OCF₂H, —NCS, or —SF₅ is in a range of 10 weight % to 90 weight %.

10. The liquid crystal composition according to claim 7, wherein, based on the weight of the liquid crystal composition, a proportion of the compound represented by Formula (1) is in a range of 10 weight % to 90 weight %, and a proportion of the compound represented by Formula (4-1) to Formula (4-15) is in a range of 10 weight % to 90 weight %.

11. The liquid crystal composition according to claim 8, wherein, based on the weight of the liquid crystal composition, a proportion of the compound represented by Formula (1) is in a range of 10 weight % to 90 weight %, and a proportion of the compound represented by Formula (4-16) to Formula (4-26) is in a range of 10 weight % to 90 weight %.

12. The liquid crystal composition according to claim 7, comprising at least one compound selected from a group consisting of compounds represented by Formula (3-1) to Formula (3-14) as the second component:

(3-1)
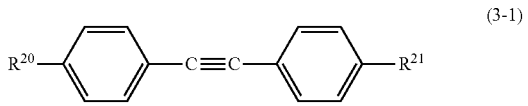

-continued (3-2)
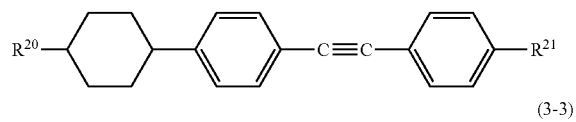

(3-3)
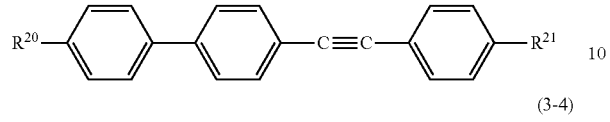

(3-4)
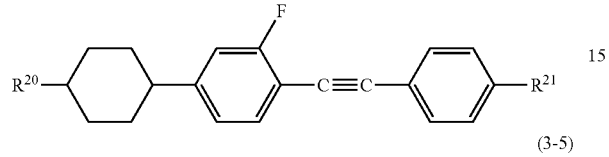

(3-5)
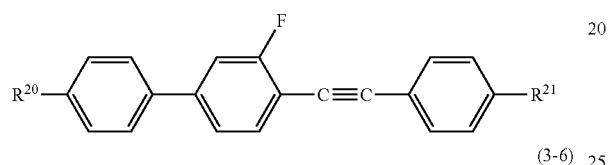

(3-6)
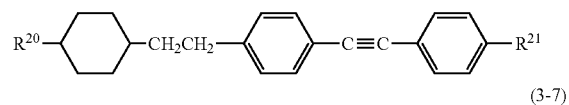

(3-7)
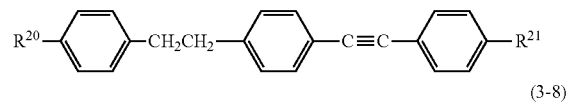

(3-8)
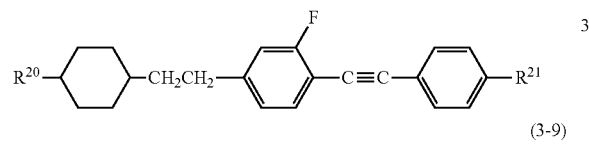

(3-9)
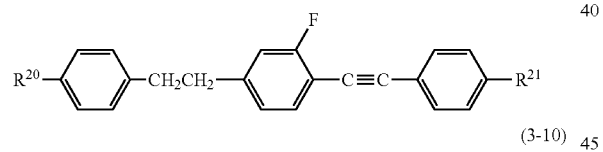

(3-10)
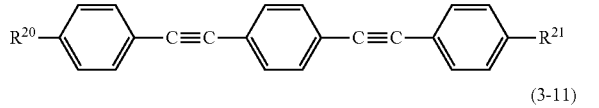

(3-11)
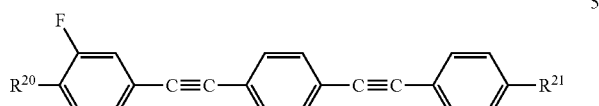

(3-12)
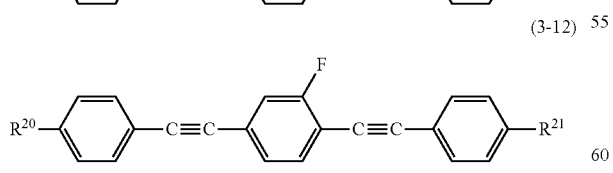

(3-13)
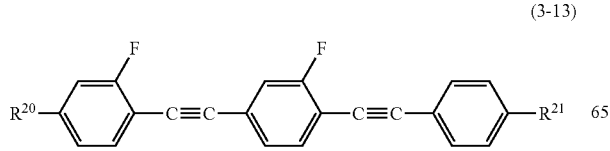

(3-14)
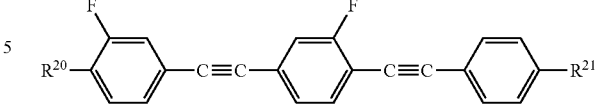

in these formulae, $R^{20}$ represents an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$, wherein, based on the weight of the liquid crystal composition, a proportion of the compound represented by Formula (1) is in a range of 10 weight % to 90 weight %, and in the compounds represented by Formula (3-1) to Formula (3-14), a proportion of a compound in which $R^{21}$ represents an alkyl group having 1 to 12 carbon atoms, an alkoxy group having 1 to 12 carbon atoms, or an alkenyl group having 2 to 12 carbon atoms is in a range of 5 weight % to 80 weight %, and a proportion of the compound represented by Formula (4-1) to Formula (4-15) is in a range of 5 weight % to 80 weight %.

13. The liquid crystal composition according to claim 8, comprising at least one compound selected from a group consisting of compounds represented by Formula (3-1) to Formula (3-14) as the second component:

(3-1)
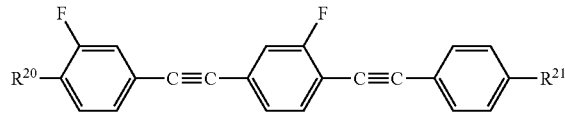

(3-2)
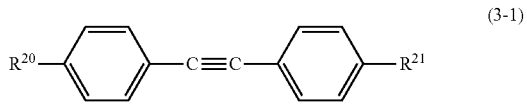

(3-3)
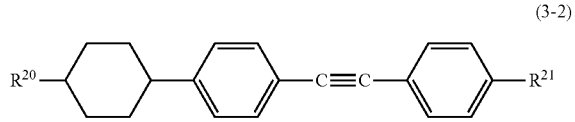

(3-4)
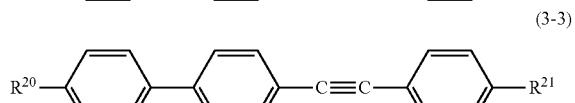

(3-5)
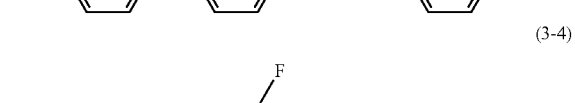

(3-6)
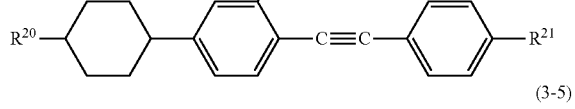

(3-7)
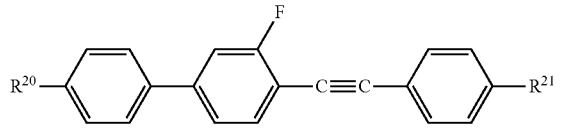

-continued (3-8)
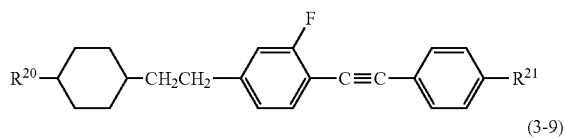

(3-9)
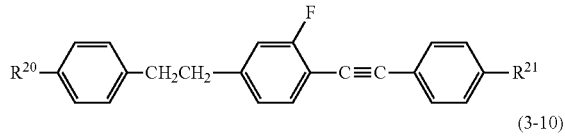

(3-10)
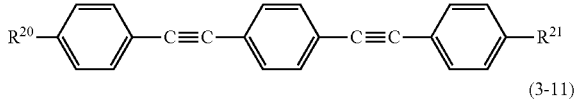

(3-11)
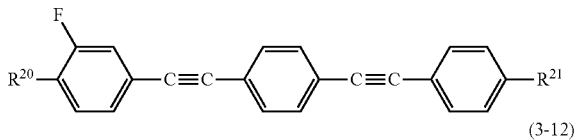

(3-12)
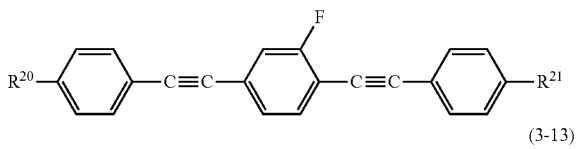

(3-13)
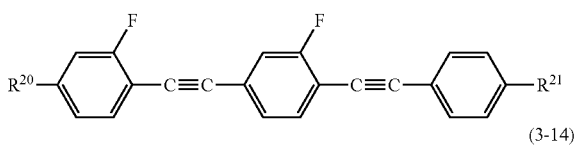

(3-14)
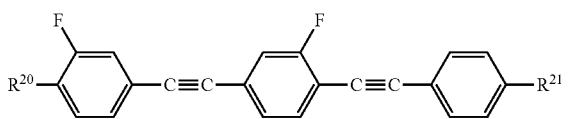

in these formulae, $R^{20}$ represents an alkyl group having 1 to 12 carbon atoms, an alkoxy group having 1 to 12 carbon atoms, or an alkenyl group having 2 to 12 carbon atoms; and $R^{21}$ represents $R^{20}$, —CN, —F, —Cl, —CF$_3$, —OCF$_3$, —CF$_2$H, —OCF$_2$H, —NCS, or —SF$_5$, wherein, based on the weight of the liquid crystal composition, a proportion of the compound represented by Formula (1) is in a range of 10 weight % to 90 weight %, and in the compounds represented by Formula (3-1) to Formula (3-14), a proportion of a compound in which $R^{21}$ represents an alkyl group having 1 to 12 carbon atoms, an alkoxy group having 1 to 12 carbon atoms, or an alkenyl group having 2 to 12 carbon atoms is in a range of 5 weight % to 80 weight %, and a proportion of the compound represented by Formula (4-16) to Formula (4-26) is in a range of 5 weight % to 80 weight %.

14. The liquid crystal composition according to claim 1, comprising at least one compound selected from a group consisting of compounds represented by Formula (2) as a third component and at least one compound selected from a group consisting of compounds represented by Formula (4) as a fourth component:

(3)
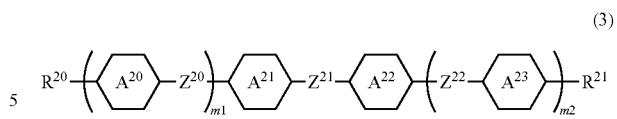

in Formula (2), ring $A^{20}$ and ring $A^{23}$ independently represent 1,4-cyclohexylene, 1,4-phenylene, 2,6-naphthylene, 2-fluoro-1,4-phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl, and the ring $A^{21}$ and the ring $A^{22}$ independently represent 1,4-phenylene, 2,6-naphthylene, 2-fluoro-1,4-phenylene, 2-methyl-1,4-phenylene, 2,5-difluoro-1,4-phenylene, or 2,6-difluoro-1,4-phenylene;

m1 and m2 independently represent 0, 1, or 2, and when m1 and m2 are 2, a plurality of rings $A^{20}$ and rings $A^{23}$ may be the same as or different from each other; and $R^{20}$ represents an alkyl group having 1 to 12 carbon atoms, an alkoxy group having 1 to 12 carbon atoms, or an alkenyl group having 2 to 12 carbon atoms, and $R^{21}$ represents $R^{20}$, —CN, —F, —Cl, —CF$_3$, —OCF$_3$, —CF$_2$H, —OCF$_2$H, —NCS, or —SF$_5$; and (4)
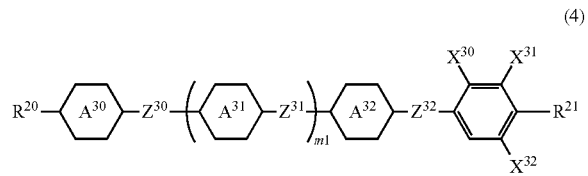

in Formula (4), ring $A^{30}$, ring $A^{31}$, and ring $A^{32}$ independently represent 1,4-cylcohexylene, 1,4-phenylene, 2-fluoro-1,4- phenylene, 2,5-difluoro-1,4-phenylene, 2,6-difluoro-1,4-phenylene, pyridine-2,5-diyl, pyrimidin-2,5-diyl, 1,3-dioxane-2,5-diyl, or tetrahydropyran-2,5-diyl; and $Z^{30}$, $Z^{31}$, $Z^{32}$ independently represent a single bond, —CH$_2$CH$_2$—, —CH=CH—, —CH$_2$O—, —COO—, —CF$_2$CF$_2$—, —C≡C—, or —CF$_2$O—, and at least one of $Z^{30}$, $Z^{31}$, and $Z^{32}$ represents —CF$_2$O—; and $X^{30}$, $X^{31}$, and $X^{32}$ independently represent a hydrogen atom or a fluorine atom;

when m1 is 0, 1, or 2, and m1 is 2, a plurality of rings $A^{31}$ and $Z^{31}$ may be the same as or different from each other;

$R^{20}$ represents an alkyl group having 1 to 12 carbon atoms, an alkoxy group having 1 to 12 carbon atoms, or an alkenyl group having 2 to 12 carbon atoms; and $R^{21}$ represent $R^{20}$, —CN, —F, —Cl, —CF$_3$, —OCF$_3$, —CF$_2$H, —OCF$_2$H, —NCS, or —SF$_5$, wherein, based on the weight of the liquid crystal composition, a proportion of a liquid crystal compound other than components selected from among Formula (2), Formula (3), and Formula (4) is in a range of 1 weight % to 20 weight %.

15. The liquid crystal composition according to claim 1, wherein a refractive index anisotropy measured at 25° C. at a wavelength of 589 nm is in a range of 0.18 to 0.35, and a dielectric anisotropy measured at 25° C. at a frequency of 1 kHz is in a range of 7 to 40.

16. The liquid crystal composition according to claim 1, wherein a refractive index anisotropy measured at 25° C. at a frequency of 50 GHz is in a range of 0.15 to 0.40.

17. The liquid crystal composition according to claim 1, comprising an acrylic monomer.

18. The liquid crystal composition according to claim 1, comprising a photopolymerization initiator.

19. The liquid crystal composition according to claim 1, comprising an optically active compound.

20. An element which comprises the liquid crystal composition according to claim 1 and is used for phase control of an electromagnetic wave signal with a frequency of 1 MHz to 400 THz.

* * * * *